United States Patent [19]
Tanaka et al.

[11] Patent Number: 5,095,371
[45] Date of Patent: Mar. 10, 1992

[54] DUPLEX IMAGE FORMING SYSTEM WITH NUMBER OF SINGLE SIDE PRINTED SHEETS IN FEED PATH SELECTED BEFORE PRINTING SECOND SIDE

[75] Inventors: Hidetake Tanaka, Tokyo; Shigeru Yamazaki, Tanashi; Koji Yamanobe, Tokyo; Hiroaki Kotabe, Funabashi; Yasushi Nakazato, Tokyo; Masahiko Banno, Yokohama, all of Japan

[73] Assignee: Ricoh Company, Ltd., Tokyo, Japan

[21] Appl. No.: 505,983

[22] Filed: Apr. 6, 1990

Related U.S. Application Data

[62] Division of Ser. No. 161,471, Feb. 26, 1988, Pat. No. 4,924,320.

[30] Foreign Application Priority Data

Feb. 28, 1987 [JP] Japan .................. 62-45931

[51] Int. Cl.⁵ ............ H04N 1/29; B65H 5/00; B65H 85/00
[52] U.S. Cl. .................... 358/300; 355/319
[58] Field of Search .......... 358/300; 346/160.1, 346/134; 355/318, 319, 24, 26

[56] References Cited

U.S. PATENT DOCUMENTS

| | | | |
|---|---|---|---|
| 3,672,765 | 6/1972 | Altmann | 355/24 |
| 4,116,558 | 9/1978 | Adamek | 355/24 |
| 4,123,155 | 10/1978 | Hubert | 355/26 |
| 4,176,945 | 12/1979 | Holzhauser | 355/318 |
| 4,278,344 | 7/1981 | Sahay | 355/319 |
| 4,355,880 | 10/1982 | Stemmle | 355/318 |
| 4,384,782 | 5/1983 | Acquaviva | 355/318 |
| 4,412,740 | 11/1983 | Buddendeck | 355/319 |
| 4,456,236 | 6/1984 | Buddendeck | 355/24 |
| 4,499,500 | 2/1985 | Nagashima | 358/296 |
| 4,553,828 | 11/1985 | Burger | 355/318 |
| 4,935,786 | 6/1990 | Veeder | 355/319 |

*Primary Examiner*—Benjamin R. Fuller
*Assistant Examiner*—Scott A. Rogers
*Attorney, Agent, or Firm*—Cooper & Dunham

[57] ABSTRACT

A modular type image forming system includes a laser printer main unit and a plurality of optional units, such as a both side processing unit, a large quantity paper feeding unit and a mail box unit, each of which is operatively coupled to said main unit through a commonly usable optical fiber cable through a commonly usable connector. Each unit has its own CPU and serial communications between the CPUs of different units may be carried out through the optical cables. The CPU of the main unit may determine the identity of each of the optional units connected thereto through such communications. The main unit also includes an interface circuit through which the main unit is operatively coupled to each of the optional units. The interface circuit includes a port selector which establishes a connection pattern between the main and optional units in accordance with the identity information of each of the optional units connected. When paper is fed into a transportation path, paper ID is assigned to the paper and retained until the paper is discharged. If the paper is removed from the path without passing a predetermined location, the same image is printed again.

9 Claims, 70 Drawing Sheets

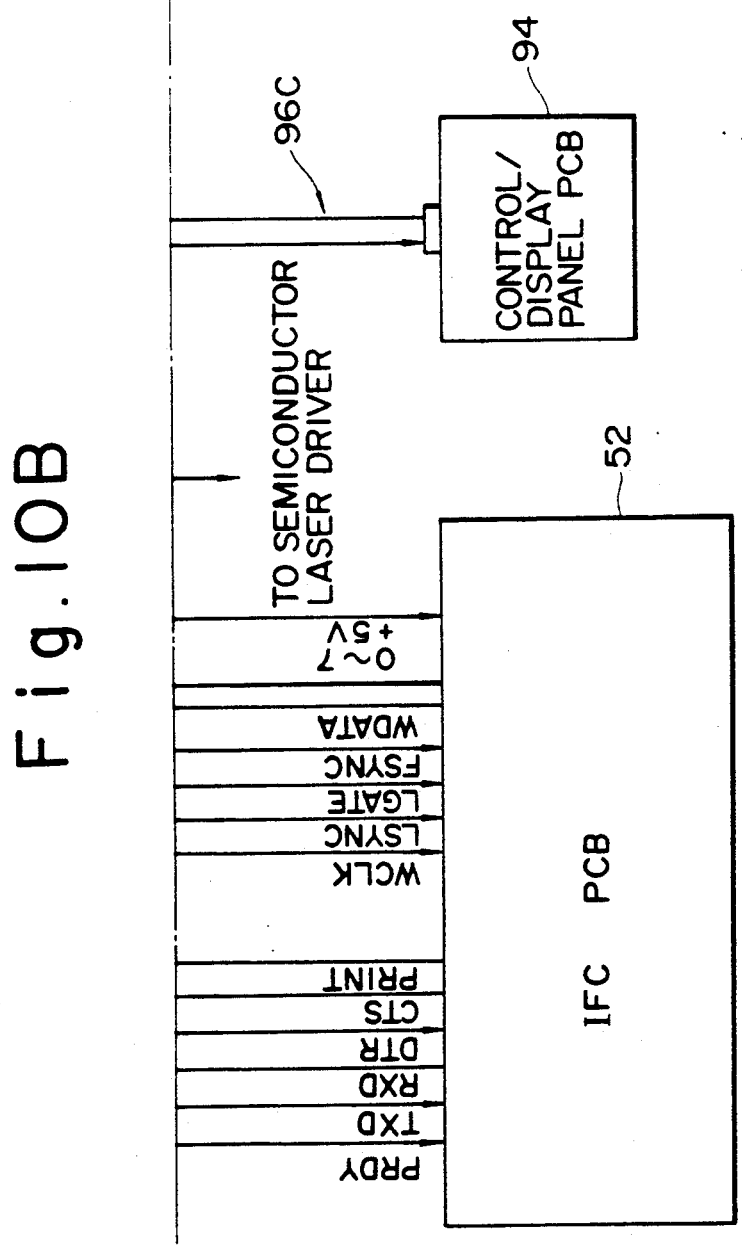

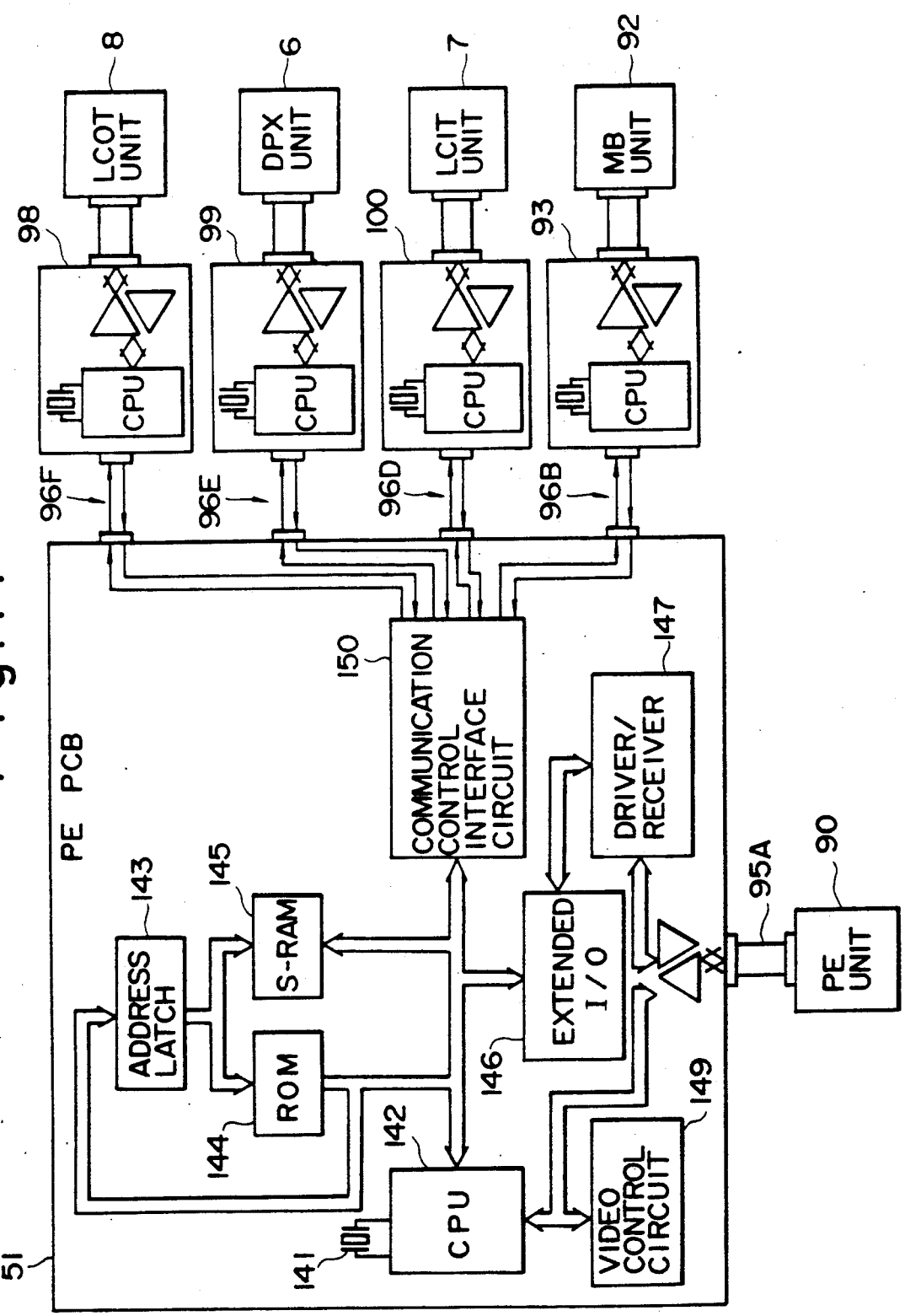

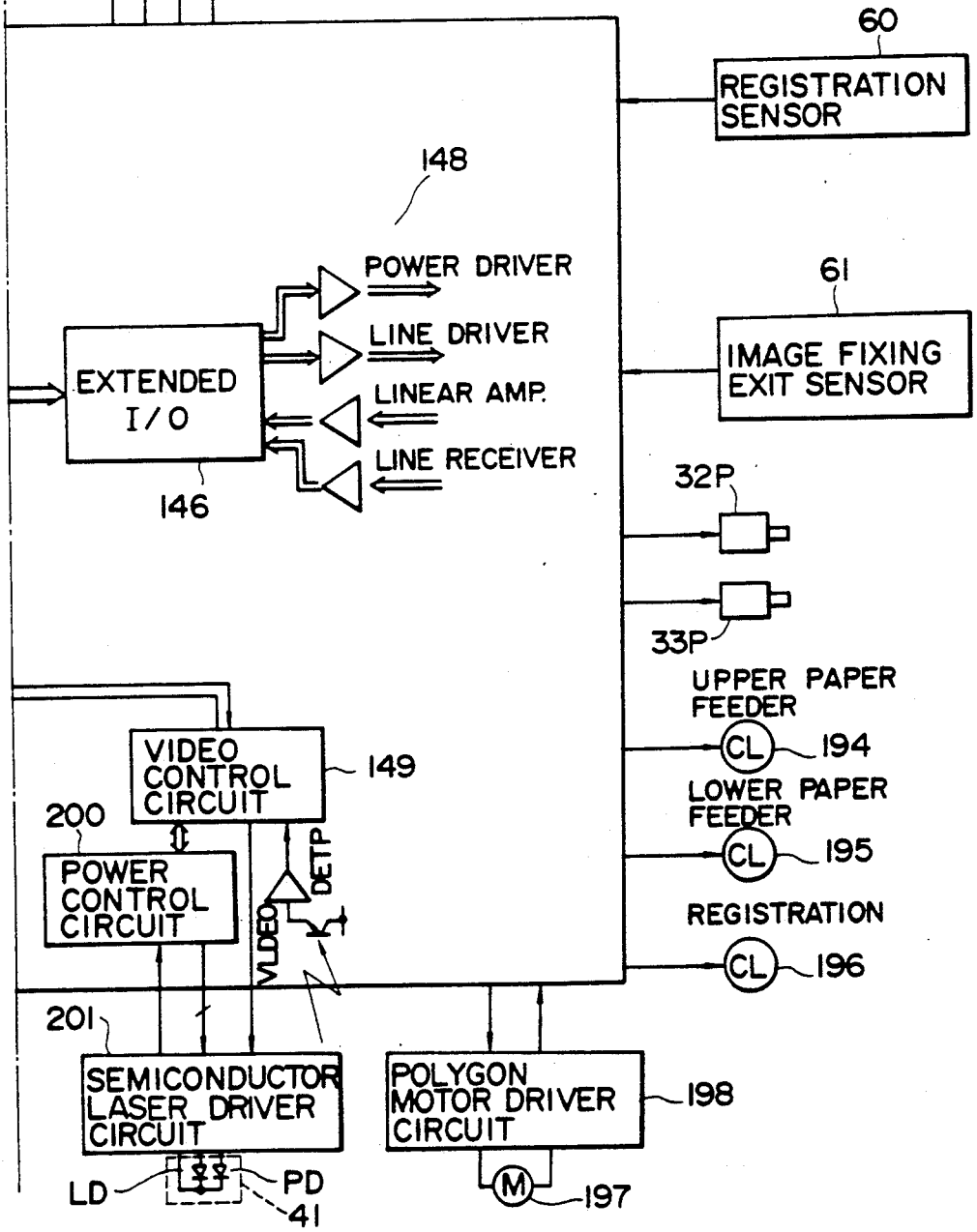

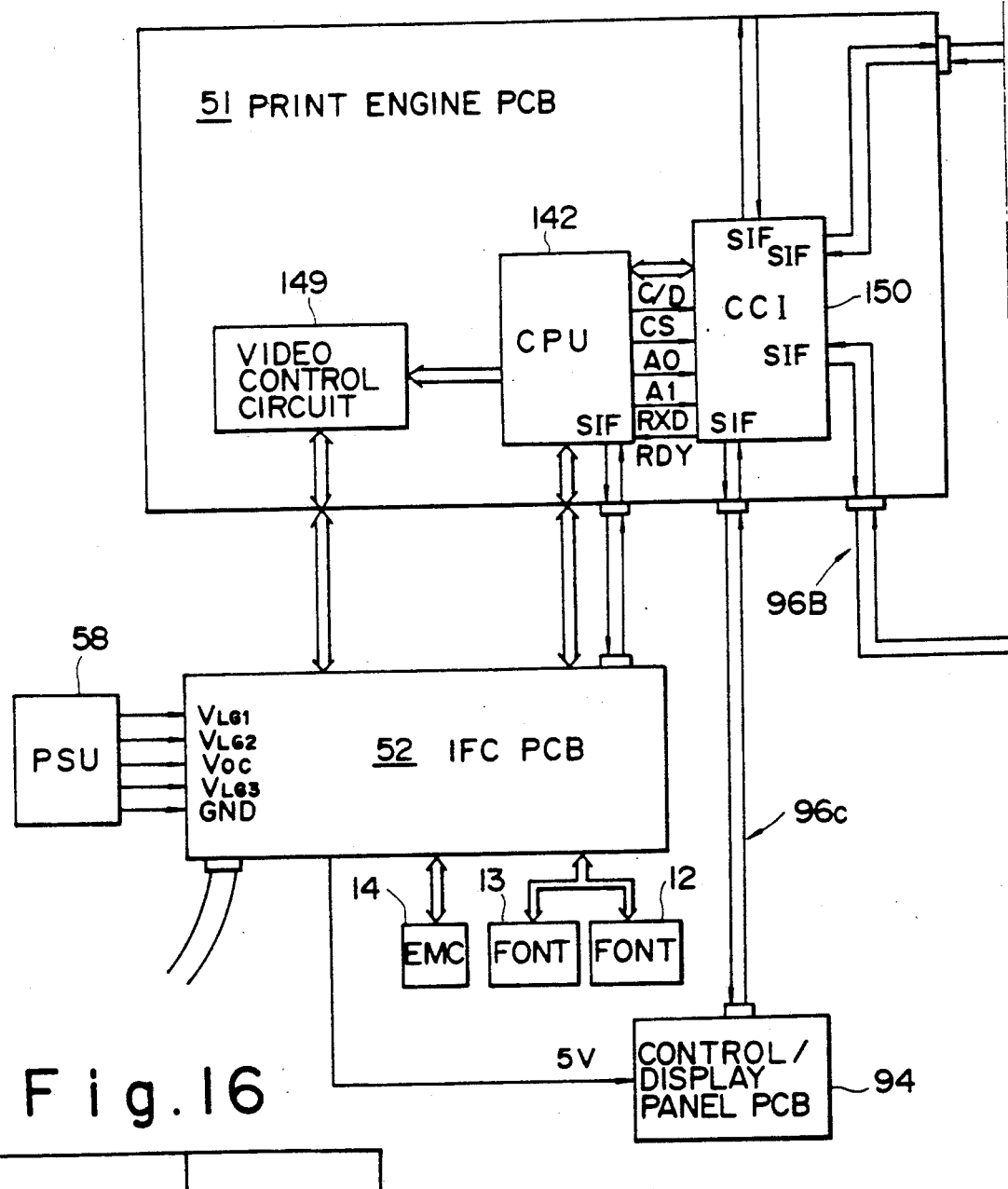

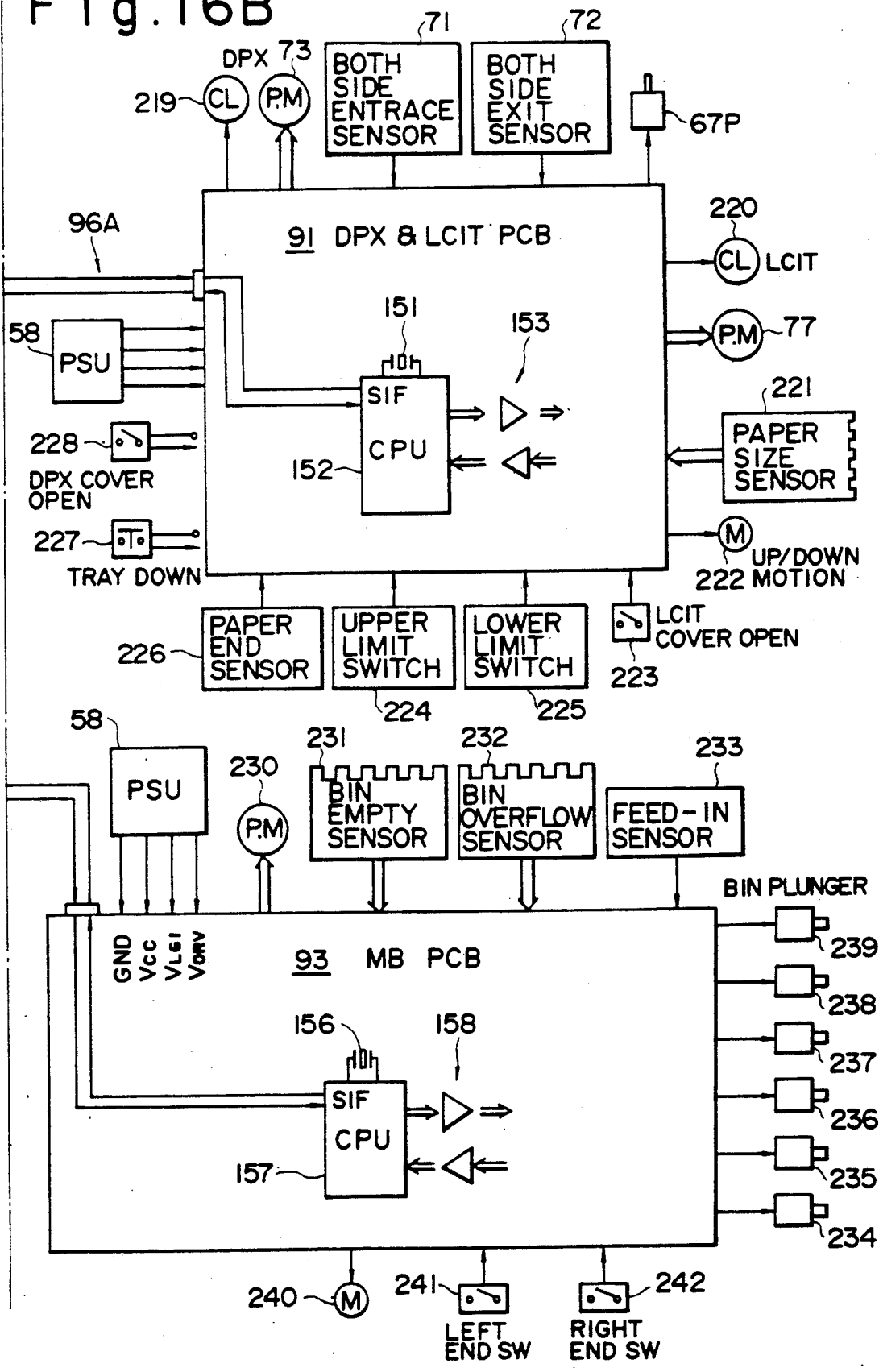

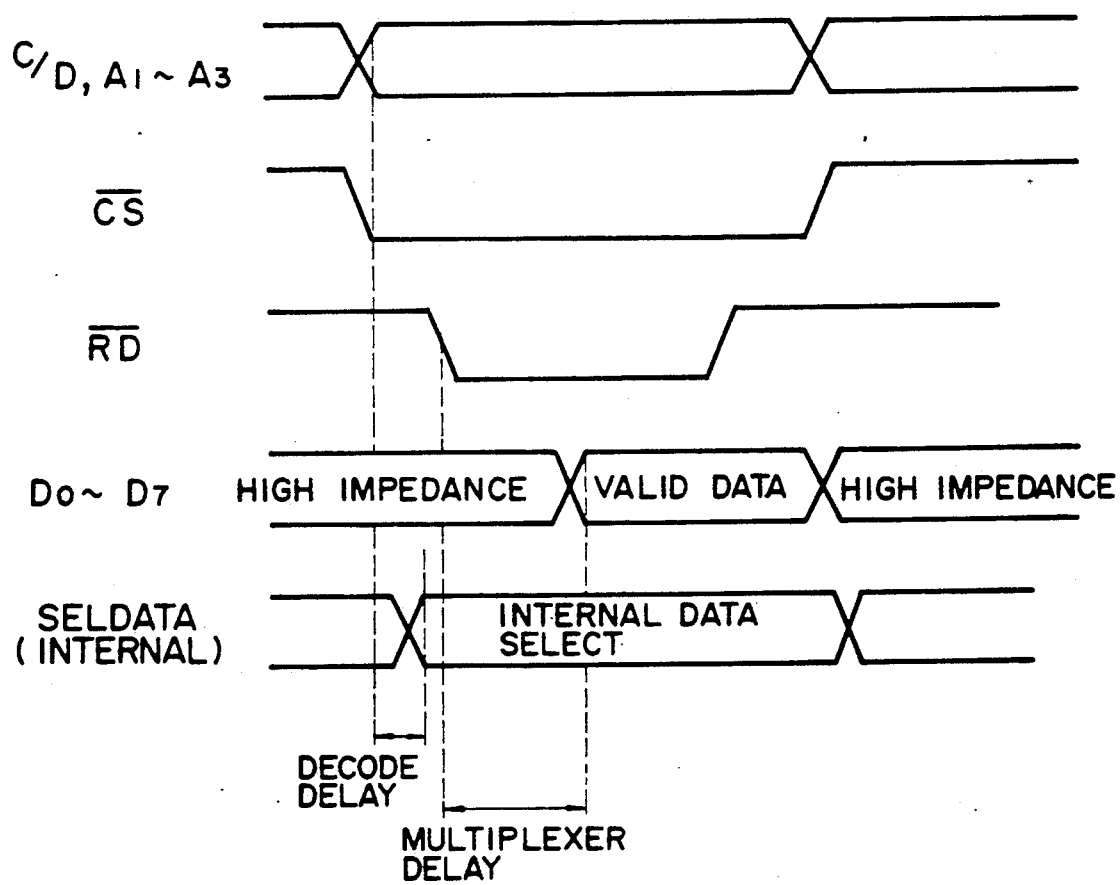

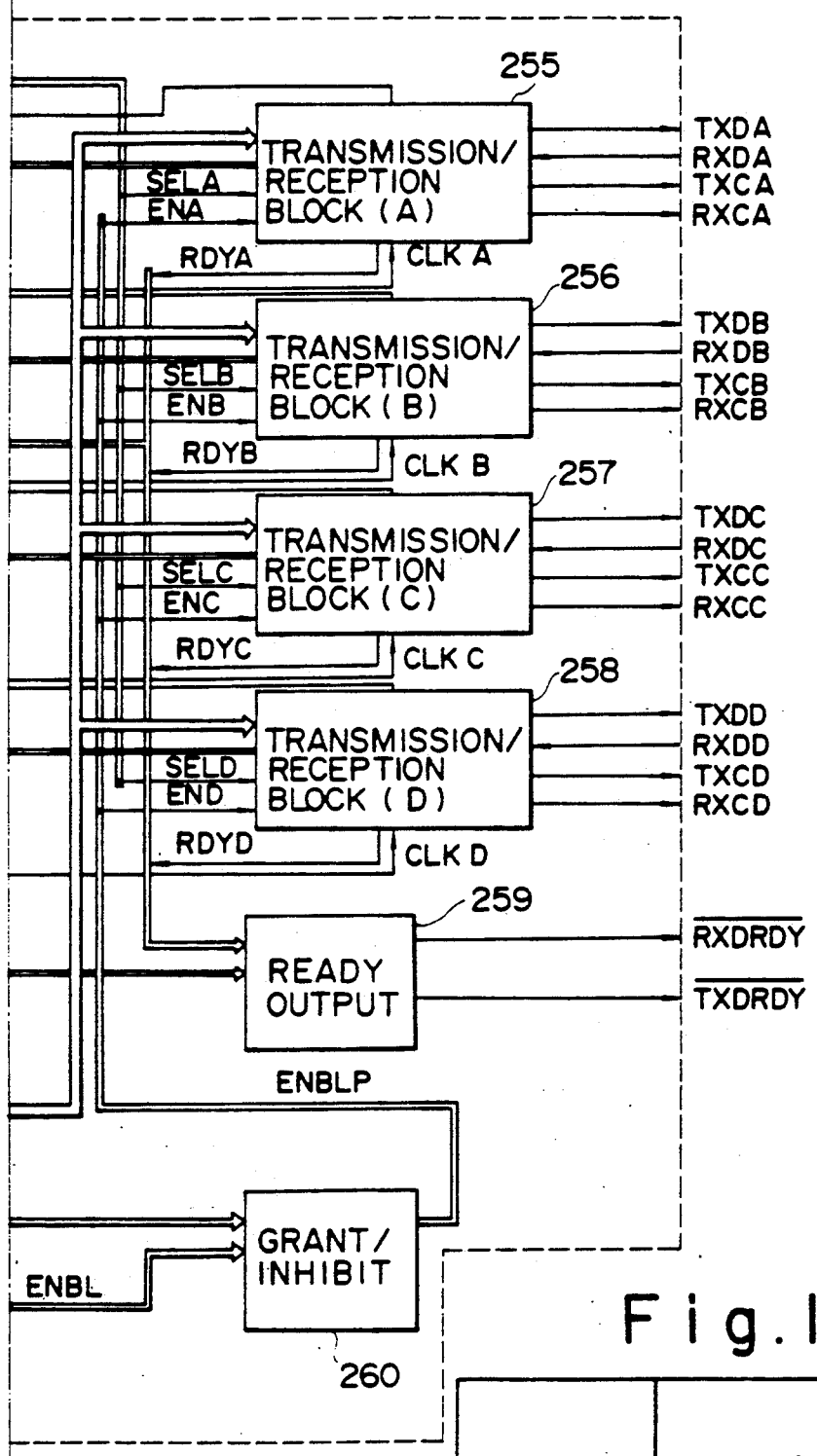

Fig. 25A

| REGISTER | b7 | b6 | b5 | b4 | b3 | b2 | b1 | b0 |
|---|---|---|---|---|---|---|---|---|
| INST 1 | RIMA / LOGICAL PORT A | RIMB / LOGICAL PORT B | RIMC / LOGICAL PORT C | RIMD / LOGICAL PORT D | TIMA / LOGICAL PORT A | TIMB / LOGICAL PORT B | TIMC / LOGICAL PORT C | TIMD / LOGICAL PORT D |
| | 0 = NON MASK  1 = MASK | | | | 0 = NON MASK  1 = MASK | | | |
| INST 2 | INIRST  0 = NO OPERATION  1 = INITIAL RESET EXECUTION | | | | ERSTA / LOGICAL PORT A | ERSTB / LOGICAL PORT B | ERSTC / LOGICAL PORT C | ERSTD / LOGICAL PORT D |
| | | | | | 0 = NO OPERATION  1 = ERROR RESET EXECUTION | | | |
| | LOGA-b1 | LOGA-b0 | LOGB-b1 | LOGB-b0 | LOGC-b1 | LOGC-b0 | LOGD-b1 | LOGD-b0 |
| INST 3 | LOGICAL PORT A | | LOGICAL PORT B | | LOGICAL PORT C | | LOGICAL PORT D | |
| | 11 : PHYSICAL PORT A  10 : PHYSICAL PORT B  01 : PHYSICAL PORT C  00 : PHYSICAL PORT D | | | | | | | |

| | | | | | | | |
|---|---|---|---|---|---|---|---|
| INST 4 | ENBLA<br>LOGICAL<br>PORT A | PHYA-DV2 | PHYA-DV1 | PHYA-DV0 | ENBLB<br>LOGICAL<br>PORT B | PHYB-DV2 | PHYB-DV1 | PHYB-DV0 |
| | 0=DISABLE<br>1=ENABLE | PHYSICAL PORT A | | 000:1/1 010:1/4 100:1/16 110:1/64<br>001:1/2 011:1/8 101:1/32 111:1/128 | 0=DISABLE<br>1=ENABLE | PHYSICAL PORT B | | 000:1/1 010:1/4 100:1/16 110:1/64<br>001:1/2 011:1/8 101:1/32 111:1/128 |
| INST 5 | ENBLC<br>LOGICAL<br>PORT C | PHYC-DV2 | PHYC-DV1 | PHYC-DV0 | ENBLD<br>LOGICAL<br>PORT D | PHYD-DV2 | PHYD-DV1 | PHYD-DV0 |
| | 0=DISABLE<br>1=ENABLE | PHYSICAL PORT C | | 000:1/1 010:1/4 100:1/16 110:1/64<br>001:1/2 011:1/8 101:1/32 111:1/128 | 0=DISABLE<br>1=ENABLE | PHYSICAL PORT D | | 000:1/1 010:1/4 100:1/16 110:1/64<br>001:1/2 011:1/8 101:1/32 111:1/128 |
| STAT 1 | RXRDYA<br>LOGICAL<br>PORT A | RXRDYB<br>LOGICAL<br>PORT B | RXRDYC<br>LOGICAL<br>PORT C | RXRDYD<br>LOGICAL<br>PORT D | TXRDYA<br>LOGICAL<br>PORT A | TXRDYB<br>LOGICAL<br>PORT B | TXRDYC<br>LOGICAL<br>PORT C | TXRDYD<br>LOGICAL<br>PORT D |
| | 0=NO RECEIVE DATA<br>1=RECEIVE DATA IN BUFFER | | | | 0=TRANSMIT BUSY<br>1=TRANSMIT READY | | | |
| STAT 2 | FREA<br>LOGICAL<br>PORT A | FREB<br>LOGICAL<br>PORT B | FREC<br>LOGICAL<br>PORT C | FRED<br>LOGICAL<br>PORT D | OVRA<br>LOGICAL<br>PORT A | OVRB<br>LOGICAL<br>PORT B | OVRC<br>LOGICAL<br>PORT C | OVRD<br>LOGICAL<br>PORT D |
| | 0=NO ERROR<br>1=FRAMING ERROR | | | | 0=NO ERROR<br>1=OVER RUN ERROR | | | |

Fig. 28

PHYSICAL TABLE

| $D_{11}$ $D_{10}$ $D_9$ | $D_8$ $D_7$ $D_6$ | $D_5$ $D_4$ $D_3$ | $D_2$ $D_1$ $D_0$ |
|---|---|---|---|
| PHYSICAL PORT A | PHYSICAL PORT B | PHYSICAL PORT C | PHYSICAL PORT D |
|  |  |  |  |
|  |  |  |  |
|  |  |  |  |

Fig. 29

LOGICAL TABLE

| $D_{11}$ $D_{10}$ $D_9$ | $D_8$ $D_7$ $D_6$ | $D_5$ $D_4$ $D_3$ | $D_2$ $D_1$ $D_0$ |
|---|---|---|---|
| LOGICAL PORT A | LOGICAL PORT B | LOGICAL PORT C | LOGICAL PORT D |
| 0 | 0 | 0 | 0 |
| 0 | 1 | 1 | 1 |
| 1 | 0 | 1 | 0 |

Fig. 32
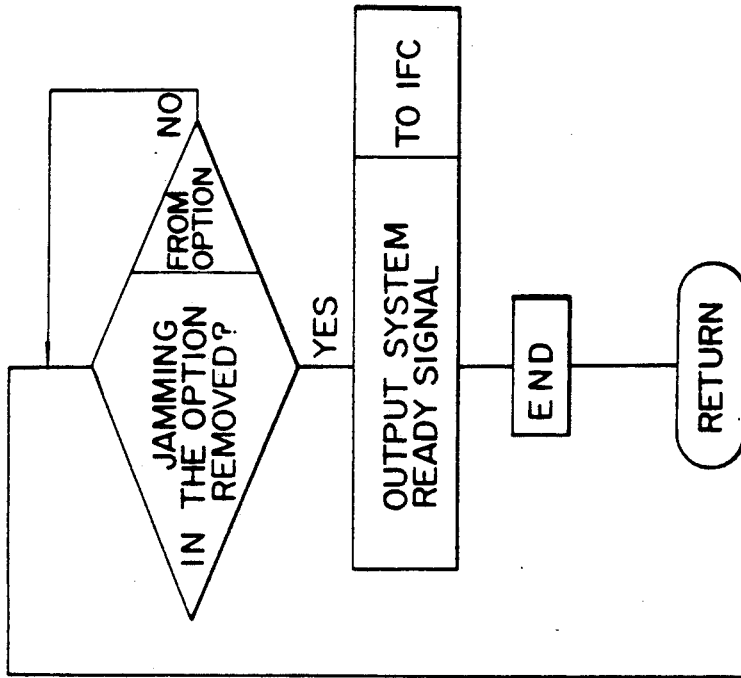
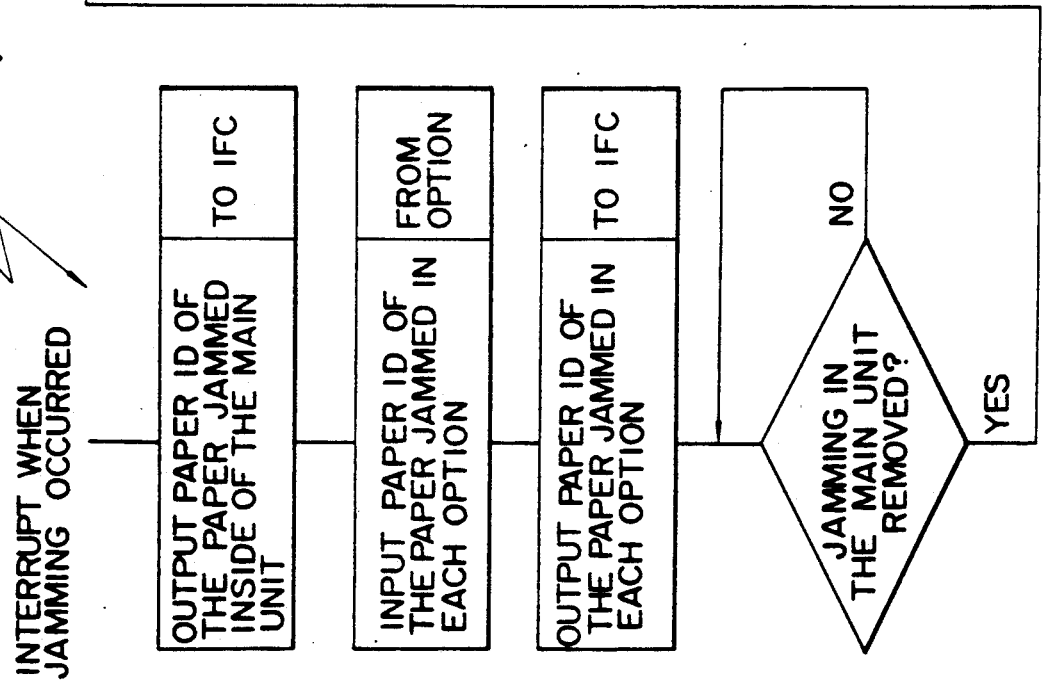

Fig. 34A | Fig. 34B (B) IFC I/F CONTROL MODULE

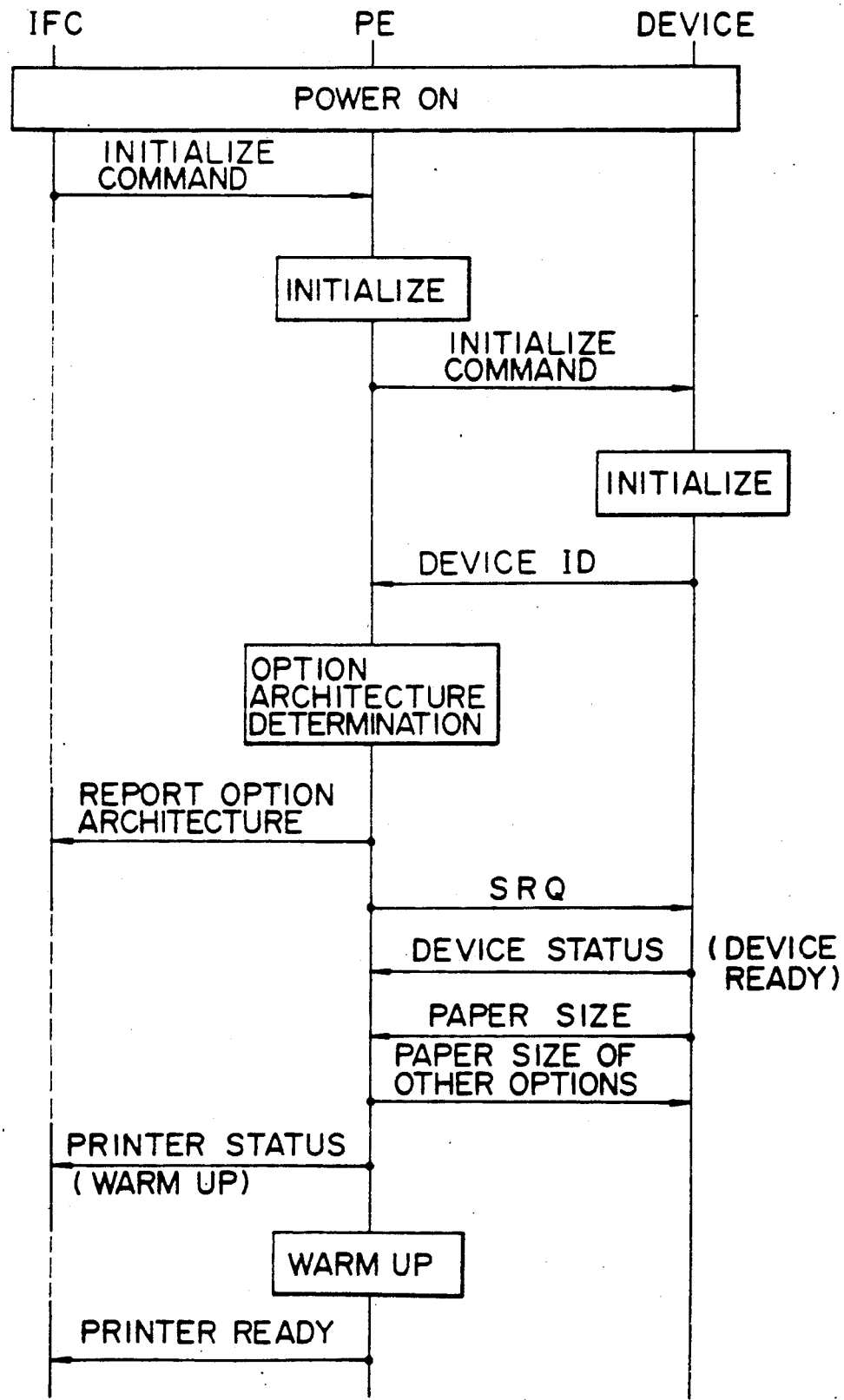

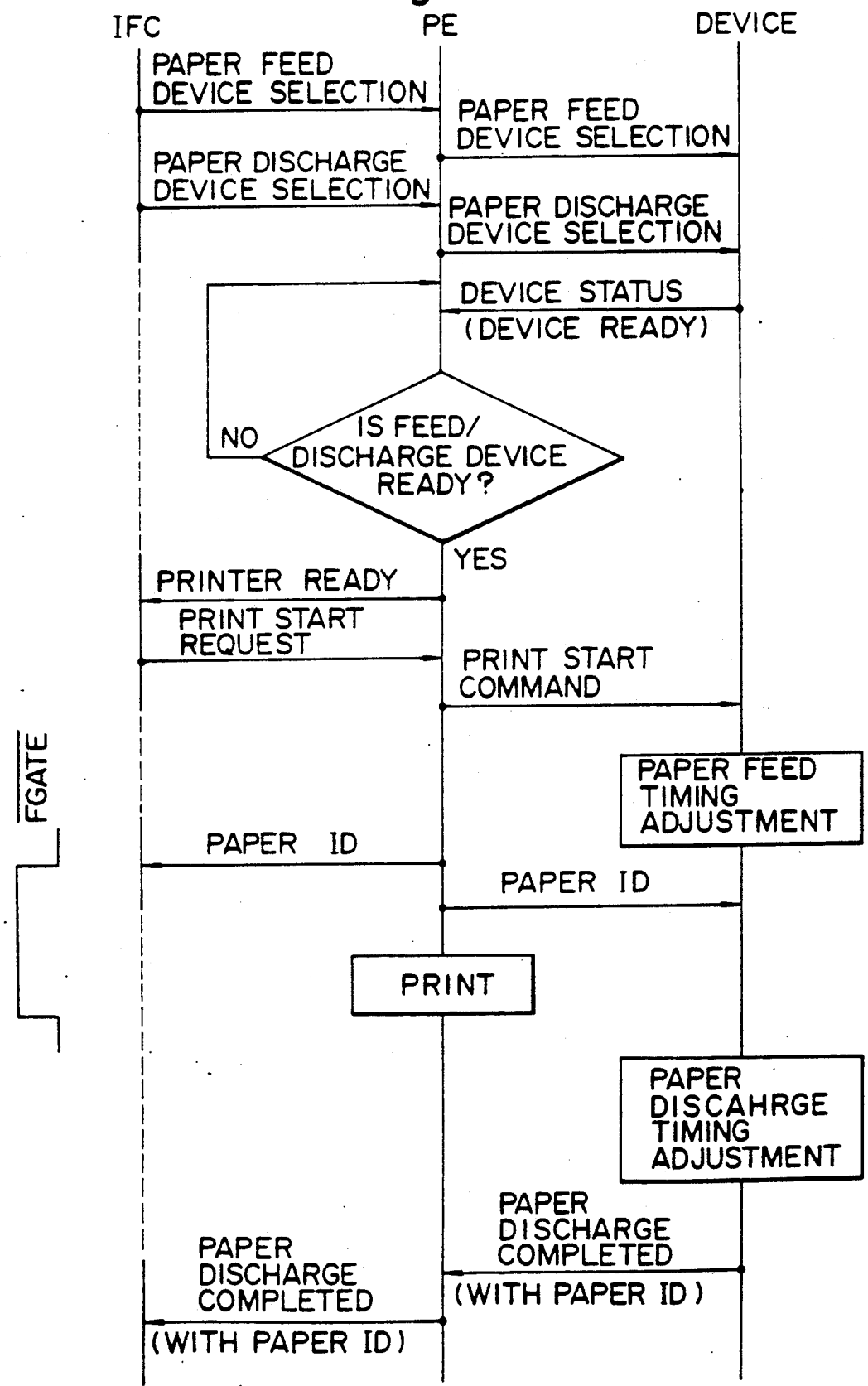

PAPER FEED DEVICE JAM

Fig. 44

| b7 | b6 | b5 | b4 | b3 | b2 | b1 | b0 |
|----|----|----|----|----|----|----|----|
| 1  |    |    |    |    |    |    |    |

- b0: DIAGNOSTICS
- b1: TEST PRINT
- b2: $\overline{\text{PRINT}}$ / FF COMMAND

Fig. 45

1st BYTE

| b7 | b6 | b5 | b4 | b3 | b2 | b1 | b0 | |
|----|----|----|----|----|----|----|----|---|
| 0  | /  |    | 0  | 0  | 0  | 0  | 0  | NO JAMMED PAPER |
|    |    |    | 1  | 0  | 0  | 0  | 0  | JAMMED PAPER INDEFINITE (PAPER DISCHARGE IN PROGRESS) |
|    |    |    | 0  | \multicolumn{4}{c|}{n ( BINARY )} | n = 1~F | n BYTE

| b7 | b6 | b5 | b4 | b3 | b2 | b1 | b0 | |
|----|----|----|----|----|----|----|----|---|
| 0  | /  |    |    | \multicolumn{4}{c|}{BINARY} | PAPER ID OF JAMMED PAPER |

Fig. 46

| b7 | b6 | b5 | b4 | b3 | b2 | b1 | b0 | |
|----|----|----|----|----|----|----|----|---|
| 0  | #6 | #5 | #4 | #3 | #2 | #1 | #0 | 1: JAMMED PAPER PRESENT<br>0: JAMMED PAPER ABSENT |

Fig.51i
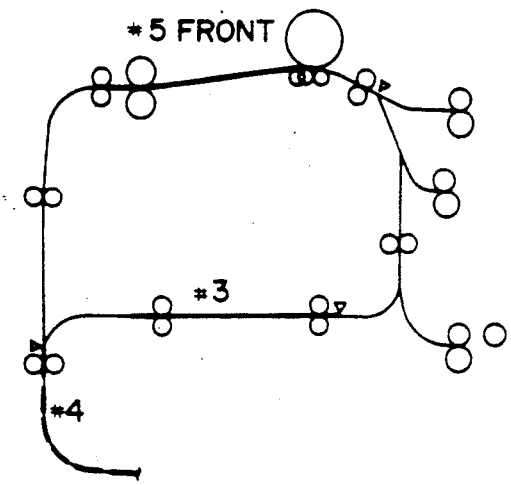
Fig.51j
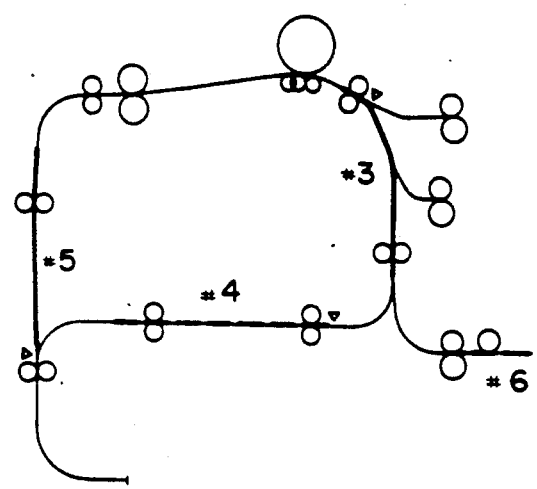
Fig.51k
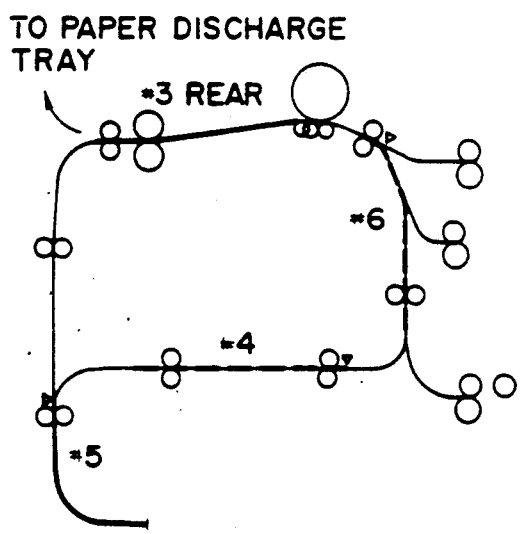
Fig.51ℓ
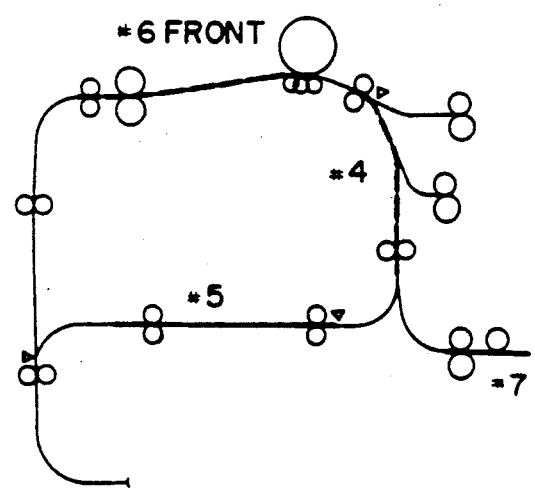

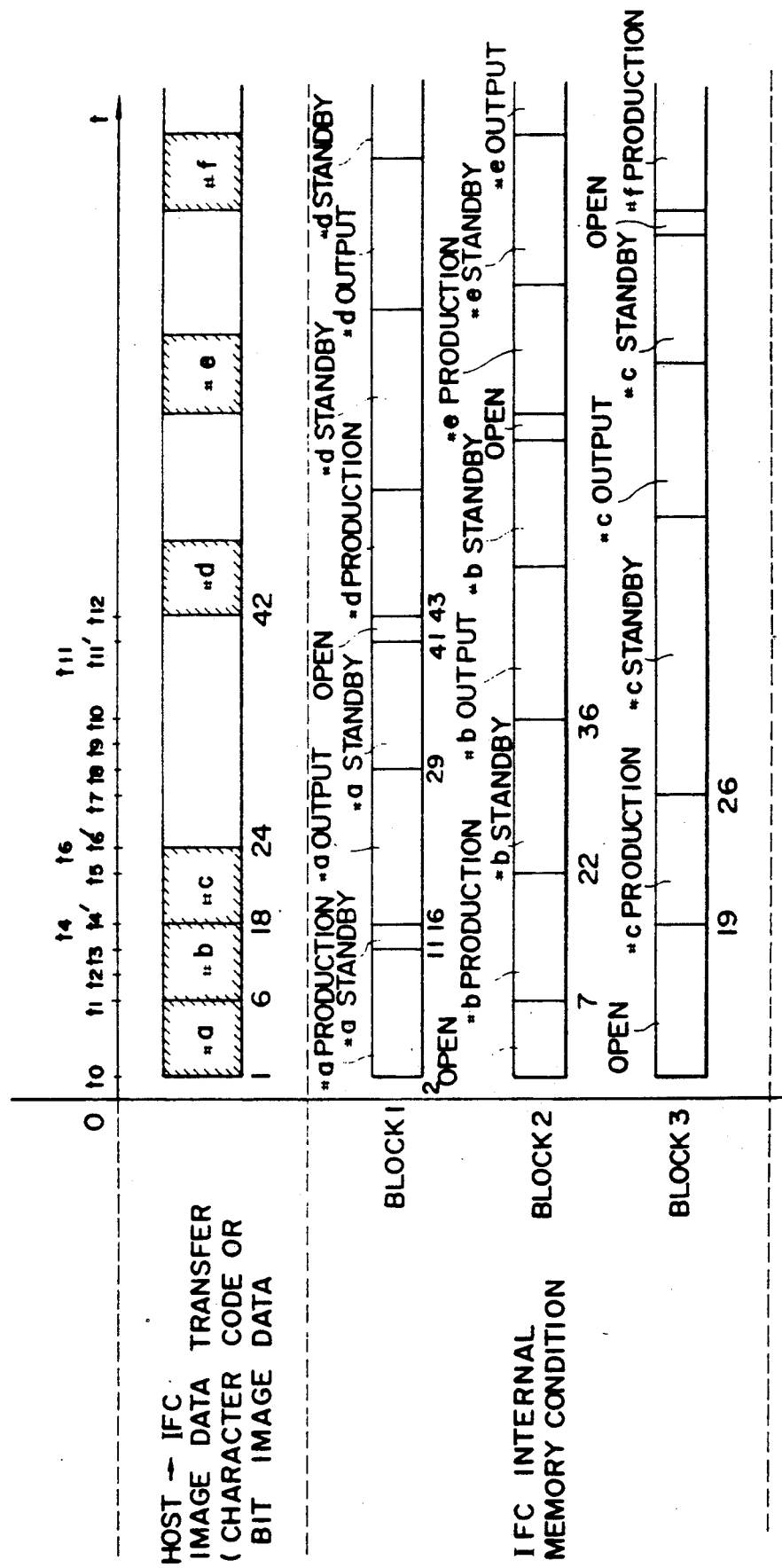

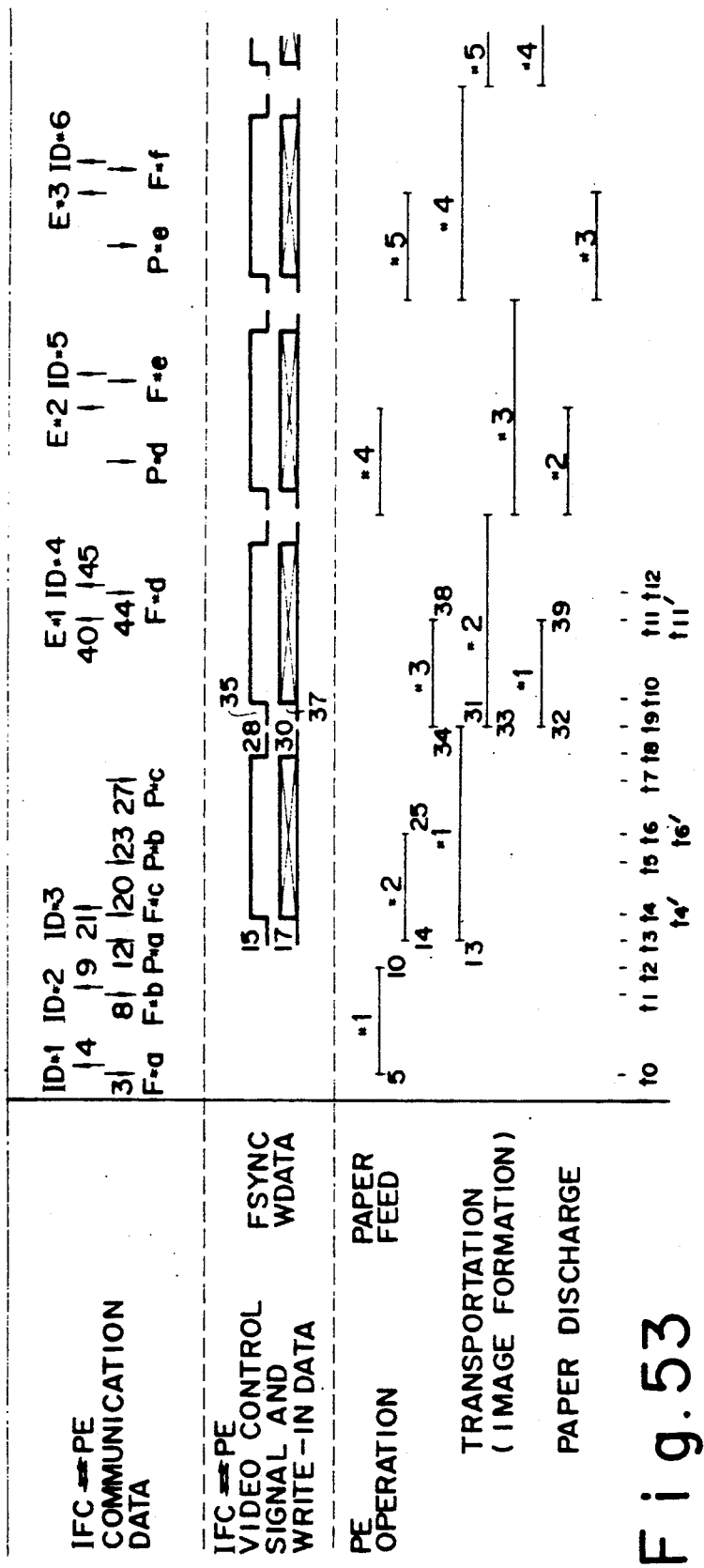

DUPLEX IMAGE FORMING SYSTEM WITH NUMBER OF SINGLE SIDE PRINTED SHEETS IN FEED PATH SELECTED BEFORE PRINTING SECOND SIDE

This is a division of application Ser. No. 161,471, filed Feb. 26, 1988, now U.S. Pat. No. 4,924,320 issued May 8, 1990.

BACKGROUND OF THE INVENTION

1. Field of the Invention

This invention generally relates to a system for forming images, such as printers, copiers and facsimiles, and in particular to an image forming system including an image forming main unit and one or more optional units operatively coupled to the main unit for forming an image in the form of a hard copy based on image information produced internally or received from an external system. In particular, the present invention relates to an image forming system in which various items of information relating to formation of an image are exchanged between the main unit and one or more of the optional units before formation of an image in the form of a hard copy.

2. Description of the Prior Art

An image forming system, such as a printer system, is being diversified in function. For this purpose, the modern image forming system has a modular type structure which includes a main unit and one or more optional or auxiliary units operatively coupled to the main unit. For example, the main unit may include a laser beam printer and the optional units may include such units as large volume paper feeding units, large volume paper discharging units, mail boxes, sorters, both side or duplex imaging units and automatic document feeders. Such a system is highly desirable because it is flexible in structure, and any desired and unique image forming architecture can be constructed by the user by selecting one or more desired optional units to be operatively coupled to the main unit.

Such an image forming system, highly flexible and responsive to the needs and demands of the user in structure, but still had disadvantages, perhaps because it is relatively new in idea. For example, since a complete image forming system is constructed by selecting one or more optional units to be connected to the main unit, there must be provided a communication path between the main unit and the selected optional units and various items of information relating to image formation must be exchanged between the main and optional units. It is a customary practice to use a multi-line connection code between the main and optional units via multi-terminal connectors so as to allow for the exchange information in a parallel communication mode. However, in such a case, as the system is expanded with addition of more optional units, there must be provided an increased number of multi-terminal connectors, some identical and some different in structure and multi-line connection codes, which is disadvantageous in many respects. For example, connections between the main and optional units become complicated and expensive, so that there is a possibility of establishing erroneous connections and skill and experience are required to establish correct connections.

SUMMARY OF THE INVENTION

In accordance with one main aspect of the present invention, there is provided an image forming system including a main unit and one or more optional units which may be operatively coupled to the main unit. A common connector usable for connection between the main unit and each of the optional units is provided to establish an operative connection between the main and optional units. A control circuit for controlling the connecting condition between the main and optional units is also provided, so that actual connection between terminals at a port of the main unit and terminals at a port of one of the optional units is established by the control circuit in accordance with the identity of the optional unit to be connected. That is, with this structure, use is made of a common connector for connecting the main unit to each of selected optional units; however, actual connection between the system bus in the main unit and the system bus in each of the optional units is established by the control circuit in accordance with the information regarding the device ID of the optional unit to be connected under the control of a CPU provided in the main unit.

In accordance with another main aspect of the present invention, there is provided an extended image forming system including a both side processing unit for forming an image on both sides of a sheet of recording material, such as paper. The both side processing unit connected to the main unit, such as a laser beam printer, includes means for inverting or turning upside down a sheet of recording medium during its transportation. In this extended system, a loop path is defined between the main and both side units so that a sheet of recording medium whose front surface has been processed by imaging means provided in the main unit is once again transported through the main unit but this time passes inverted through the both side unit, to thereby form another image on the back or rear side of the sheet during its second passage through the main unit. In this case, in accordance with the principle of this aspect of the present invention, there is provided an interleave mode in which a sheet of paper for forming an image on its first surface is supplied into the loop path between two sheets of paper having images on their first surfaces. In this interleave mode, an image is formed on the front surface of one sheet and then on the rear surface of the next sheet and so on at the imaging station. Thus, the interleave mode is a high-speed both side imaging mode for forming images on both sides of recording mediums.

In accordance with a further major aspect of the present invention, there is provided an image forming system which retains the information regarding the identity of a recording medium, typically paper, while it is being processed. Such retention of paper ID information is advantageous in many respects, in particular in the recovery process after the occurrence of paper jamming. Such a paper ID scheme is applicable both to single side and both side imaging modes.

It is therefore a primary object of the present invention to provide an improved image forming system highly flexible and easy in designing its architecture in accordance with specific needs and applications.

Another object of the present invention is to provide an improved image forming system including a main unit and one or more optional or auxiliary units which may be operatively coupled to the main unit without difficulty and complication.

A further object of the present invention is to provide an improved image forming system which can be easily expanded or contracted without requiring skill and experience.

A still further object of the present invention is to provide an improved image forming system high in speed, versatile in functionality and yet low at cost.

A still further object of the present invention is to provide an improved image forming system having an extensive jam back-up function.

A specific object of the present invention is to provide a modular-type laser imaging system including a laser printer main unit and one or more optional units, such as a large volume paper supplying unit and a duplex or both side copying unit, which may be selectively and operatively coupled to the main unit.

Other objects, advantages and novel features of the present invention will become apparent from the following detailed description of the invention when considered in conjunction with the accompanying drawings.

BRIEF DESCRIPTION OF THE DRAWINGS

FIG. 10 is an illustration showing how to combine FIGS. 10A and 10B;

FIGS. 10A and 10B, when combined as shown in FIG. 10, define a similar block diagram showing also the internal structure of the engine driver PCB;

FIG. 11 is a block diagram showing an example of the device distributed control type;

FIGS. 15 and 16 are illustrations showing how to combine FIGS. 15A through 15C and FIGS. 16A and 16B, respectively;

FIGS. 15A through 15C and FIGS. 16A and 16B, when combined as shown in FIGS. 15 and 16, respectively, are schematic illustrations showing the connecting condition between the engine driver PCB and each of associated PCBs, loads and sensors in accordance with one embodiment of the present invention;

FIG. 18 is a timing chart which is useful for understanding, in particular, the read timing in the structure shown in FIG. 17;

FIG. 19 is an illustration showing how to combine FIGS. 19A through 19C;

FIGS. 19A through 19C, when combined as shown in FIGS. 19, define a block diagram showing a specific example of the communication control interface circuit 150;

FIG. 25 is an illustration showing how to combine FIGS. 25A and 25B;

FIGS. 25A and 25B, when combined as shown in FIG. 25, define an illustration showing a register map illustrating the data storing condition of each of the registers shown in FIG. 19;

FIG. 27 is an illustration showing how to combine FIGS. 27A and 27B;

FIGS. 28 and 29 are illustrations showing the structure of physical and logical tables in the memory area of the CPU in the main unit;

FIGS. 30 through 32 are flow charts showing a sequence of steps relating to the so-called paper ID in the CPU of the main unit;

FIGS. 37 through 41, wherein FIGS. 39 and 40 are illustrations showing how to combine FIGS. 39A and 39B and FIGS. 40A and 40B, respectively, are timing charts which are useful for understanding the contents of communications among the print engine, interface circuits and related devices and the operation of each of these units;

FIGS. 42 and 43, wherein FIG. 43 is an illustration showing how to combine

FIG. 44 is an illustration showing one example of format for the arguments of an initialize command;

FIGS. 45 and 46 are illustrations showing the response format of the number of jammed sheets and their paper ID and the response format of the location of jammed sheet, respectively, from the print engine to IFC at the time of occurrence of paper jamming;

FIGS. 51a through 51l are illustrations which are useful for understanding the sequence of steps in a printing process in accordance with third both side print mode MODE 3 of the present invention;

FIG. 53 is an illustration showing how to combine FIGS. 53A and 53B; and

FIGS. 53A and 53B, when combined as shown in FIG. 53, define a timing chart which is useful for understanding the image forming operation with assignment of paper ID information in accordance with one embodiment of the present invention.

DESCRIPTION OF THE PREFERRED EMBODIMENTS

Now, with reference to the attached drawings, the present invention will be described in detail by way of embodiments.

SYSTEM ARCHITECTURE

FIGS. 1a through 1f illustrate several possible system architectures which may be realized by combining a main unit with one or more of optional or auxiliary units different in structure and function selectively in accordance with one embodiment of the present invention. In the illustrated embodiment, the main unit includes a laser printer and thus the overall system is constructed as a modular type laser printer system. It is to be noted that in these drawings the direction of transportation of a sheet of recording paper is indicated by the dotted line with an arrow.

Figure 1A:
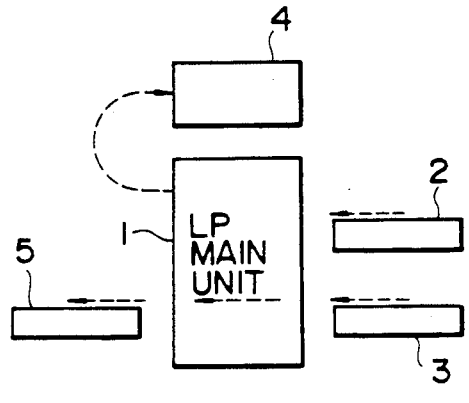
FIGS. 1a through 1f are schematic illustrations showing various possible architectures of a laser printer system embodying the present invention.
Figure 1B:
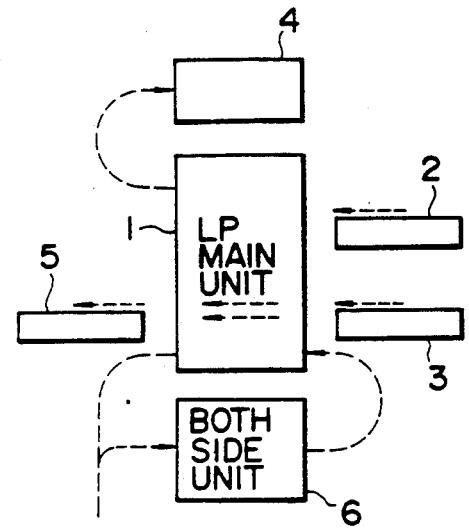
Figure 1C:
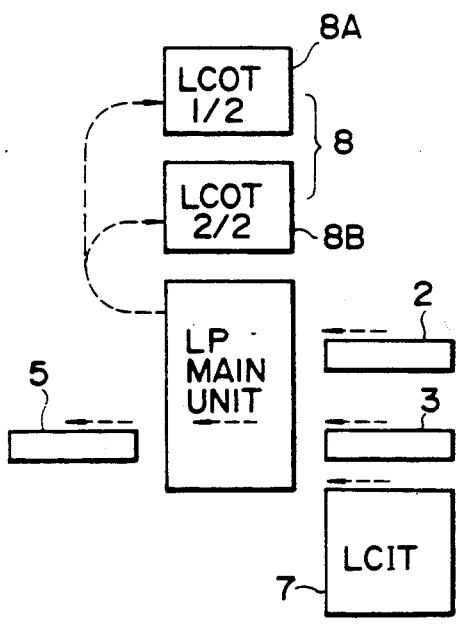
Figure 1D:
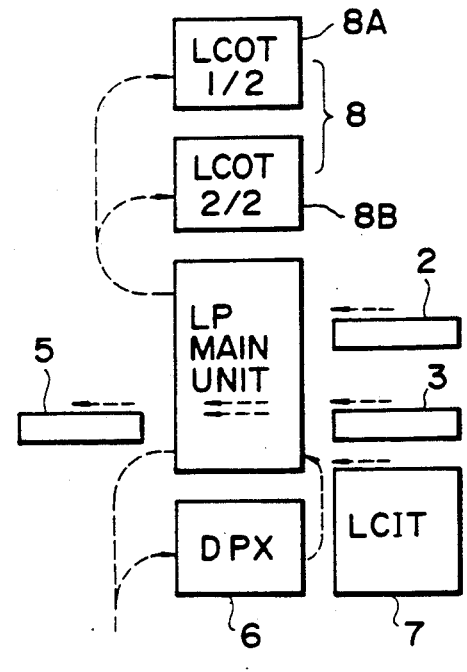
Figure 1E:
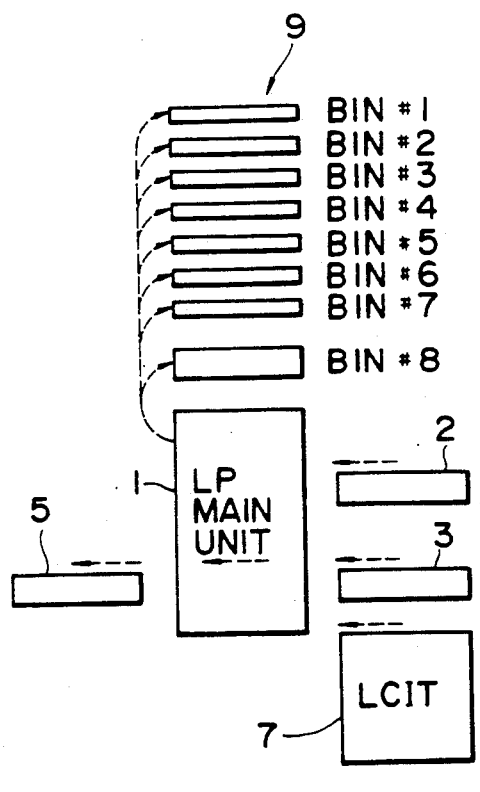
Figure 1F:
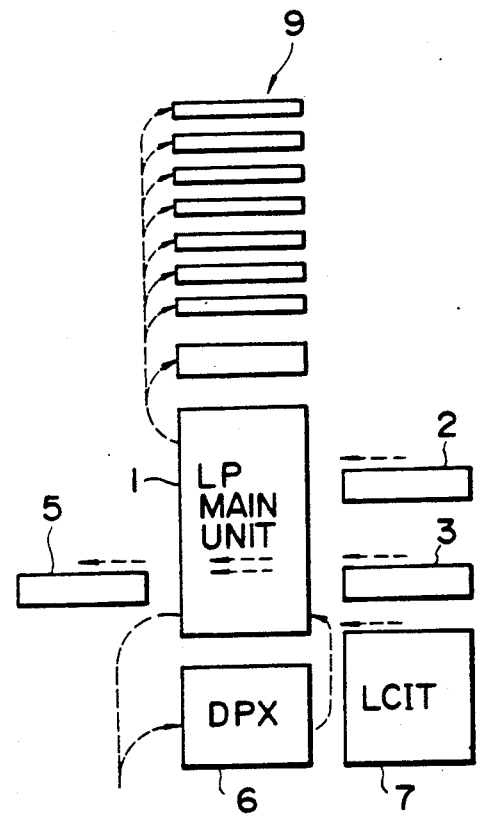

FIG. 1a illustrates the basic structure of the present laser printer system, and it includes a laser printer (LP) main unit 1, an upper paper cassette 2, a lower paper cassette 3, a standard and upper paper discharge unit 4 and a lower paper discharge tray 5 for receiving paper higher in stiffness, such as envelopes. FIG. 1b illustrates an architecture which is obtained by adding a duplex or both side processing unit 6 for printing images on both sides of a sheet of paper to the structure shown in FIG. 1a. FIG. 1c illustrates another architecture which is obtained by adding a large volume paper feed unit LCIT 7 and replacing the standard paper discharge unit 4 with a large quantity paper discharge unit LCOT 8 having a pair of upper and lower paper discharge sections 8A and 8B. FIG. 1d shows a further architecture which is obtained by adding the both side processing unit 6 to the architecture shown in FIG. 1c. FIG. 1e illustrates a still further architecture which is obtained by replacing the large volume paper discharging unit 8 with a mail box unit MB 9 having eight bins #1 through #8 in the architecture shown in FIG. 1c. FIG. 1f illustrates a still further architecture which is obtained by further adding the both side processing unit 6 to the architecture shown in FIG. 1e.

In this manner, in accordance with the present laser printer system, various system architectures can be established by selectively coupling one or more of optional units, including both side processing unit 6, large quantity paper feed unit 7, large quantity paper discharge unit 8 and mail box unit 9 to the laser printer main unit 1. The detailed structure of the laser printer main unit 1 and each of the optional units will be described later.

OUTER APPEARANCE AND MECHANICAL STRUCTURE

Figure 2:
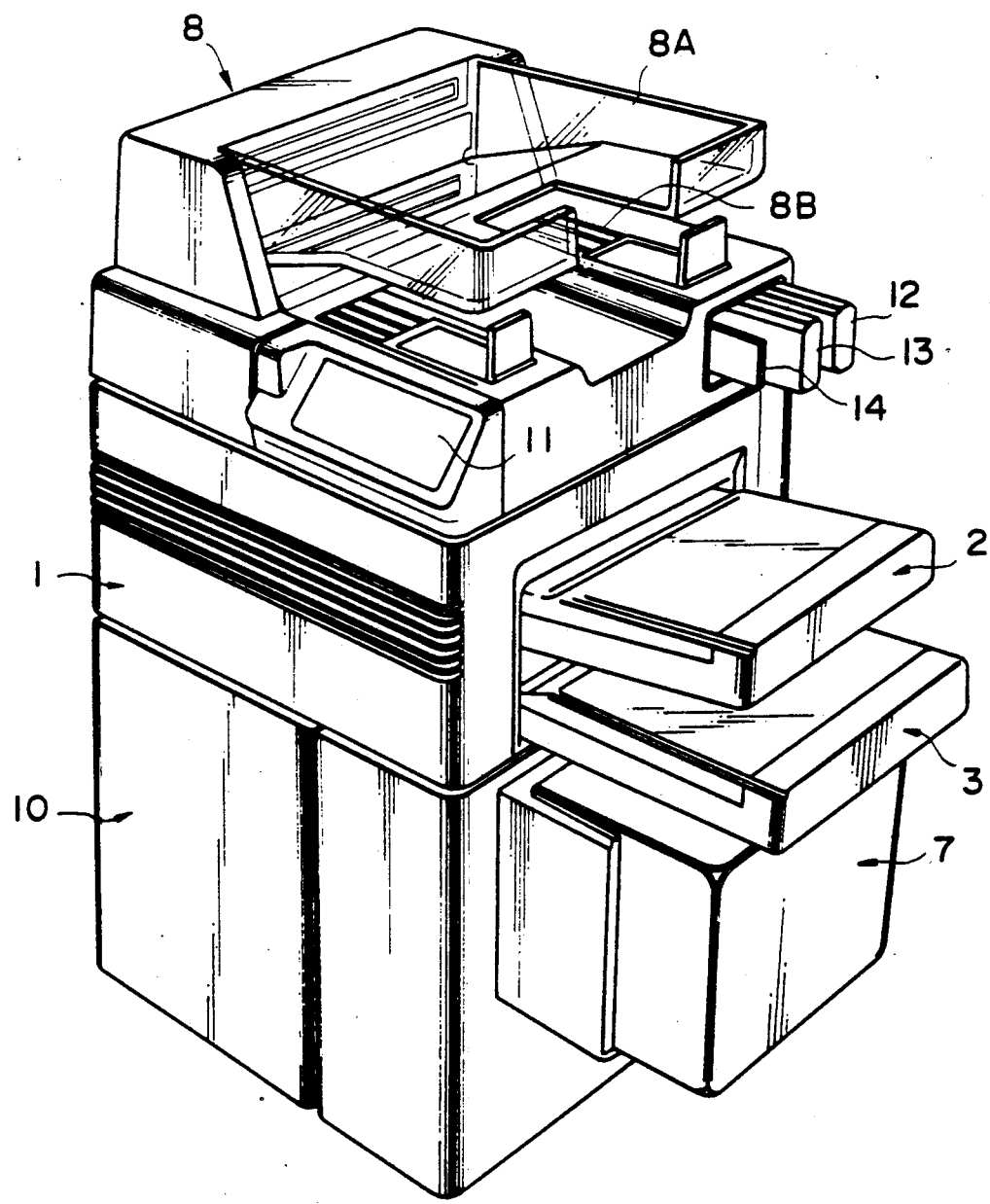
FIG. 2 is a schematic, perspective view showing the outer appearance of the laser printer system having the architecture illustrated in FIG. 1d.

FIG. 2 is a perspective view showing an example of the outer appearance of the printer system shown in FIG. 1d and corresponding elements are designated by corresponding numerals. As shown, the laser printer system shown in FIG. 2 includes a table 10 which contains therein a part of the large quantity paper feed unit 7 and the both side processing unit 6 shown in FIG. 1d. Also shown in FIG. 2 is a control/display panel 11 which is disposed at top of the laser printer main unit 1 and whose structure will be described in detail later. Font cartridges 12 and 13 are detachably inserted into the laser printer main unit 1 and they include one or more RAMs and ROMs which store various kinds of font data. An emulation card 14 is also shown as detachably inserted into the laser printer main unit 1, and when the emulation card 14 is inserted into the laser printer main unit 1 as shown in FIG. 2, an emulation function corresponding to the type of a host system is provided, so that an operation similar to that of a dot printer or dasy wheel printer may be given.

Figure 3:
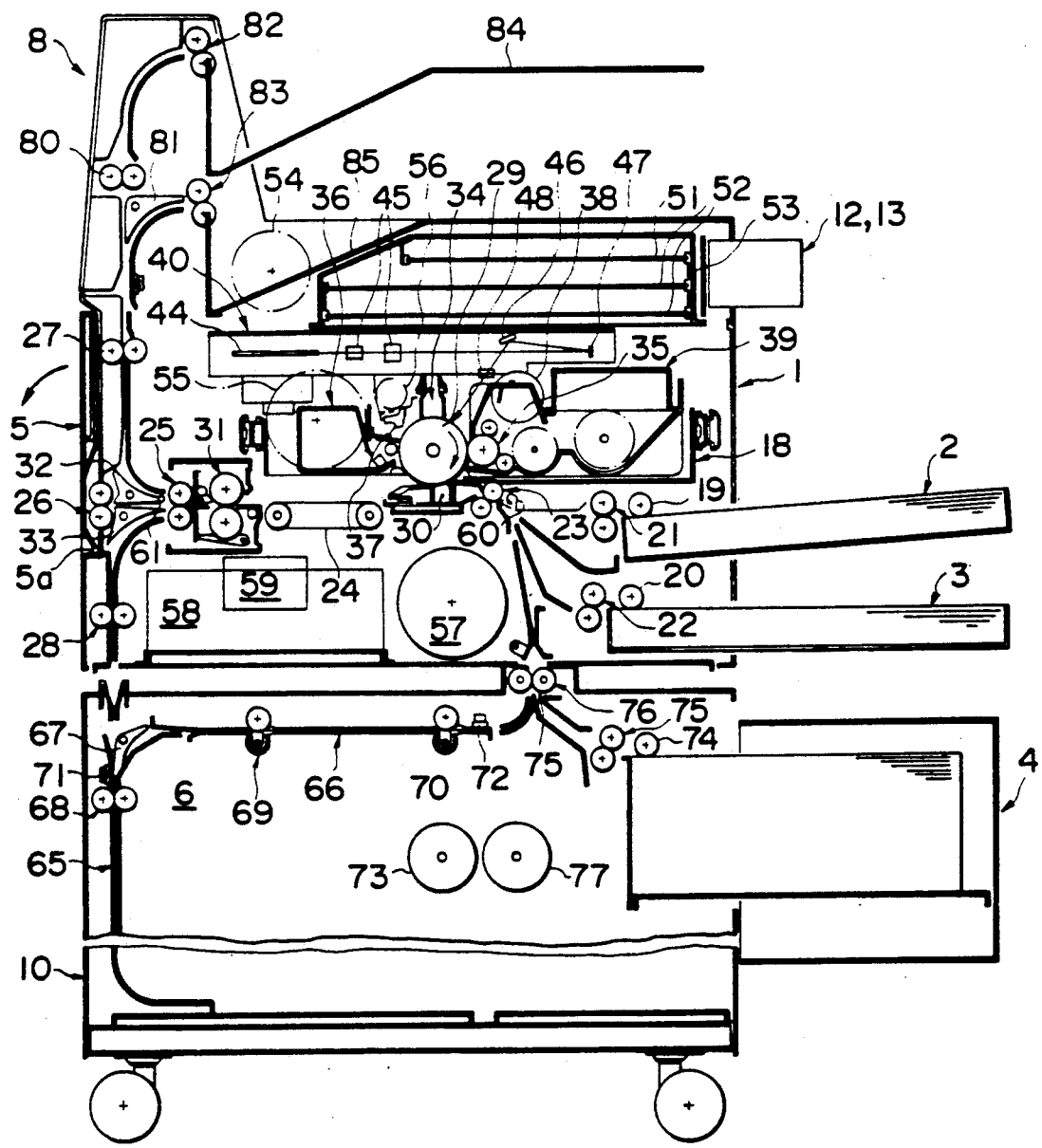
FIG. 3 is a schematic illustration showing in detail the internal structure of the laser printer system of FIG. 2.

Referring now to FIG. 3, the internal mechanical structure of the present laser printer system will be described. The laser printer main unit 1 houses therein a pair of pick-up rollers 19 and 20, which are spaced apart from each other vertically, two pairs of paper feed rollers 21 and 22 and a pair of registration rollers 23. A first paper feed path is defined as extending from an upper paper feed station where the paper pick up roller 19 and the pair of paper feed rollers 21 are disposed to the pair of registration rollers 23. Similarly, a second paper feed path is defined as extending from a lower paper feed station where the paper pick up roller 20 and the pair of paper feed rollers 22 are disposed to the pair of registration rollers 23. Thus, the first and second paper feed paths merge at a location immediately in front of the pair of registration rollers 23. Also provided inside of the laser printer main unit 1 include a transportation belt 24, a pair of transportation rollers 25, a pair of paper discharge rollers 26, a pair of upper transportation rollers 27 and a pair of lower transportation rollers 28. A number of guide plates are also provided to define a paper transportation path together with the elements described above.

An OPC photosensitive drum 29 is rotatably provided as disposed above a transportation path defined between the registration rollers 23 and the transportation belt 24. An image transfer corona unit 30 is disposed below the drum 29, and an image fixing unit 31 is disposed between the transportation belt 24 and the transportation rollers 25. In addition, a pair of path switching pawls 32 and 33 is disposed between the transportation rollers 25 and the paper discharge rollers 26. Around the drum 29 are disposed various imaging devices, including a corona charger 34, a developing device 35, a cleaning device 36 and a charge removing light-emitting diode 37. The developing device 35 is mounted on a drawer 18, together with a developing motor 38, a toner cartridge 39 and the cleaning device 36. Above the drum 29 and its associated imaging devices is disposed a laser write-in unit 40 which includes a polygon mirror 44 for deflecting a laser light beam from a semiconductor laser (not shown in FIG. 3), a fθ lens 45, a first mirror 47, a second mirror 46 and a dust-proof glass 48. The detailed structure of this laser write-in unit 40 will be described later.

Above the laser write-in unit 40 is disposed a printed circuit board or PCB rack 53 which encloses therein a print engine board 51 and a pair of interface controller or IFC boards 52. The laser printer main unit 1 is also provided with a PCB pack fan 54, a main fan 55 and an ozone fan 56. On the other hand, below the paper transportation path described above are disposed a main motor 57 for rotatably driving the photosensitive drum 29 and various rollers described above, a high voltage power supply unit 59 for applying a high voltage to various corona devices described above, etc. The upper and lower paper feed cassettes 2 and 3 are detachably mounted in the laser printer main unit 1. The rear paper discharge tray 5 is set in its upright position as shown in FIG. 3 when not in sue and it is pivotted to its horizontal position around a shaft 5a as indicated by the arrow when in use. A registration sensor 60 and an image fixing station exit sensor 61 are also provided.

The table 10 contains therein the both side unit (DPX) 6 which is provided with an inversion path 65, a standby path 66, a paper path switching pawl 67, three sets of transportation rollers 68, 69 and 70, each provided with a clutch, a both side unit entrance sensor 71, a both side unit exit sensor 72 and a both side drive motor 73. The table 10 is also provided with a paper pick-up roller 74 and paper feed rollers 75 for feeding a sheet of paper supplied from the large quantity paper feed unit (LCIT) 7. In addition, the table 10 is also provided with paper feed rollers 76 commonly used between the both side unit 6 and the large quantity paper feed unit 7 and with an LCIT drive motor 77. It is to be noted that, although not shown, the large quantity paper feed unit 7 is also provided with a mechanism for moving the paper stored therein upward or downward and with a drive motor therefor.

On the other hand, the large quantity paper discharge unit (LCOT) 8 is provided with transportation rollers 80, a paper path switching pawl 81, upper stage paper discharge rollers 82, lower stage paper discharge rollers 83, an upper stage paper discharge tray 84 and a lower stage paper discharge tray 85. In addition, although not show specifically, the large quantity paper discharge unit (LCOT) 8 is also provided with a mechanism for moving two stages of paper discharge trays 84 and 85 in the widthwise direction so as to shift the paper discharging location, its driving motor (job separation motor), and various switches and sensors.

Regarding a control system for this laser printer system, which will be described in greater detail later, data, such as image data, supplied from a host system, such as a computer, work station or word processor, is input into the print engine board 51 through the IFC board 52, and then the data is processed at the print engine board 51 to select a desired paper feed path and also a desired paper discharge path. And, then, in response to a print start request signal, a print operation is initiated. Upon initiation of a print sequence, one of the pick-up rollers 19, 20 and 74 is driven to rotate at a predetermined timing so that feeding of a sheet of paper is initiated by a selected one of the upper paper feed cassette 2, lower paper feed cassette 3 and large volume paper feed cassette (LCIT) 4. The sheet of paper thus fed is then transported by the respective pair of transportation rollers 21, 22 and 75 until its leading edge comes into abutment against the registration rollers 23, at which condition the transportation of the sheet of paper is temporarily halted.

On the other hand, the photosensitive drum 29 is driven to rotate at constant speed in the direction indicated by the arrow, and during its rotation, the drum 29 is uniformly charged to a predetermined polarity by the corona charging device 34 and exposed to a laser beam modulated with image data by the laser write-in unit 40, so that the uniform charge is selectively dissipated to thereby form an electrostatic latent image corresponding in pattern to the image data on the drum 29. In this case, the laser beam is scanned repetitively across the width of the drum, i.e., in the main scanning direction, while the drum 29 is in rotation, i.e., moving in the auxiliary scanning direction. The latent image thus formed is then developed by the toner supplied by the developing device 35 to thereby form a toner image which in turn is transferred to a sheet of paper, which is fed at a predetermined timing by the registration rollers 23, by the image transferring device 30 at an image transferring station where the sheet of paper is brought into contact with the drum 29. The sheet of paper bearing thereon the thus transferred toner image is then separated from the drum 29 and then transported to the image fixing device 31, riding on the transportation belt 24, where the transferred image is permanently fixed to the sheet of paper. Thereafter, the sheet of paper having thereon the fixed toner image is transported out to an intended paper discharge unit after passing through the paper discharge rollers 25. That is, the sheet of paper is transported through a paper discharge path selectively established by the positions of the paper path switching pawls 32, 33 and 81 and discharged to a selected one of the upper and lower paper discharge trays 84 and 85 of the large volume paper discharge unit 8 and the rear paper discharge tray 5. It is to be noted that normally one of the trays in the large volume paper discharging unit 8 is selected to discharge paper with its face down; however, in the case where use is made of stiffer paper, such as envelopes and postcards, the rear paper discharge tray 5 is selected for use. However, if the rear paper discharge tray 26 is not set in its operative position i.e. pivotted to its operative horizontal position as indicated by the arrow in FIG. 3, the rear paper discharge tray 5 cannot be selected for use.

In the case where a both side print mode has been selected, a sheet of paper which has its first or front surface printed is transported into the both side processing unit 6 within the table 10 by the lower transportation rollers 28. The sheet of paper is then transported into the inversion path 65 over a predetermined distance, and the sheet of paper is halted in motion and again transported, this time in the reversed direction, into the standby path 66 where the sheet of paper is again halted in motion to set in a standby status. Thereafter, the sheet of paper in the standby status is transported into the laser printer main unit 1 at a predetermined timing by the paper feed rollers 76. Thus, the second or rear surface of the sheet of paper is presented for printing as the sheet of paper moves past the drum 29 and then the sheet of paper having its both sides printed is discharged to a selected one of the paper discharging locations.

CONTROL/DISPLAY PANEL

Figure 4:
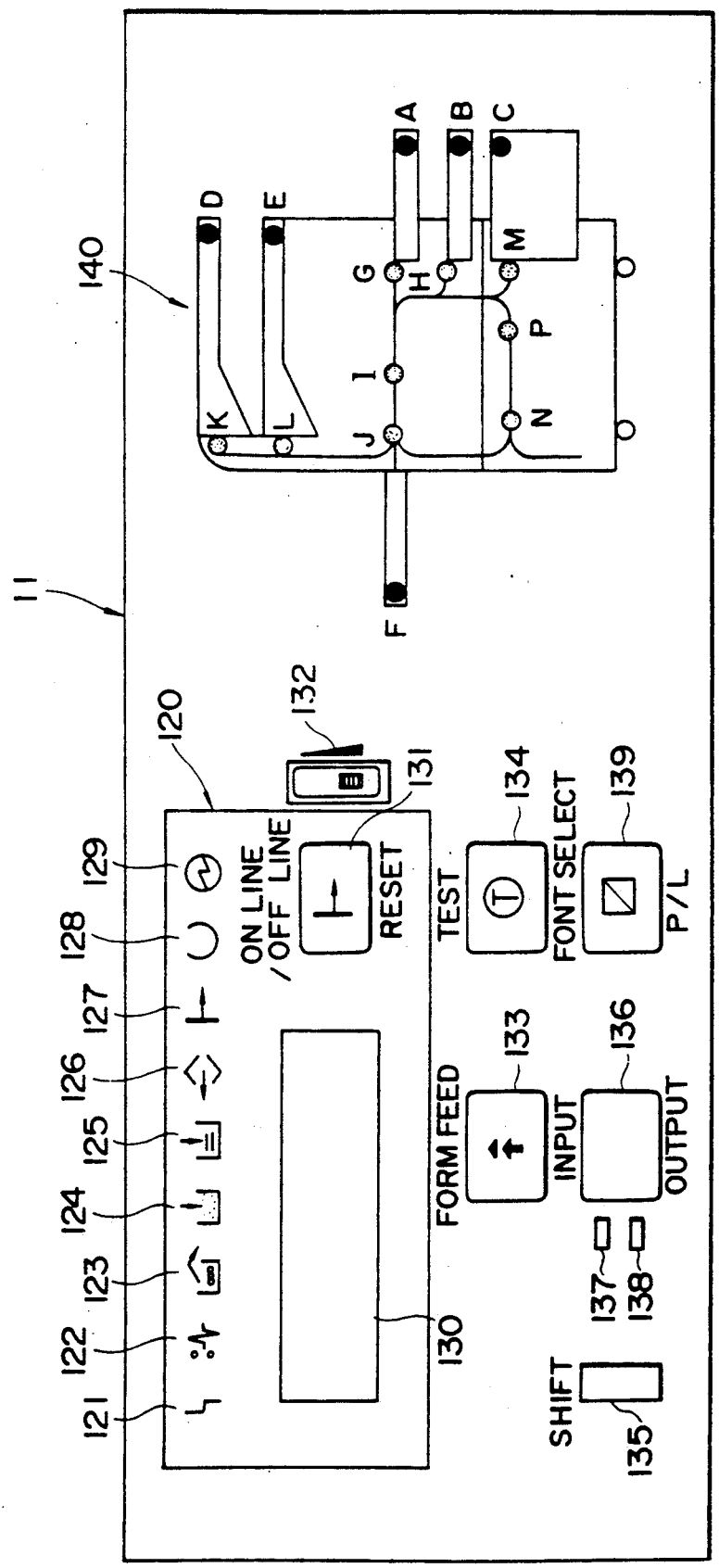
FIG. 4 is an illustration showing in detail the control/display panel provided in the laser printer system of FIG. 2.

The detailed structure of the control/display panel 11 of FIG. 2 is shown in FIG. 4. As shown, the control/display panel 11 includes an indicator 120 which is provided with various pictorial signs 121–129, which are illuminated by lighting corresponding light-emitting diodes, a liquid-crystal display (LCD) 130 and an on line/off line selection switch 131. The pictorial signs include an error sign 121, such as an IFC error, a jam occurrence sign 122, a photosensitive drum life sign 123, a toner scarcity sign 124, a paper end sign 125, an image data presence sign 126, an on line/off line sign 127, a warming up sign 128 and a power on sign 129. The LCD display 130 is, for example, a character display of 2 lines by 32 characters, which can display supplemental explanation and various messages Also provided in the control/display panel 11 include a light intensity adjusting knob 132 for adjusting the intensity level of the LCD display 130 and a form feed switch 133. When the form feed switch 133 is depressed while the image data presence sign 126 is lit, the internal data is printed on paper which is then discharged.

A test switch 134 is also provided in the control/display panel 11, and when this switch 134 is depressed, the laser printer system is operated in a test mode. A shift switch 135 and a paper feed/discharge selection switch 136 are also provided. When only the switch 136 is depressed, a desired paper feed cassette is selected for operation. When the upper paper feed cassette has been selected, an upper LED 137 is lit; whereas, when the lower paper feed cassette 3 has been selected, a lower LED 138 is lit. On the other hand, if the paper feed/discharge selection switch 136 is depressed while depressing the shift switch 135, one of the paper discharge trays of the large volume paper discharge unit 8 may be selected. When the upper stage paper discharge tray 8A has been selected, the upper LED 137 is lit; whereas when the lower stage paper discharge tray 8B has been selected, the lower LED 138 is lit.

Furthermore, a font selection switch 139 is also provided, and a desired font of characters to be printed may be selected if this switch 139 alone is depressed. On the other hand, if the switch 139 is depressed together with the shift switch 135, a selection may be made between a widthwise mode, in which printed characters are arranged in the widthwise direction of a sheet of paper, and a longitudinal mode, in which printed characters are arranged in the longitudinal direction of a sheet of paper. A paper feed/discharge and jammed location display section 140 is also provided, which includes a schematic illustration of the overall structure of the present printer system, a plurality of multi-color light-emitting diodes A through F, which indicate the selection status for feeding and discharging paper, paper end and overflow, and a plurality of red-color light-emitting diodes G through P, which indicate the location of possible occurrence of paper jamming. The light-emitting diodes A, B and C are operatively connected to the upper and lower paper feed cassettes 2 and 3 and the large volume paper feed unit 7, respectively, and they are lit in green color when selected and lit in red color when a paper end condition is attained. On the other hand, the light-emitting diodes D, E and F are operatively connected to the upper and lower stage paper discharge trays 8A and 8B of the large volume paper discharge unit 8 and the rear paper discharge tray 5, respectively, and they are lit in green color when selected and changed to red color when an overflow condition is attained. The light-emitting diodes G through P are lit selectively when paper jamming has occurred at one of the following locations.

G: upper paper feed;
H: lower paper feed;
I: transportation path;
J: image fixing;
K: upper stage paper discharge of LCOT;
L: lower stage paper discharge of LCOT;
M: LCIT paper feed;
N: DPX entrance; and
P: DPX exit.

LASER WRITE-IN UNIT AND ITS CONTROL

Figure 5:
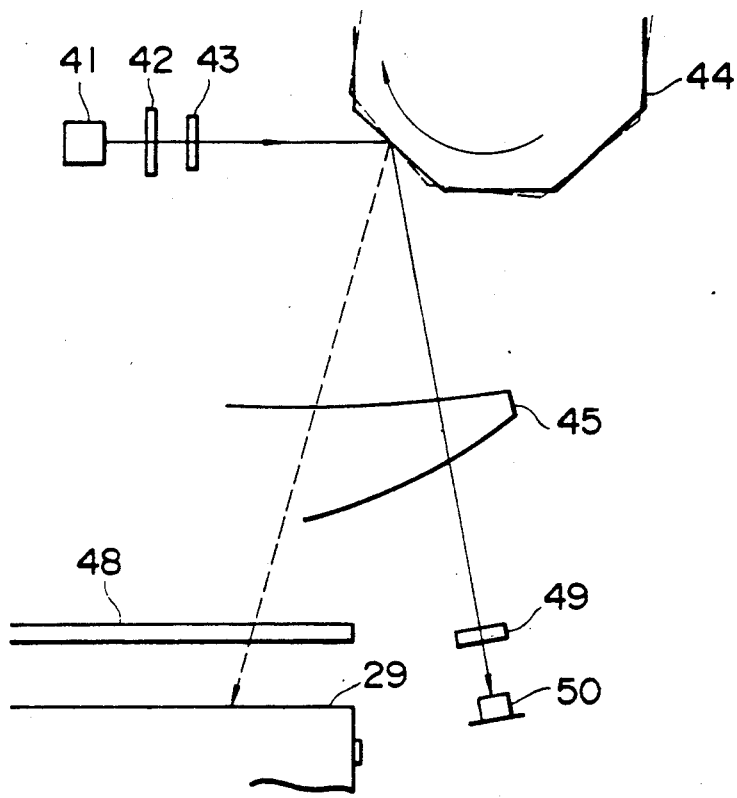
FIG. 5 is a schematic illustration showing greater detail the laser write-in unit provided in the laser printer system shown in FIG. 2.

The structure of an optical system in the laser write-in unit 40 of FIG. 3 is schematically shown in FIG. 5. As shown, a laser beam emitted from a semiconductor laser 41 is collimated by a collimator lens, which is not shown, and the thus collimated laser beam is then passed through a cylindrical lens 42 and a half wavelength plate 43 to impinge upon a rotating multi-facet mirror (polygon mirror) 44. The laser beam is thus deflected by the polygon mirror 44, which is driven to rotate at constant speed in a predetermined direction as indicated by the arrow, over a predetermined angle, and the thus deflected laser beam then passes through an fθ lens 45 and is reflected by first and second mirrors 46 and 47, respectively. Then, the laser beam passes through a dust-proof glass 48 to impinge on the photosensitive drum 29 where the beam is scanned across the width of the drum 29, i.e., in the main scanning direction, repetitively. As well known in the art, the fθ lens 45 is provided as a correction lens to keep the scanning speed of the laser beam in the main scanning direction on the drum 29 at constant. The fθ lens 45 also has a role of correcting the surface inclination of the polygon mirror 44. Also provided as shown in FIG. 5 is a sync position detecting sensor which includes a cylindrical lens 49 and a photodetector 50 disposed in the vicinity of the drum 29. The sync position detecting sensor is so disposed to receive the laser beam deflected by one facet of the polygon mirror 44 prior to scanning of the drum 29 in the main scanning direction by the laser beam deflected by that facet.

Figure 6:
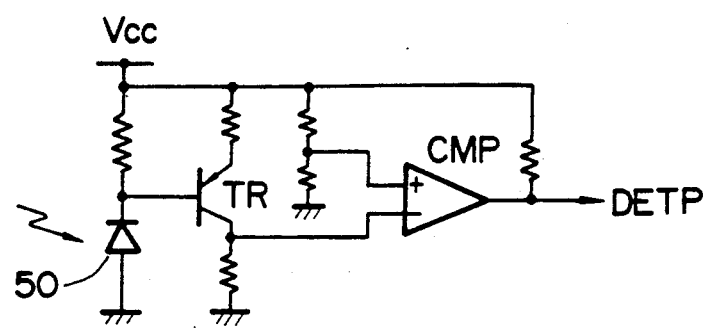
FIG. 6 is a circuit diagram showing an example of a sync signal generating circuit suitable for use with the laser write-in unit shown in FIG. 5.

FIG. 6 shows a circuit for producing a sync signal DETP and an output from the photodetector 50, which is produced when the photodetector 50 has received a laser beam, is amplified by a transistor TR and supplied to a comparator CMP which thus outputs a sync signal DETP.

Figure 7:
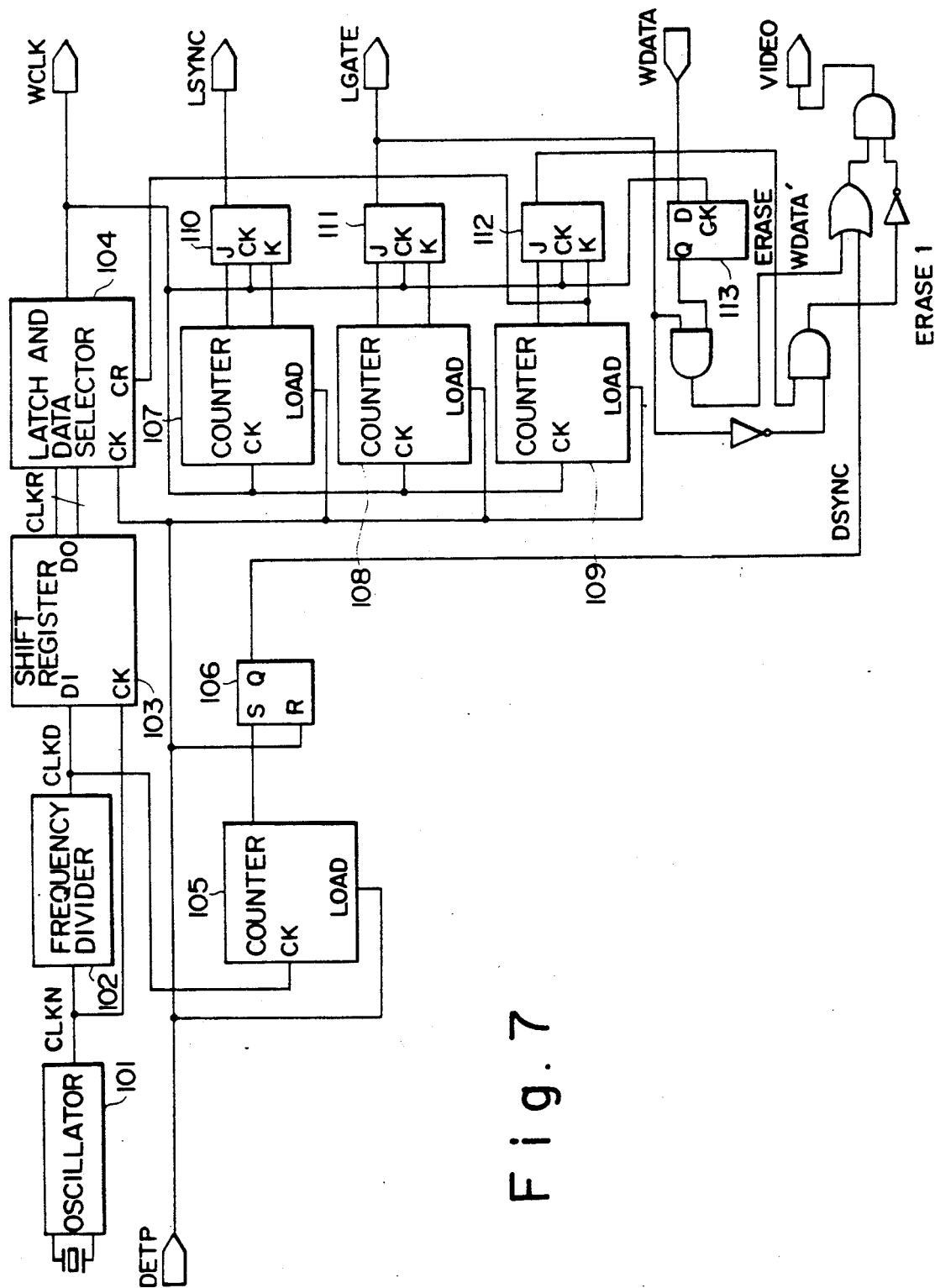
FIG. 7 is a block diagram showing an example of a write control circuit for use in the laser printer system of FIG. 2.
Figure 8:
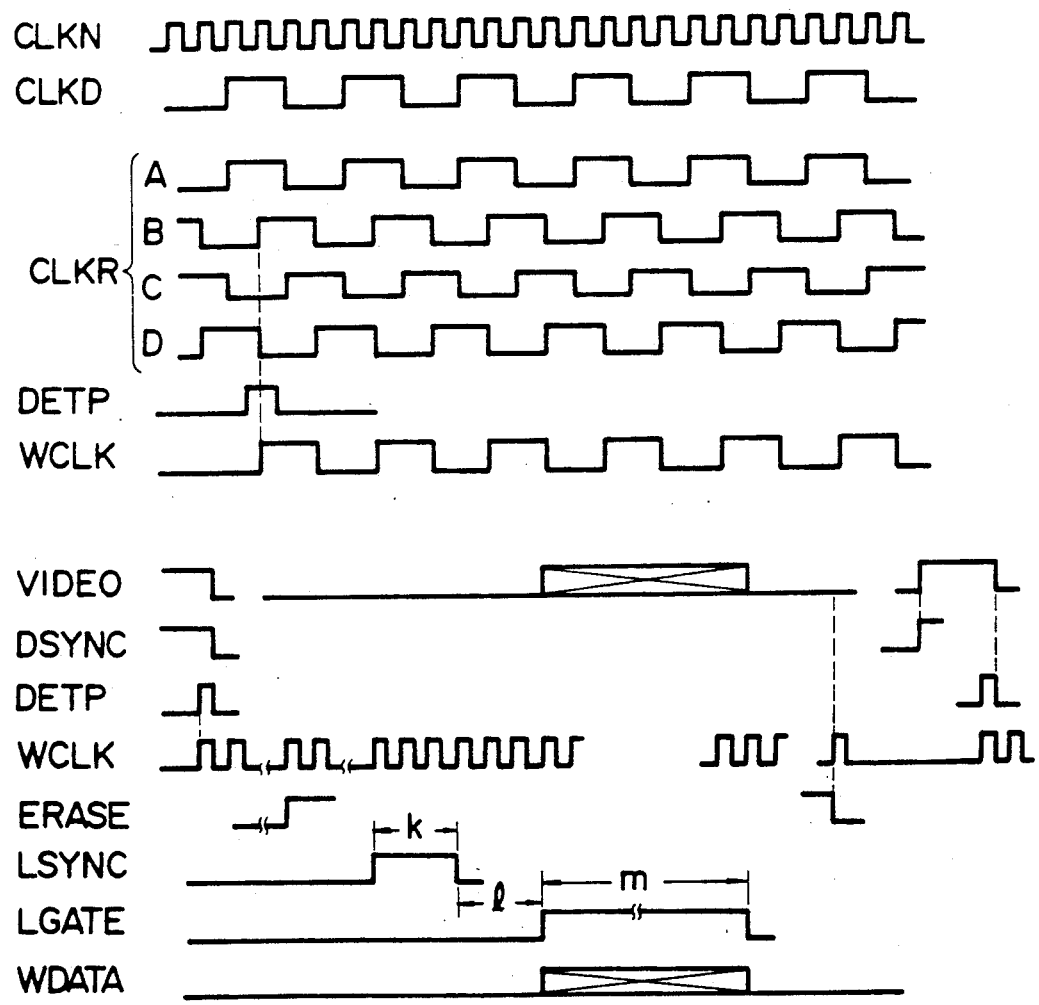
FIG. 8 is a timing chart which is useful for understanding the operation of the structure shown in FIG. 7.

FIG. 7 shows the overall structure of the write control circuit and FIG. 8 is a timing chart which illustrates the timing relationship of various signals in the write control circuit. As shown in FIG. 7, an oscillator 101 outputs a clock CLKN, which is N times the write sync clock WCLK, in response to write sync accuracy 1/N dot. The clock CLKN is frequency-divided to 1/N by a frequency divider 102 which outputs a fundamental clock CLKD of the sync clock WCLK. This fundamental clock CLKD is input into a shift register 103 which then outputs N number of clocks CLKR-A through CLKR-D which are shifted in phase from one another by the period of clock CLKN and which have the same period as that of the fundamental clock CLKD. A latch and data selector 104 selects a clock in synchronism with the input phase of a signal, i.e., sync signal DEPT, which has been obtained by wave-shaping the laser beam detection signal from the photodetector 50 among the clocks CLKR-A through CLKR-D and outputs a signal WCLK which is a write sync clock and is always corrected in phase at the accuracy of 1/N dot. It should also be noted that this signal WCLK serves as a reference clock for a write region in the main scanning direction.

Regarding a modulation signal VIDEO for the semiconductor laser 41, an output DSYNC of an S-R flip-flop 106 is rendered "true" by an output from a sync detection counter 105 so that the signal VIDEO is also rendered "true", whereby the semiconductor laser 41 is activated to emit light. Under this condition, when the laser beam is detected by the photodetector 50, the signal DETP is rendered "true" and in synchronism therewith the signal WCLK is produced. The signal DETP also causes the initial value to be loaded into the sync detection counter 105 to thereby initiate counting again and at the same time causes the S-F flip-flop 106 to be reset to thereby render the signal DSYNC "false." Because of this, the signal VIDEO is rendered "false" so that the semiconductor laser 41 is deactivated to cease emission of light. On the other hand, the signal DETP causes counters 107 through 109 for producing write start sync signal LSYNC, write region signal LGATE and outside write region laser light setting signal ERASE to be initialized. It is to be noted that there are also provided J-K flip-flops 110 through 112 and a D-F flip-flop 113 as connected as shown. Counters 107, 108 and 109 each start counting with signal WCLK as a clock signal.

The signal ERASE is a signal which positively causes the modulation signal VIDEO to be turned off to thereby prevent undesired light from being applied to the photosensitive drum 29 outside of the write region. When signal ERASE is rendered "true", signal LSYNC is rendered "true" for k number of clocks after a while. This signal LSYNC is a signal which advises the IFC 52 to initiate transmission of write data. With a delay of 1 number of clocks after the signal LSYNC has been rendered to be "false", the signal LGATE is rendered to be "true." The signal LGATE is a write region signal and it is maintained "true" corresponding to a write area, during which time period write data from the IFC 52 may be received. For example, if the resolution is 1/300" and the write region is 8", it is maintained "true" for 2,400 WCLK. While the signal LGATE is "true", write data WDATA is rendered valid and the modulation signal VIDEO is varied in accordance with a signal WDATA' synchronized by the signal WCLK. Thus, the laser light beam is tuned on and off by the write data WDATA itself to thereby allow to obtain a valid image.

When the signal LGATE is rendered "false", the signal VIDEO is also rendered "false" by the signal ERASE, so that the semiconductor laser extinguishes. When the signal ERASE is rendered "false", the latch and data selector 104 is cleared so that the signal WCLK is turned off. Thereafter, the output of the counter 105 is rendered "true" and thus the signal DSYNC is rendered "true", so that the signal VIDEO is again rendered "true." And, then, the semiconductor laser is again activated to emit light so as to carry out sync detection for the next optical scanning operation. In this manner, the same write-in process as described above will be carried out in repetition.

SYSTEM STRUCTURE OF THE CONTROL SYSTEM

Figure 9:
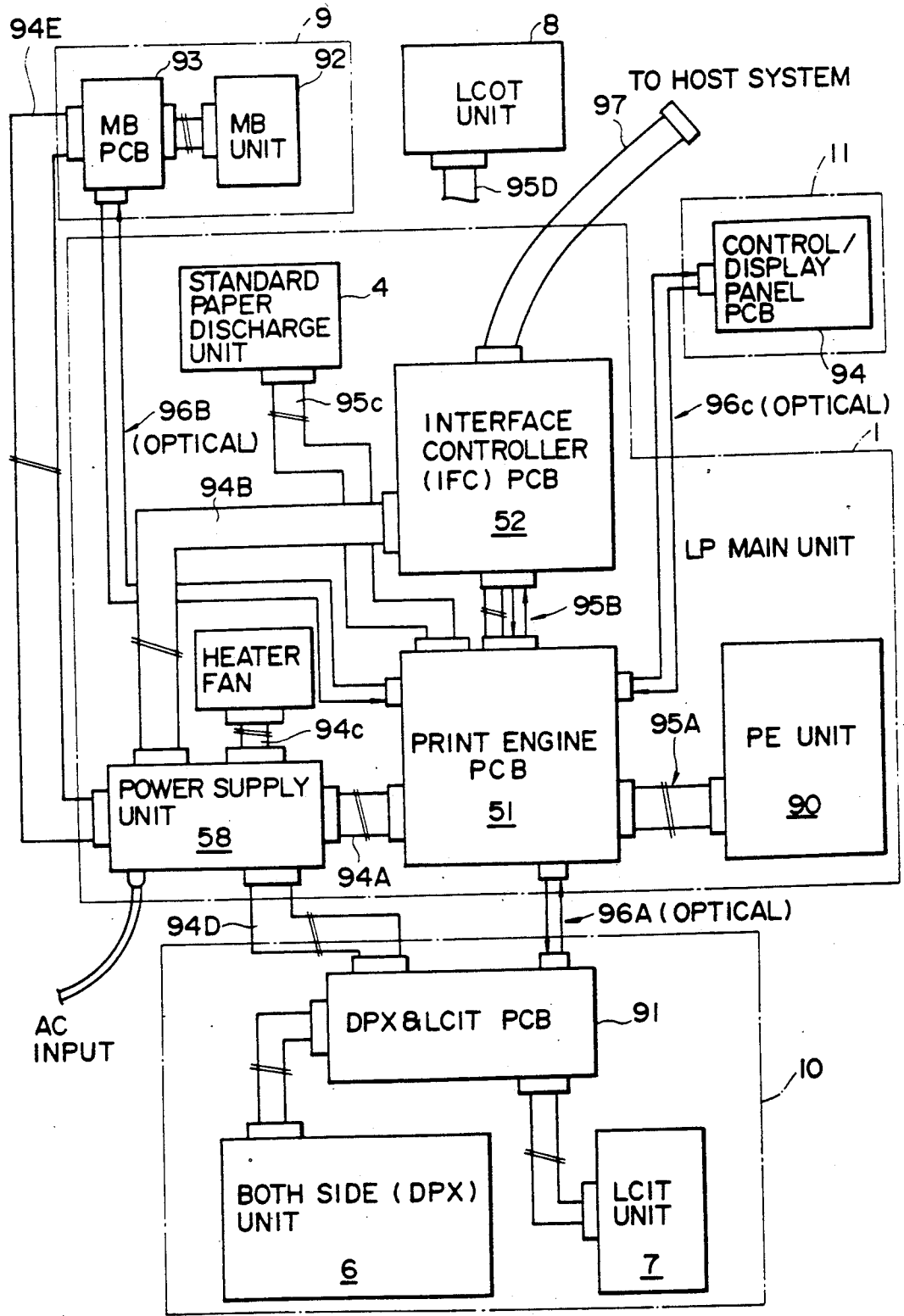
FIG. 9 is a block diagram showing the connecting relationship among various units in the laser printer system of FIG. 2 in accordance with one embodiment of the present invention.

FIG. 9 is a system block diagram showing the connection relationship among various units in the control system of the present embodiment. A power supply unit 58 is directly connected to a print engine PCB 51, interface controller (IFC) PCB 52 and heaters and fans 54–56 of the image fixing device inside of the laser printer main unit 1, to DPX and LCIT PCB 91 for controlling the both side processing unit 6 and the large volume paper feed unit 7 within the table 10 and also to MB PCB 93 for controlling the mail box (MB) unit 92, if the main box 9 is added, through power supply lines 94A, 94B, 94C, 94D and 94E, respectively. Moreover, the print engine PCB 51 and the print engine (PE) unit (including the various mechanical structural elements shown in FIG. 3) and also between the print engine PCB 51 and the IFC PCB 52 are connected by connection lines, each including a power supply line and a signal line, 95A and 95B, respectively. When the standard paper discharge unit 4 is provided, it is connected to the print engine PCB 51 by a connection line 95C including a power supply line and a signal line. Moreover, when the large volume paper discharge unit (LCOT) 8 is provided, it is also connected to the print engine PCB 51 by a connection line 95D which also includes a power supply line and a signal line.

On the other hand, the print engine PCB 51 is connected to the DPX and LCIT PCB 91, to MB PCB 93, and also to the control/display panel PCB 94 by respective pairs of optical fiber cables 96A, 96B and 96C for transmission and reception of signals by means of an optical communication method. The IFC PCB 52 is connected to a host system, such as a computer or word processor, through a connection cable 97, and data, such as image data, is input into the IFC PCB 52 through this connection cable 97. It should also be noted that power is also supplied to the control/display panel PCB 94 from the power supply unit 58, print engine PCB 51, or IFC PCB 52. It should also be noted that each of the print engine PCB 51, IFC PCB 52, LCOT 8, DPX and LCIT PCB 91, MB PCB 93 and the control/display panel PCB 94 is provided with a central processing unit or CPU for controlling the local operation of each of these units.

Figure 10A:
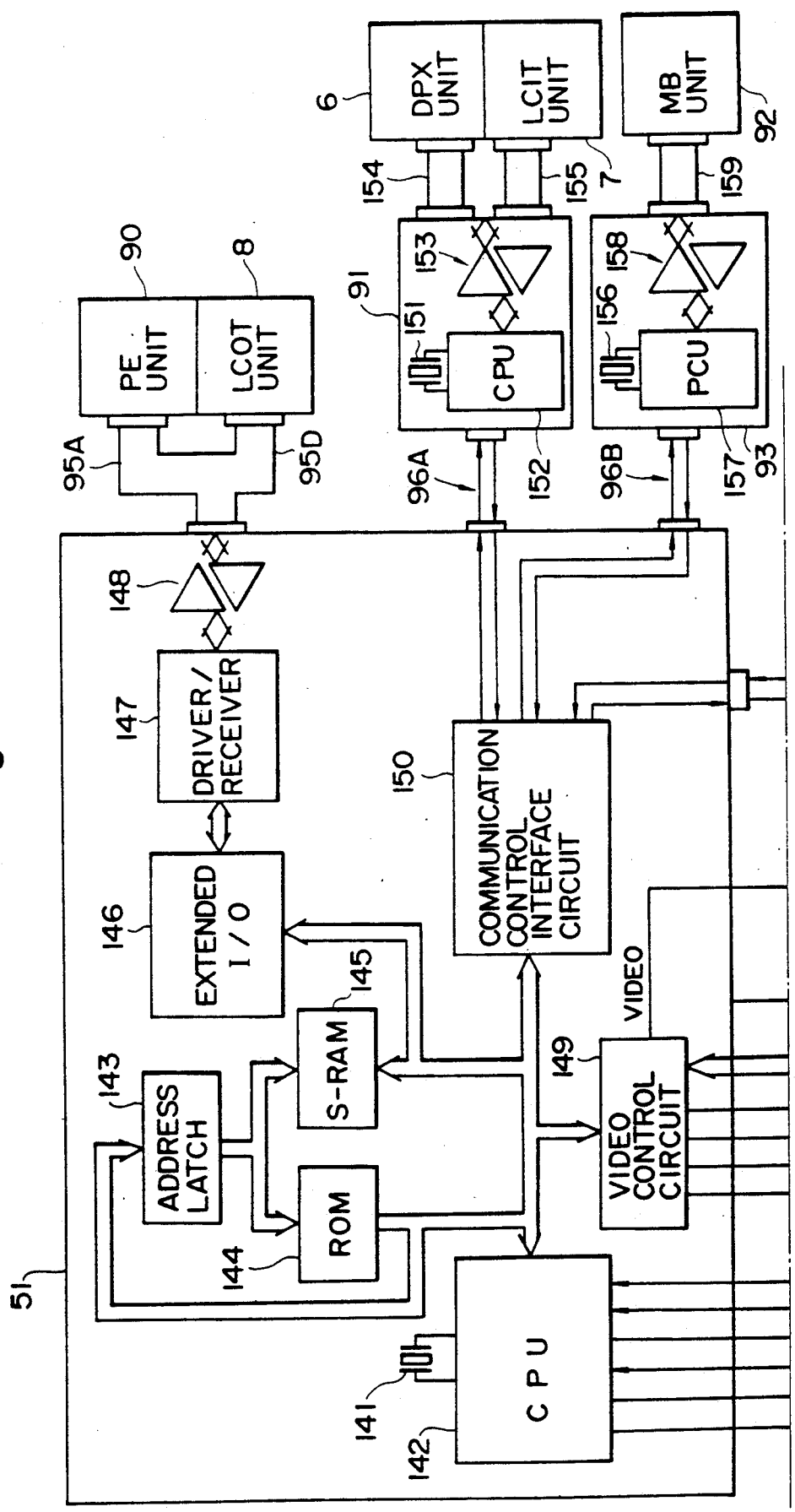

FIG. 10 is a system block diagram which also illustrates the internal structure of the print engine PCB 51 or the like and those elements identical to those shown in FIG. 9 are indicated by identical numerals. The print engine PCB 51 includes a one-chip microcomputer (CPU) provided with an external quartz oscillator 141, an address latch circuit 143, a ROM 144 serving as a program memory, a SRAM 145 serving as a data memory, an extended I/O 146, a driver/receiver 147, an input/output buffer 148, a video control circuit 149 and a communication control interface circuit 150. The CPU 142 contains therein various elements, such as an oscillator, timers and counters, and it exchanges signals with the IFC PCB 52 and at the same time controls a video control circuit 149 which serves the function of the write control circuit shown in FIG. 7. Through the video control circuit 149, image data WDATA is input from the IFC PCB 52 and various write control signals are output to the IFC PCB 52, whereby modulation signal VIDEO is output to a semiconductor driver circuit which will be described in detail later.

The CPU 142 controls the print engine unit 90 and the LCOT unit 8 through the extended I/O 146, driver/receiver 147, input/output buffer 148 and connection lines 95A and 95D. Furthermore, the CPU 142 is also connected to the DPX and LCIT PCB 91, to MB PCB 93 and also to the control/display panel PCB 94 by means of optical fiber cables 96A, 96B and 96C, respectively, through a communication control interface circuit 150, so that exchange of signals among those units are carried out by an optical communication method. This communication interface circuit 150 has been newly developed by the present inventors and it is preferably implemented in the form of a one-chip integrated circuit device as will be described in detail later.

The DPX & LCIT PCB 91 includes a CPU 152 having an external quartz oscillator 151 and an input/output buffer 153 and it controls the DPX unit 6 and also the LCIT unit 7 through signal lines 154 and 155, respectively. The MB PCB 93 also includes a CPU 157 having an external quartz oscillator 156 and an input/output buffer 158 and it controls the MB unit 92 through a signal line 159.

FIG. 11 is a system block diagram illustrating an example of the device distributed control type similar to that shown in FIG. 10 and the IFC PCB and the control/display panel PCB are omitted from the drawing for the sake of brevity. In this case, only the print engine unit 90 is connected to an input/output buffer 148 of the print engine PCB 51 through the connection line 95A. For each of the optional units, including the LCOT unit 8, DPX unit 6, LCIT unit 7 and MB unit 92 there is provided a respective printed circuit board (PCB) 98, 99, 100 or 93, which includes an individual CPU and an individual input/output buffer, so as to control these optional units individually. These PCBs 98, 99, 100 and 93 are connected to the print engine PCB 51 through multi-line optical fiber cables 96F, 96E, 96D and 96B, respectively, and to the communication interface circuit 150 via the interior signal lines within the print engine PCB 51. It should be noted that since only either one of the LCOT unit 8 and the MB unit 92 can be connected to the communication control interface circuit 150, the optical communication line of the other unit which is not in use may be used for communication with the control/display panel PCB 94.

OPTICAL FIBER CABLE AND CONNECTOR

Figure 12A:
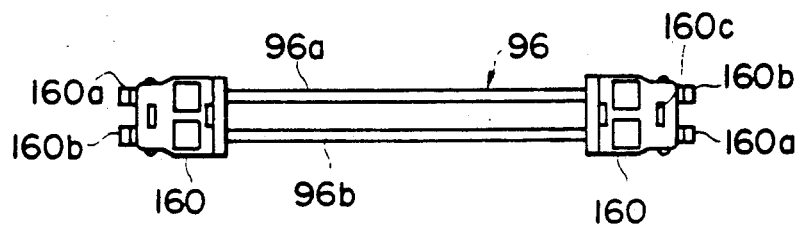
FIGS. 12a and 12b are schematic illustrations showing two different types of multi-line optical fiber cables with male connectors suitable for use in the present laser printer system.
Figure 12B:
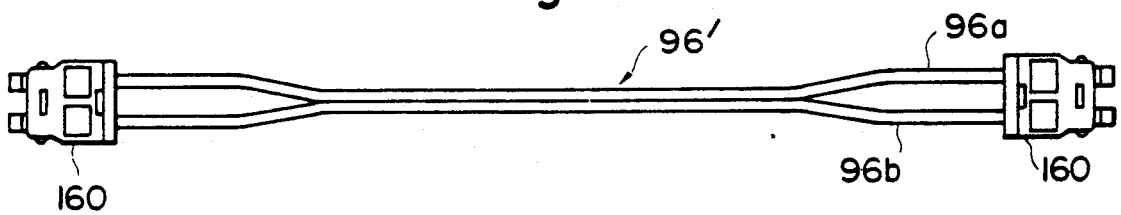

FIGS. 12a and 12b illustrate two kinds of optical fiber cables provided with connectors constructed in accordance with one embodiment of the present invention and suitable for use as the optical fiber cables 96A through 96F described above. FIG. 12a illustrates a shorter optical fiber cable 96 for use in a short distance connection and it includes a pair of optical fibers 96a and 96b of a plastic material and a pair of male common connector component 160, each connected to one end of each of the pair of optical fibers 96a and 96b. The common connector component 160 is provided with a pair of contacts 160a and 160b as projections which project forwardly at its front surface, and the end surfaces of the pair of optical fibers 96a and 96b are in intimate contact with the respective contacts 160a and 160b. On the other hand, FIG. 12b illustrates a relatively long optical fiber cable 96' for use in a relatively long distance connection, and it includes a pair of optical fibers 96a' and 96b' of a plastic material, which are bundled together at their intermediate sections, and a pair of male common connector components 160, each connected to one end of each of the pair of optical fibers 96a' and 96b'.

Figure 13A:
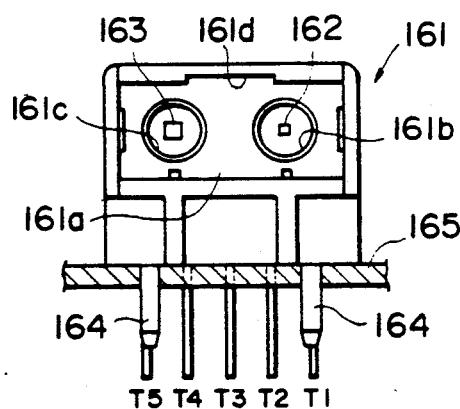
FIGS. 13a and 13b are schematic illustrations showing female connectors mounted on the PCB for receiving therein the male connectors of the optical fiber shown in FIGS. 12a and 12b.
Figure 13B:
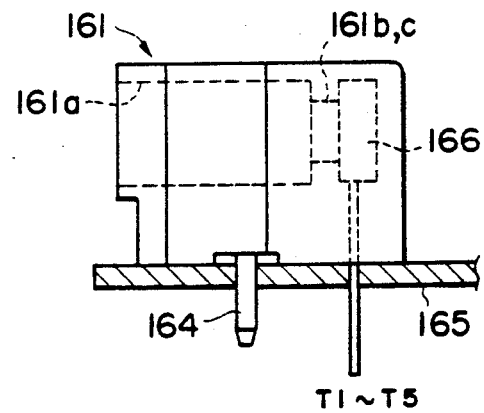

FIGS. 13a and 13b illustrate a female common connector component to be mounted on a PCB to receive one of the male common connector components 160 of the optical fiber cable 96 or 96'. Thus, a combination of the male common connector component 160 and the female common connector component 161 defines a common connector suitable for use in the present laser printer system. The female connector component 161 is formed with a male connector component receiving opening 161a for receiving therein the male connector component 160, set in position when inserted fully, and is provided with a pair of contact insertion holes 161b and 161c. At the bottom of the contact insertion hole 161b is provided with an LED 162; on the other hand, a phototransistor 163 is disposed at the bottom of the other contact insertion hole 161c. In addition, a light-receiving IC chip 166 is also provided at a location further beyond the holes 161b and 161c. The IC 166 is provided with pins T1 through T5, among which pins T3 through T5 extend outwardly downwardly as terminal projections. The female connector component 161 is fixedly mounted on a PCB substrate 165 by means of a pair of mounting posts as shown in FIGS. 13a and 13b. And, the LED 162 has a pair of anode and cathode pins T1 and T2 which also extend exteriorly of the female connector component 161 and through the PCB substrate 165 downwardly in parallel with other pins T3 through T5.

Figure 14A:
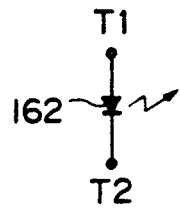
FIGS. 14a and 14b are circuit diagrams showing the photocoupler structure provided in the female connector shown in FIGS. 13a and 13b.
Figure 14B:
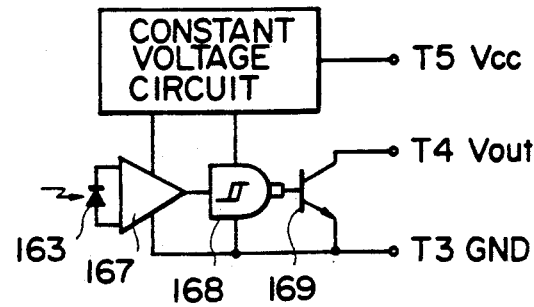

FIG. 14a illustrates an electrical connection between the LED 162 and the pins T1 and T2 and FIG. 14b schematically illustrates the circuit structure of the LED IC chip 166 and its electrical connection with the pins T3 through T5. As shown, the LED IC chip 166 includes an amplifier circuit 167 for amplifying an output from the photodetector 163, a wave shaping circuit 168, an output transistor 169 and a constant voltage circuit 170 with the pin T3 defining a ground terminal, pin T4 a signal output (Vout) terminal and pin T5 a d.c. voltage source (Vcc) terminal. When the male connector component 160 of the multi-line optical fiber cable 96 or 96' is inserted into the female connector component 161 fixedly mounted on the PCB substrate 165, there is established an optical communication line between a pair of PCBs, which may be used for transmission and reception of signals therebetween. It should also be noted that the illustrated connector keys the male connector component 160 from being inserted into the female connector component 161 in a wrong orientation. For this purpose, the male connector component 160 is formed with a mating projection 160c at a top surface thereof as shown in FIG. 12a; on the other hand, the female connector component 161 is formed with a mating notch 161d at the top inner surface of the male receiving opening 161a. With this structure, the male connector component 160 is permitted to be inserted into the male receiving opening 161a of the female connector component 161 only in one orientation. It is to be noted, however, such a mating orientation regulating structure may be provided by any other structure, if desired. For example, by providing the contacts 160a and 160b of the male connector component 160 and also the contact insertion holes 161b and 161c of the female connector component 161 in an asymmetric arrangement in a corresponding manner, it may be insured that the male connector component 160 be inserted into the female connector component 161 always in a proper orientation. In prior art structures which use separate connectors for transmission and reception lines, it may be possible to establish wrong connections between the two PCB boards. However, in accordance with this aspect of the present invention, such inconveniences may be eliminated entirely with a fewer number of connectors used.

CONNECTING CONDITION OF LOADS AND SENSORS TO EACH PCB

Now, referring to FIGS. 15 and 16, the connecting conditions between the print engine PCB and other PCBs in the above-described embodiment of the present invention and between each of the PCBs and its associated loads and sensors will be described.

Figure 15A:
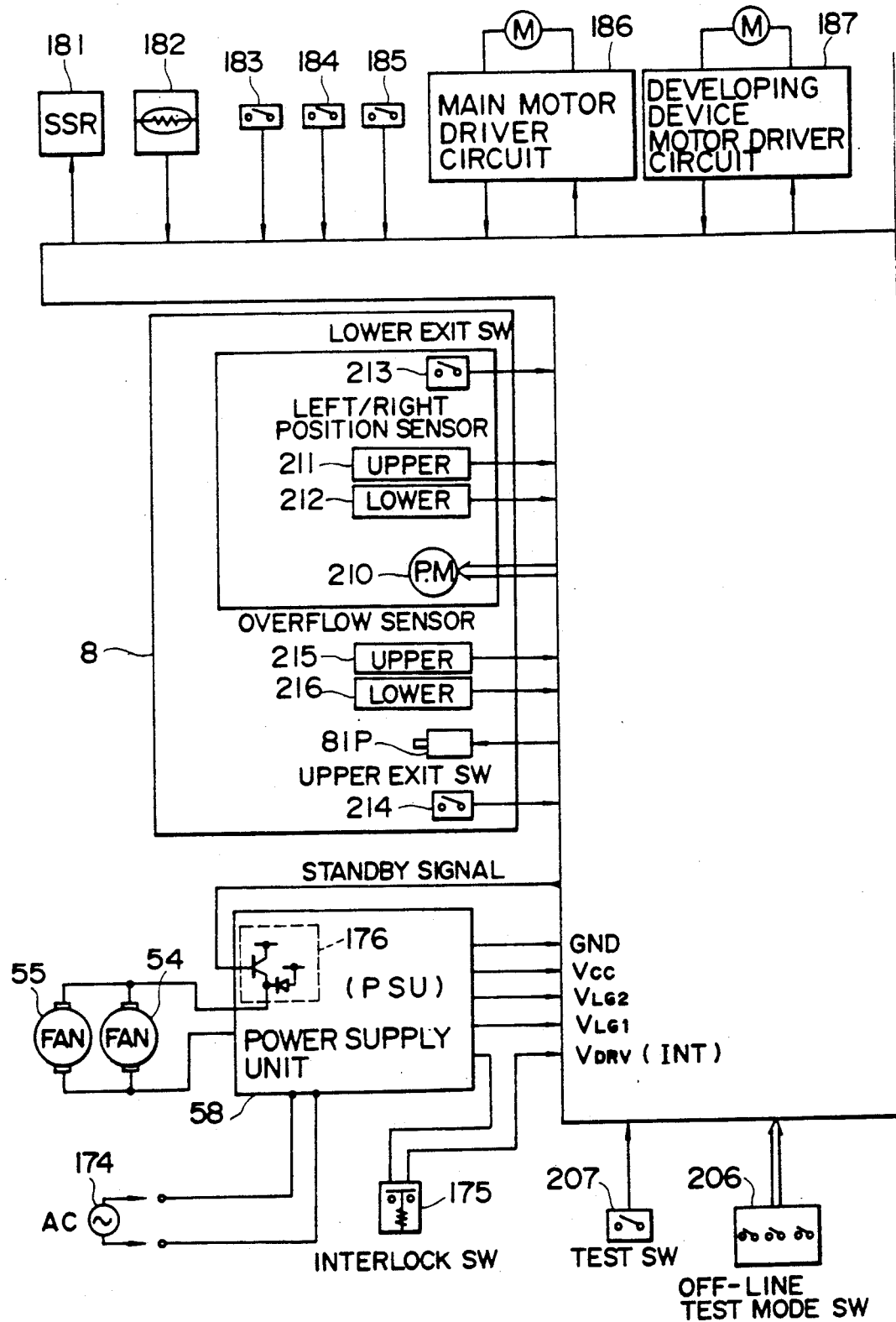
Figure 15B:
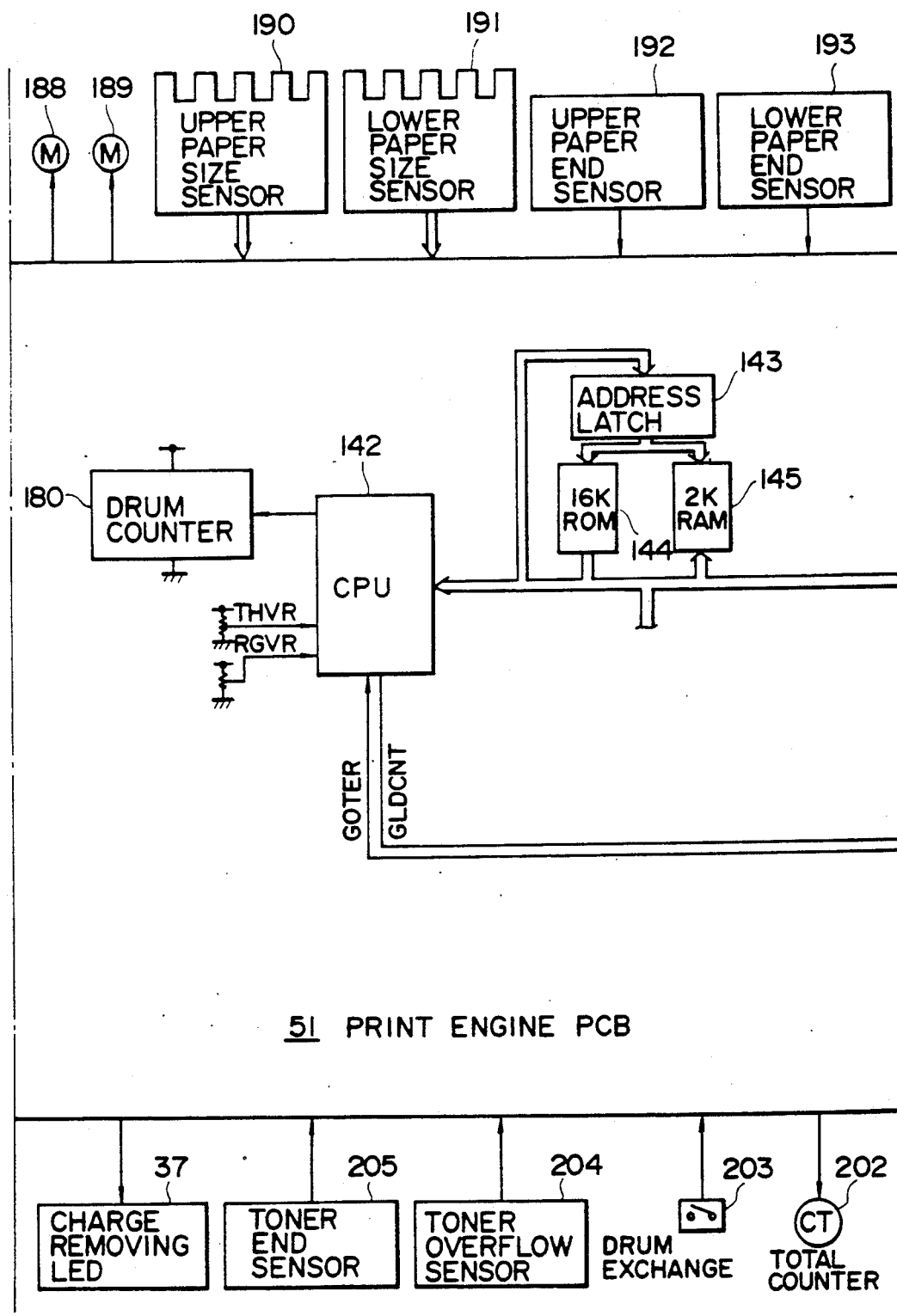

In the first place, as shown in FIG. 15, the power supply unit 58 receives a voltage supplied from a commercial line a.c. power supply 174 and after rectification it lowers the voltage level to thereby produce output voltages $V_{cc}$, $V_{LG1}$, $V_{LG2}$ and $V_{DRV}$ which are supplied to the print engine PCB 51, IFC PCB 52, DPX and LCIT PCB 91 and MB PCB 93. The output voltage $V_{DRV}$ is supplied to the print engine PCB 51 through an interlock switch 175. In addition, the power supply unit 58 is provided with a voltage switching circuit 176, through which $V_{DRV}$ during printing or $V_{LG1}$, which is lower than $V_{DRV}$, during standby is supplied to the main fan 55 and also to the PCB pack fan 54, so that the fan rpm varies between the print mode and the standby mode.

A connection between the print engine PCB 51 and each of the DPX and LCIT PCB 91, MB PCB 93 and control/display panel 11 is preferably established by using either one of the before-described optical fiber cables 96A, 96B and 96C. As shown in FIG. 16, such a connection is established as an optical communication line using an optical fiber cable between each serial interface port SIF provided in the communication control interface circuit (CCI) 150 of the print engine PCB 51 and the serial interface port SIF of each of the CPU 152 of the PCB 91, CPU 157 of the PCB 93 and a CPU (not shown) of the control/display panel PCB 94.

Furthermore, as shown in FIG. 15, the print engine PCB 51 is also connected to various associated loads and sensors, including a heater control thyristor 181, an image fixing temperature detecting thermister 182, a front cover open condition detecting switch 183, a top cover open condition detecting switch 184, a side cover open condition detecting switch 185, a driver circuit 186 of the main motor 57, a driver circuit 187 of the developing device motor 38, a height control motor 188 for the upper paper feed cassette 2, a height control motor 189 of the lower paper feed cassette 3, a paper size sensor 190 within the upper paper feed cassette, a paper size sensor 191 within the lower paper feed cassette, a paper end sensor 192 within the upper paper feed cassette, a paper end sensor 193 within the lower paper feed cassette, a high voltage supply for supplying a high voltage to the corona devices for charging, image transfer, application of a developing bias and paper separation 34, 30, 35a and 62, the registration sensor 60, the image fixing device exit sensor 61, driving plungers 32P and 33P of the paper path switching pawls 32 and 33, respectively, an upper paper feed clutch 194, a lower paper feed clutch 195, a registration roller clutch 196 and a driver circuit 198 of a polygon motor 197 for rotating the polygon mirror 44 shown in FIG. 3. In addition, also connected to the print engine PCB 51 are a total counter 202, a photosensitive drum exchange switch 203, a toner overflow sensor 204, a toner end sensor 205, a charge removing LED 37, an offline/test mode switch 206 and a test start switch 207.

Although not shown in FIG. 10, the print engine PCB 51 is also provided with a drum counter 180 (i.e., a non-volatile memory NVRAM or E$^2$PROM), which is controlled by the CPU 142, and also a power control circuit 200 for controlling the light-emitting power of the semiconductor laser 41. And, a driver circuit 201 of the semiconductor laser 41, including a laser diode LD and a monitor photodiode PD, is connected to the video control circuit 149 directly and through the power control circuit 200. The video control circuit 149 controls the light intensity of light emitted from the laser diode LD driven by the semiconductor laser driver circuit 201 to make it substantially constant using a feed-back signal from the monitoring photodiode PD under the control of the power control circuit 200 and also causes the laser diode LD to be turned on and off in accordance with a modulation signal VIDEO which has been modified by an image data to be printed. Thus, as described with reference to FIGS. 5 through 8, print data is written onto the photosensitive drum 29 by the laser write-in unit 40 of FIG. 3 to thereby form an electrostatic latent image on the drum 29. It is to be noted that a sync detection signal DETP obtained by processing an output from the photodetector 50 which receives a scanning light beam from the polygon mirror prior to its writing operation is also input into the video control circuit 149 to thereby regulate the timing of initiation of writing of image data onto the drum 29.

Furthermore, as shown in FIG. 15, the print engine PCB 51 is also connected to various components of the large quantity paper discharge unit (LCOT) 8, which include a job separation motor 210 for moving each of the paper discharge trays either to the left or to the right, position detecting sensors 211 and 212 for detecting the left and right position of each of the paper discharge trays, a plunger 81P for selecting either one of the upper and lower paper discharge trays by operating the paper path switching pawl 81, a lower stage exit switch 213, an upper stage exit switch 214 and overflow sensors 215 and 216 for the upper and lower stage paper discharge trays.

Now, as shown in FIG. 16, the DPX and LCIT PCB 91 is connected to a both side transportation clutch 219, a both side drive motor 73, a both side entrance sensor 71, a both side exit sensor 72, a plunger 67P for driving the paper path switching pawl 67, an LCIT paper feed clutch 220, a drive motor 77, a paper size sensor 221, a paper stack drive motor 222, a cover open switch 223, an upper limit switch 224, a lower limit switch 225, a paper end sensor 226, a tray down switch 227 and a both side unit cover open switch 228. On the other hand, the mail box (MB) PCB 93 is connected to a transportation motor 230, a bin paper absence sensor 231, a bin overflow sensor 232, a mail box entrance sensor 233, bin selection plungers 234 through 239, a job separation motor 240 for shifting each bin to the left or to the right, and left and right end switches 241 and 242 for detecting the left and right position of each bin. In addition, the IFC PCB 52 is connected to the CPU 142 and also to the video control circuit 149 of the print engine PCB 51 through a number of signal lines, and it is also connected to each of the font cartridges 12 and 13 and the emulation card 14. The IFC PCB 52 is also connected to the control/display panel PCB 94 to supply voltage $V_{cc}$ thereto.

DETAILED DESCRIPTION OF COMMUNICATION CONTROL INTERFACE

In a known prior art structure, the circuit used for communication with a CPU includes an internal data bus, which imposes delays prior to inputting or outputting of image data because each channel or register must first be selected to cause a read or write signal to be active prior to inputting or outputting of image data. Described in greater detail in this respect, there is a set up time which is a time period required for each channel or internal register to come to a data output enabling condition from its high impedance state after a read signal has been rendered active or a time period required for each channel or internal register to come to a data input enable condition from its high impedance state after a write signal has been rendered active, so that there is a delay time period associated with such a set up time. For this reason, a relatively long period of time is required for exchanging data with a CPU, so that the response speed tends to be slower, which limits the effective bit rate for data going over the bus line.

On the other hand, in accordance with the above-described embodiment of the present invention, the communication control interface circuit 150 does not use a data bus as its internal connection line but instead all of the connection lines inside of the communication control interface circuit 150 are divided between input and output lines, so that the delay time in transmitting and receiving signals within the circuit 150 is minimized. This aspect of the present invention will be described more fully below with reference to FIGS. 17 and 18, which illustrate the overall structure of the communication control interface circuit 150 in block form and its read timing in timing chart form, respectively.

Figure 17A:
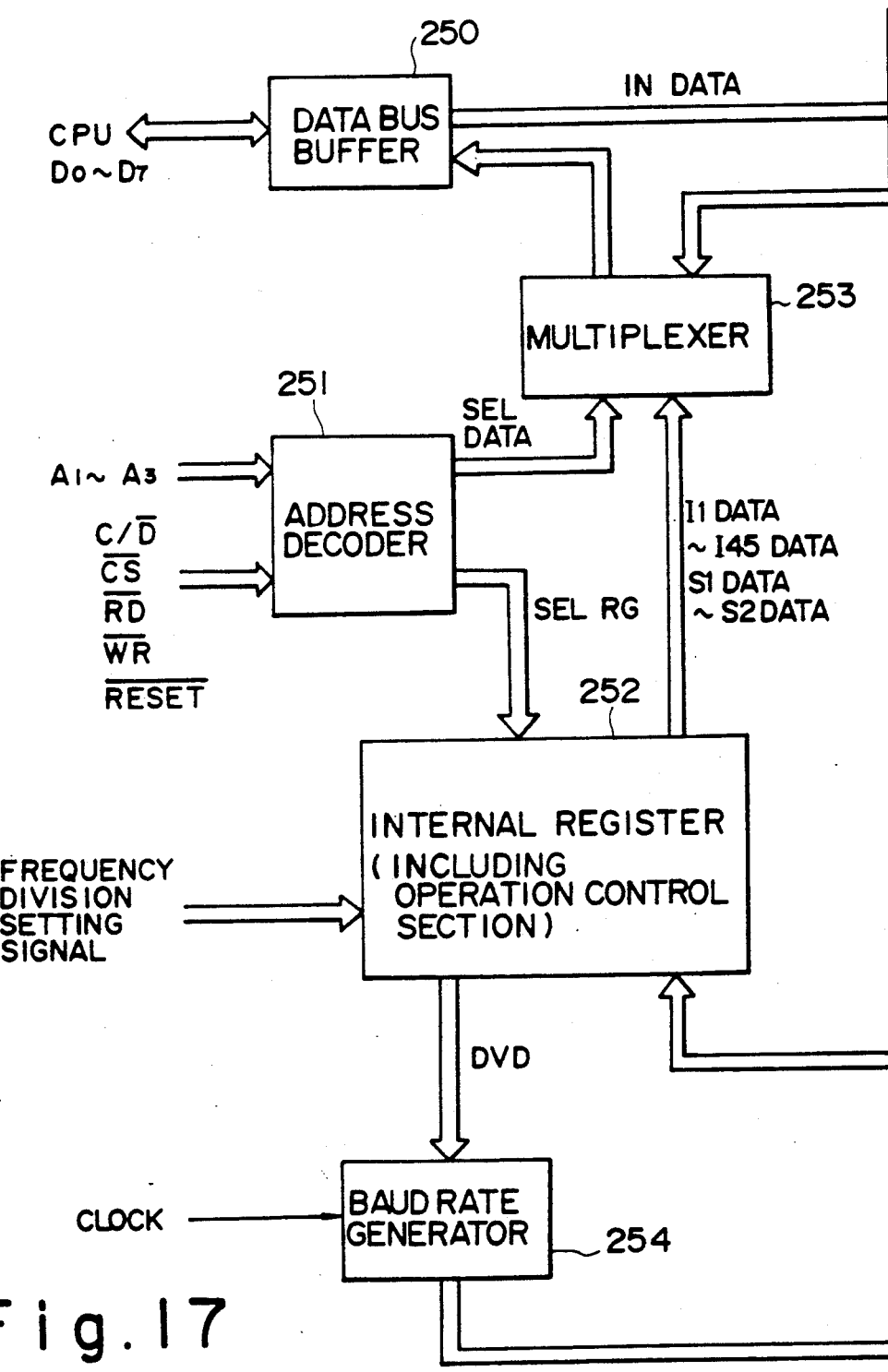
FIGS. 17A and 17B, when combined as shown in FIG. 17, define a block diagram schematically showing the overall structure of the communication control interface circuit circuit 150.
Figure 17:
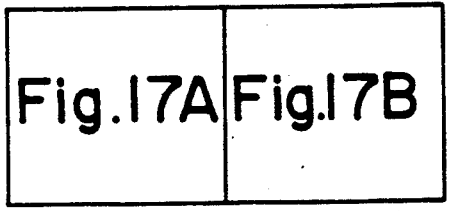
FIG. 17 is an illustration showing how to combine FIGS. 17A and 17B.
Figure 17B:
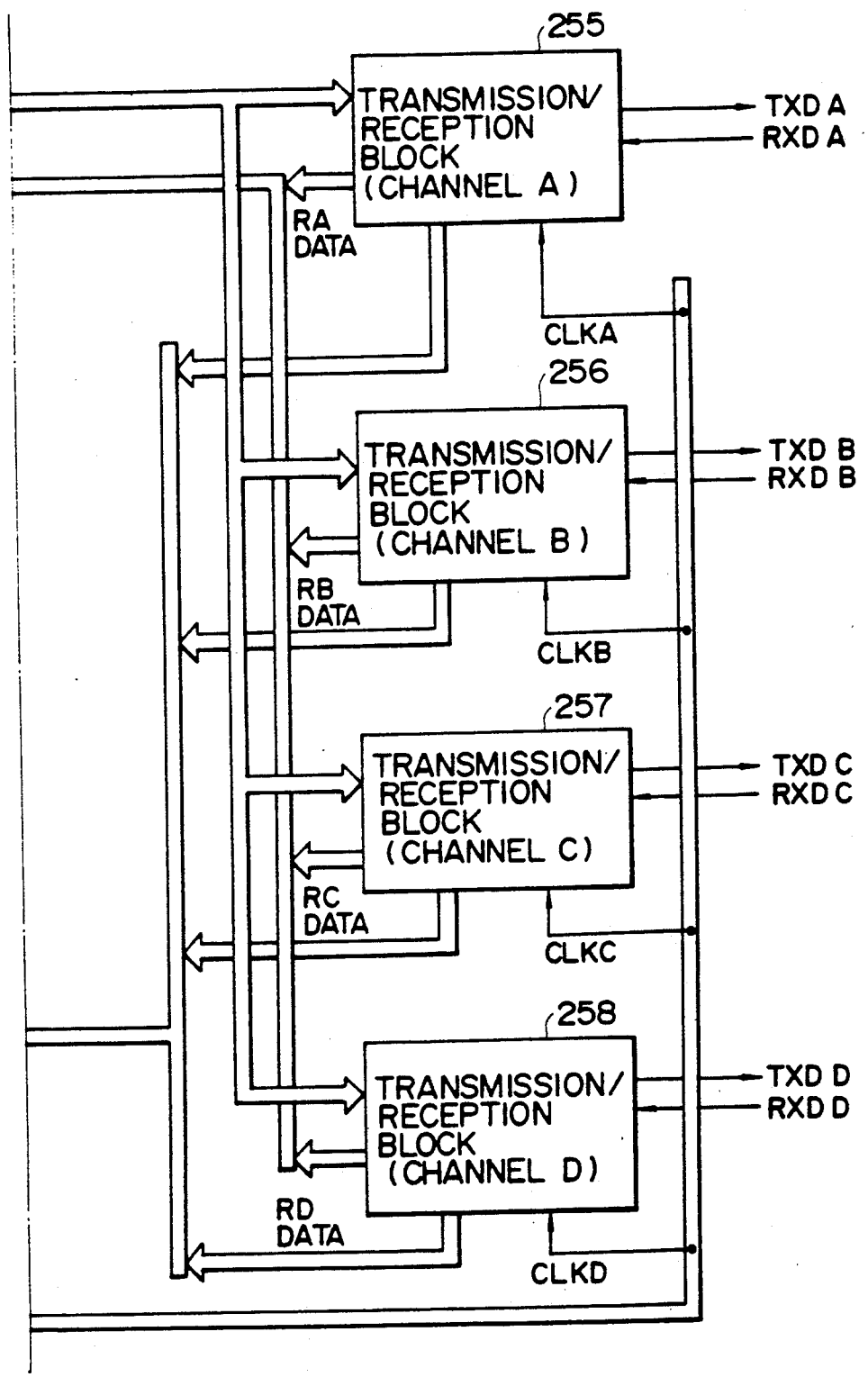

As shown in FIG. 17, the communication control interface (CCI) circuit 150 includes a data bus buffer 250 for effecting input and output of data $D_0$–$D_7$ with the CPU 142, ah address decoder 251 for inputting address data and various control signals, an internal register (including an operation control section) 252, a baud rate generator 254 for generating a clock signal which determines the transmission and reception speed, and transmission/reception blocks 255-258 each having a parallel/serial conversion circuit for each of channels A-D. Data from the CPU 142 are directly supplied to each of the transmission/reception blocks 255-258 through the bus buffer 250, and address data and various control signals are directly supplied to an internal register 252 and also to a multiplexer 253 through an address decoder 251. Data received at each of the transmission/reception blocks 255-258 are transferred to the CPU 142 via the multiplexer 253 and the bus buffer 250. For this reason, there is virtually no delay time, excepting a decode delay time, for transmission of data between an external bus and each of the interior elements of the communication control interface circuit 150.

The contents (data) of each of the transmission/reception blocks 255-258 and the internal register 252 are always input into the multiplexer 253, so that a delay time from the time when the read signal RD has been rendered active to the time when data is output only includes a gate delay time in the multiplexer 253 (see FIG. 18). The same arguments hold true also for the write timing. As a result, as compared with the prior art, the read or write delay time is minimized in the present embodiment so that transfer of data to and from the CPU 142 can be carried out a high rate.

Figure 19A:
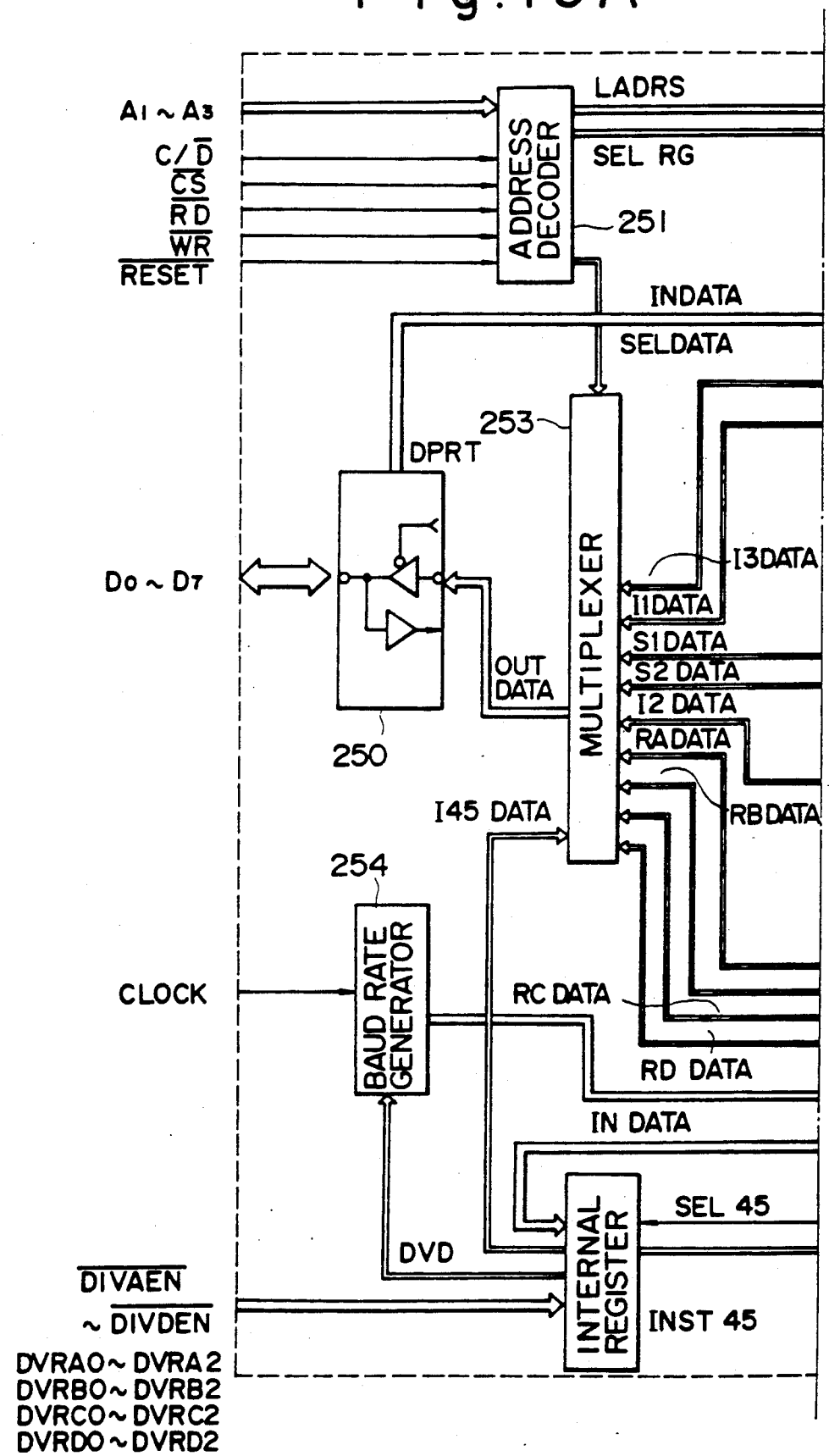
Figure 19B:
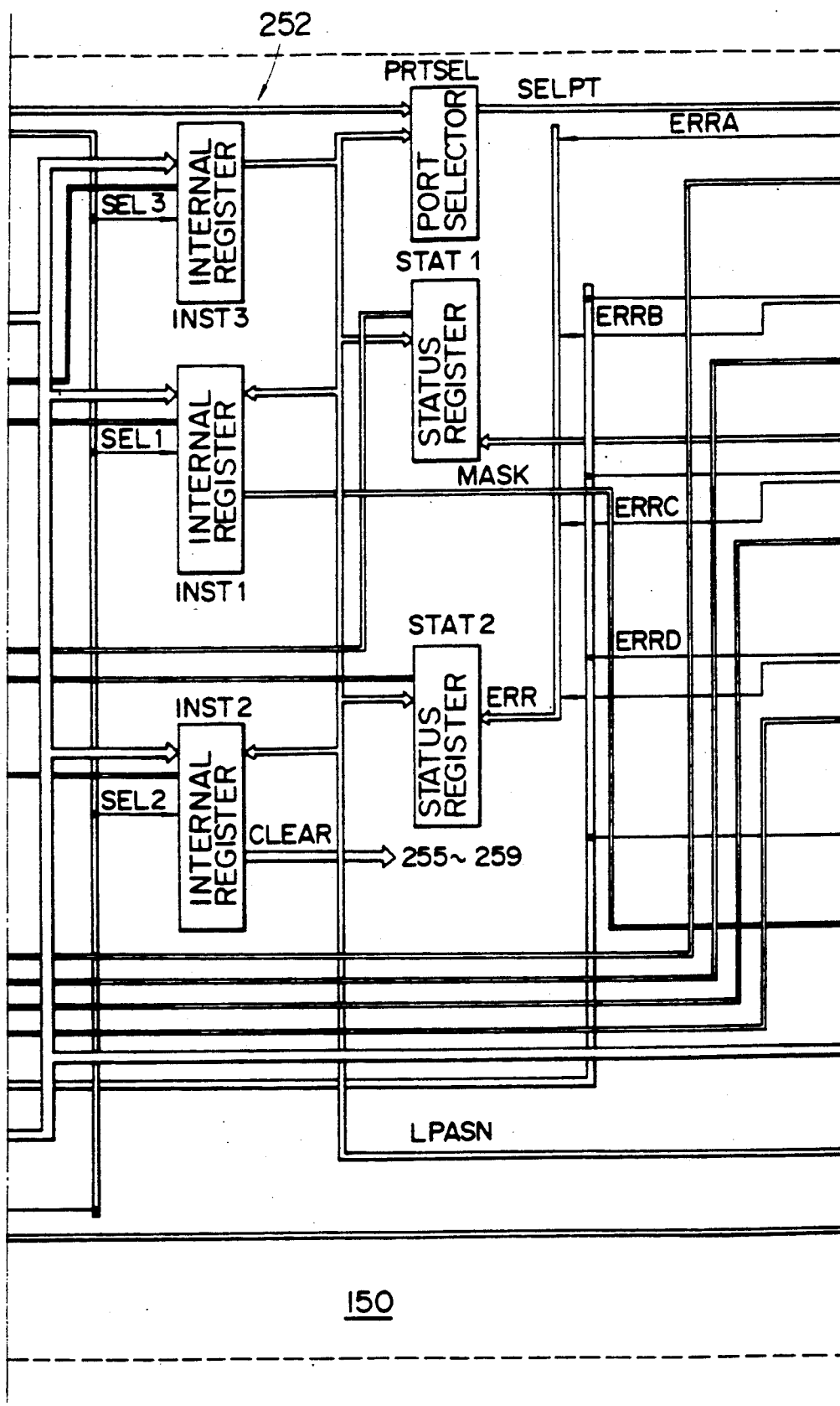

FIG. 19 is a block diagram showing in block form a specific example of the above-described CCI circuit, and those elements which are identical to those shown in FIG. 17 are indicated by identical numerals. As shown in FIG. 19, there is provided a data bus buffer 250 which can be connected with the external component (CPU) and to the internal input and output lines. Control data and transmission data from the CPU are transmitted to each of the transmission/reception blocks 255-258 and to each of the internal registers (instruction registers) INST1-INST3 and INST45, which correspond to the internal register 252 of FIG. 17, through a port DPRT almost without delay (signal INDATA of port DPRT). The data in each of the internal registers and the reception data are selected at the multiplexer 253 which outputs a signal OUTDATA which in turn is output to the CPU via the data bus buffer 250. Since outputting of data to the CPU suffers only a delay time for data selection at the multiplexer 253, the delay of data $D_0$–$D_7$ for a read signal is almost non-existant An input data signal from the CPU can be, as, determined by a signal $C/\overline{D}$, control data to be written into the internal register 252 or transmission data to be written into each of the transmission/reception blocks 255-258. In addition, selection is effected among the internal registers and also among the transmission/reception blocks by an address signal $A_1$-$A_3$. The address decoder 251 selects an internal register or transmission/reception block which is determined by the control/data signal C/$\overline{D}$ and address signal $A_1$-$A_3$, and when a chip select signal $\overline{CS}$ has become active and also a write signal $\overline{WR}$ has become active, it causes a LADRS signal or SELRG signal to be active. When any of the select signals SEL1-SEL3 and SEL45 has become active, a corresponding one of the internal registers INST1-INST45 opens its internal input gate to thereby permit an input data INDATA from the CPU to be taken in. On the other hand, for transmission of data (i.e., C/$\overline{D}$ being "L"), the output LADRS of the decoder is once passed through the port selector PRTSEL, where conversion between logical address and physical address is carried out, to become a signal SELPT which is then input into each of the transmission/reception blocks 255-258. When any one of SELA-SELD of signal SELPT has become active, a corresponding one of the transmission/reception blocks 255-258 opens its internal input gate to receive data therein.

To output data to the CPU, necessary data are selected by the multiplexer 253. In the first place, if the contents of the internal register 252 are to be output, (i.e., C/$\overline{D}$ being "H"), an internal register determined by an address signal $A_1$-$A_3$ is selected by the address decoder 251, and when both of the signals $\overline{CS}$ and $\overline{RD}$ have become active, signal SELDATA is rendered active, so that the gate inside of the multiplexer 253 is opened to thereby output any one of I1DATA-I45DATA and S1DATA-S2DATA to the CPU via the data bus buffer 250 as an output data OUTDATA. On the other hand, if reception data in each of the transmission/reception blocks 255-258 is to be output, (i.e., C/$\overline{D}$ being "L"), a logical port determined by an address signal $A_1$-$A_3$ is selected by the address decoder 251 and its port is subjected to conversion between a logical port and a physical port at the port selector PRTSEL, whereby the internal output gate of each of the physical gates to be set open to thereby cause the data of the physical port which has been rendered active is output to the multiplexer 253.

When signals $\overline{CS}$ and $\overline{RD}$ have become active, output signal SELDATA of the address decoder 251 becomes active, so that the multiplexer 253 selects any of data RADATA-RDDATA from the transmission/reception blocks 255-258 and causes said data to be output to the CPU through the data bus buffer 250 as output data OUTDATA. Incidentally, the internal register 252 is provided with a pair of status registers STAT1 and STAT2. The baud rate generator 254 includes a transmission/reception clock generator. Also provided as shown in FIG. 19 include a ready signal output circuit 259 and a transmission/reception grant/inhibit signal output circuit 260.

Now, a description will be had with respect to the internal register (instruction register). The instruction register INST1 is a register which is in charge of management of rendering an interrupt line $\overline{RXDRDY}$, $\overline{TXDRDY}$ to the CPU to be active with respect to a transmission ready/reception ready condition of each transmission/reception port. It receives data regarding mask/non-mask of ready for each logical port from the CPU and also assignment data LPASN regarding conversion between logical port and physical port from the instruction register INST3 and supplies mask/non-mask data MASK of each physical port to the ready signal output circuit 259. On the other hand, at the ready signal output circuit 259, ready/busy data (READY) reflecting the actual ready or busy condition of each of the transmission/reception blocks 255-258 are received and compared with the MASK data to thereby output an interrupt signal $\overline{RXDRDY}$ and $\overline{TXDRDY}$ to the CPU. The contents of the instruction register INST1 may be read by the CPU through I1DATA-OUTDATA.

The instruction register INST2 is a register which initializes or resets the error flag of each of the transmission/reception ports and the entire structure of this CCI circuit. This register receives data from the CPU and LPASN data from the instruction register INST3 and outputs an error reset signal CLEAR to each of the transmission/reception blocks 255-258. Although not shown, from this register, an initial reset signal is output to all of the internal registers and the transmission/reception blocks. On the other hand, the remaining instruction register INST3 is a register which is in charge of management of correspondence between logical and physical ports.

Figure 20:
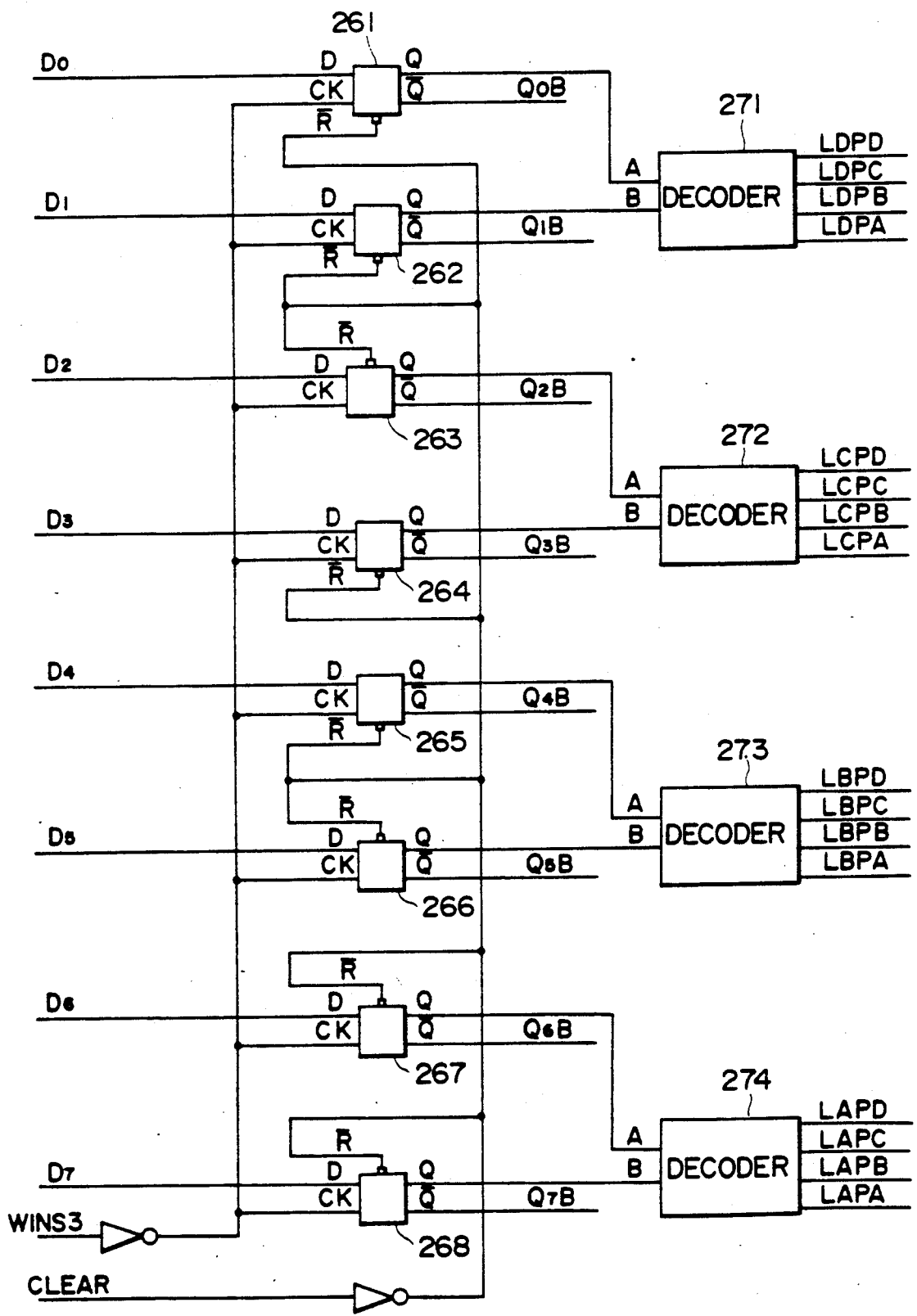
FIG. 20 is a circuit diagram showing a specific example of the instruction register INST3 shown in FIG. 19.

FIG. 20 schematically shows the overall structure of the instruction register INST3. Data $D_0$-$D_7$ supplied from the CPU define control data INDATA to be supplied to the instruction register INST3 with the following significance.

$D_7$, $D_6$: determining which one of the physical ports corresponds to logical port A;

$D_5$, $D_4$: determining which one of the physical ports corresponds to logical port B;

$D_3$, $D_2$: determining which one of the physical ports corresponds to logical port C;

$D_1$, $D_0$: determining which one of the physical ports corresponds to logical port D.

When signal WINS3 has been rendered active, data INDATA from the CPU are taken in by data latches 261-268. An output of each of the data latches 261-268 is input into a corresponding one of decoders 271-274. A selected correspondence between logical ports and physical ports is determined by these decoders 271-274. For example, regarding logical port A, a correspondence with one of a plurality of physical ports is determined by rendering one of LAPA-LAPD active. If it is desired to establish a correspondence between logical and physical ports as follows:

| LOGICAL PORTS | | PHYSICAL PORTS |
|---|---|---|
| A | to | B' |
| B | to | D' |
| C | to | A' |
| D | to | C' | then, input data INDATA from the CPU should have the following value.

| $D_7$ | $D_6$ | $D_5$ | $D_4$ | $D_3$ | $D_2$ | $D_1$ | $D_0$ |
|---|---|---|---|---|---|---|---|
| 1 | 0 | 0 | 0 | 1 | 1 | 0 | 1 |

Thus, an output LPASN from the instruction register INST3 should have the following data.

| DECODER 274 | LAPA 0 |
|---|---|

-continued

|  | LAPB | 1 |
|---|---|---|
|  | LAPC | 0 |
|  | LAPD | 0 |
| DECODER 273 | LBPA | 0 |
|  | LBPB | 0 |
|  | LBPC | 0 |
|  | LBPD | 1 |
| DECODER 272 | LCPA | 1 |
|  | LCPB | 0 |
|  | LCPC | 0 |
|  | LCPD | 0 |
| DECODER 271 | LDPA | 0 |
|  | LDPB | 0 |
|  | LDPC | 1 |
|  | LDPD | 0 |

It is to be noted that the instructions register INST45 is a combination of two instruction registers (i.e., INST4 and INST5) shown in FIG. 19. And, this register is in charge of communication grant/inhibit management for each of the transmission/reception blocks 255-258 and also in charge of management of frequency division for determining the communication speed (i.e., baud rate).

Among input signals from the exterior, signals $\overline{DIVA}$ $\overline{EN}$-$\overline{DIVDEN}$ are signals for designating whether or not the setting of a frequency division is effected by hard lines and they are low active signals. If both of these signals are "H", the communication speed is set by an input data INDATA from the CPU, and data $D_0$-$D_2$ or $D_4$-$D_6$ are taken in by the internal data latch, whereby the frequency division data DVD thus determined are output to the baud generator 254 (transmission/reception clock generator). On the other hand, taking in of data from the data latch is in synchronism with a select signal SEL45 from the address decoder 251. If singals $\overline{DIVAEN}$-$\overline{DIVDEN}$ are low active signals, the frequency division rate of a corresponding port is determined by an input signal DVRA0-DVRA2, DVRB0-DVRB2, DVRC0-DVRC2, or DVRD0-DVRD2 from the exterior irrespective of the contents of the data from the CPU. In this manner, the frequency division rate of a reference clock by the baud generator 256 may be set either by the CPU or by an external signal, and the communication speed (baud rate) of each of ports (channels) A through D may be set freely.

Examples of frequency division rates and baud rates for "L" and "H" conditions of DVR*2, DVR*1 and DVR*0, where "*" indicates A-D corresponding to each port, and for the reference clock CLOCK (14.7456 MHz) are tabulated below.

| DVR*2 | DVR*1 | DVR*0 | F.D. RATE | BAUD RATE |
|---|---|---|---|---|
| L | L | L | 1/24 × 1 | 614.4 KHz |
| L | L | H | 1/24 × ½ | 307.2 KHz |
| L | H | L | 1/24 × ¼ | 153.6 KHz |
| L | H | H | 1/24 × ⅛ | 76.8 KHz |
| H | L | L | 1/24 × 1/16 | 38.4 KHz |
| H | L | H | 1/24 × 1/32 | 19.2 KHz |
| H | H | L | 1/24 × 1/64 | 9.6 KHz |
| H | H | H | 1/24 × 1/128 | 4.8 KHz |

The input data INDATA from the CPU include bits for setting each of logical ports A-D to a communication grant/inhibit condition, and this signal is also latched in synchronism with the select signal SEL45 supplied to the transmission/reception grant/inhibit signal output circuit 260 as an ENBL signal. With this structure, the transmission/reception grant/inhibit signal output circuit 260 outputs a communication grant/inhibit signal ENBLP to each of actual physical transmission/reception blocks 255-258 in accordance with the LPASN data supplied from the instruction register INST3.

Now, a more detailed description regarding the function of the baud generator 254 will be given below. In the first place, the reference clock CLOCK form the exterior is divided in frequency to an appropriate value (e.g., 1/24) by a plurality of T flip-flops and its clock $CK_{24}$ is further divided in frequency to 1/128 by seven T flip-flops. The input/output clocks of these seven T flip-flops are input into four multiplexers where, among eight different kinds of clocks $CK_{24}/1$-$CK_{24}/128$, one which is determined by the frequency division rate data DVD from the instruction register INST45 is selected, and, for example, clock CLKA is output to the transmission/reception block 255 as a transmission clock (TXA). The same arguments hold true for the reception clock (RXA), and transmission/reception clocks CLKB, CLKC and CLKD for other transmission/reception blocks 256-258 are output in a similar manner.

Now, a brief description will be had with respect to the pair of status registers STAT1 and STAT2. One of these pair of registers is a ready register for transmission/reception and the other is an error status register. The CPU may read out the contents of each of these registers by rendering $C/\overline{D}$ to be "H"; however, during read, alteration of the status is inhibited. The function of this pair of status registers will be described later following the description of the transmission/reception blocks.

Figure 21A:
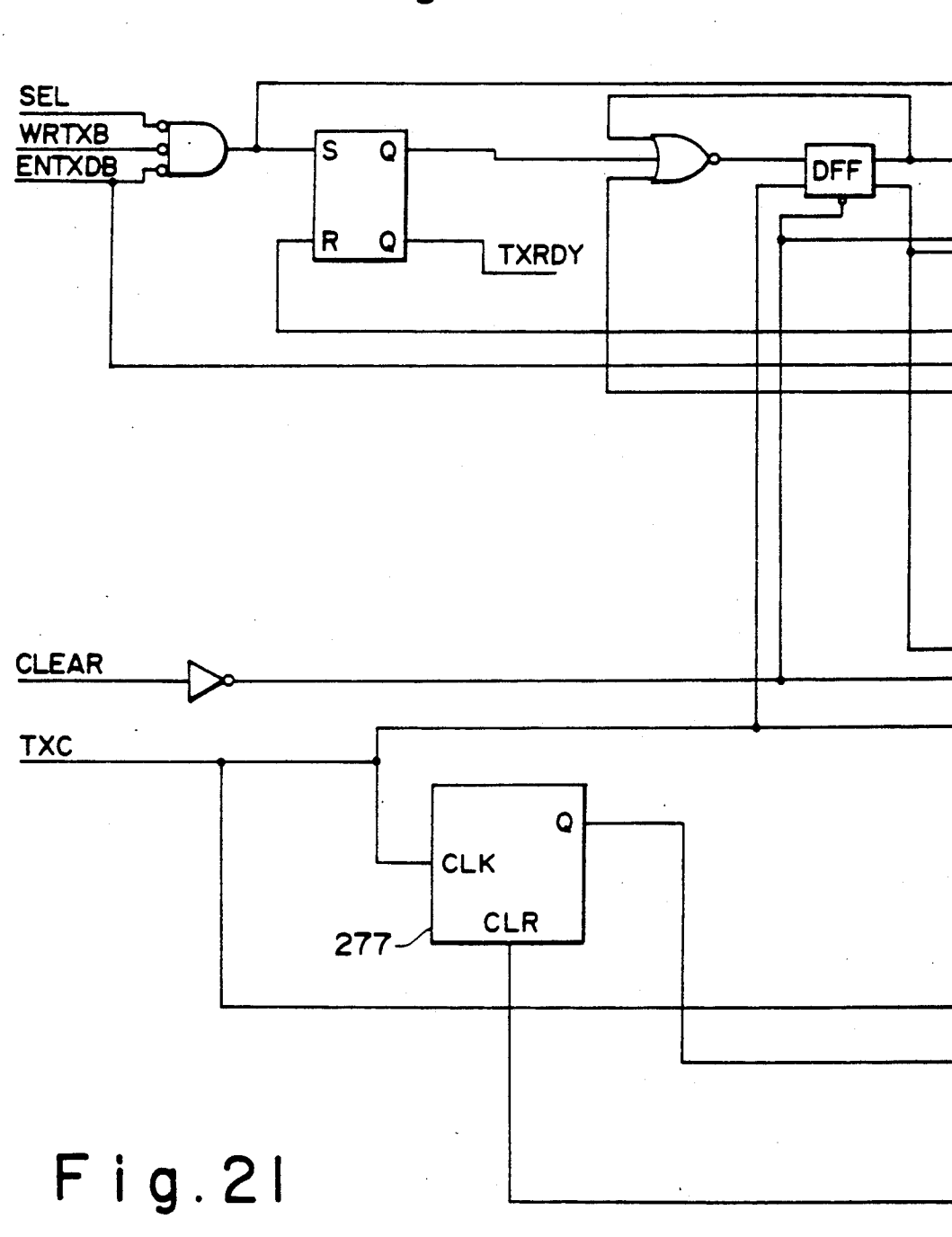
FIGS. 21A and 21B, when combined as shown in FIG. 21, define a block diagram showing partly in logic symbols a specific example of the transmission block within the transmission/reception block.
Figure 21:
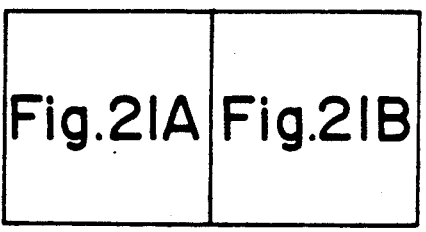
FIG. 21 is an illustration showing how to combine FIGS. 21A and 21B.
Figure 21B:
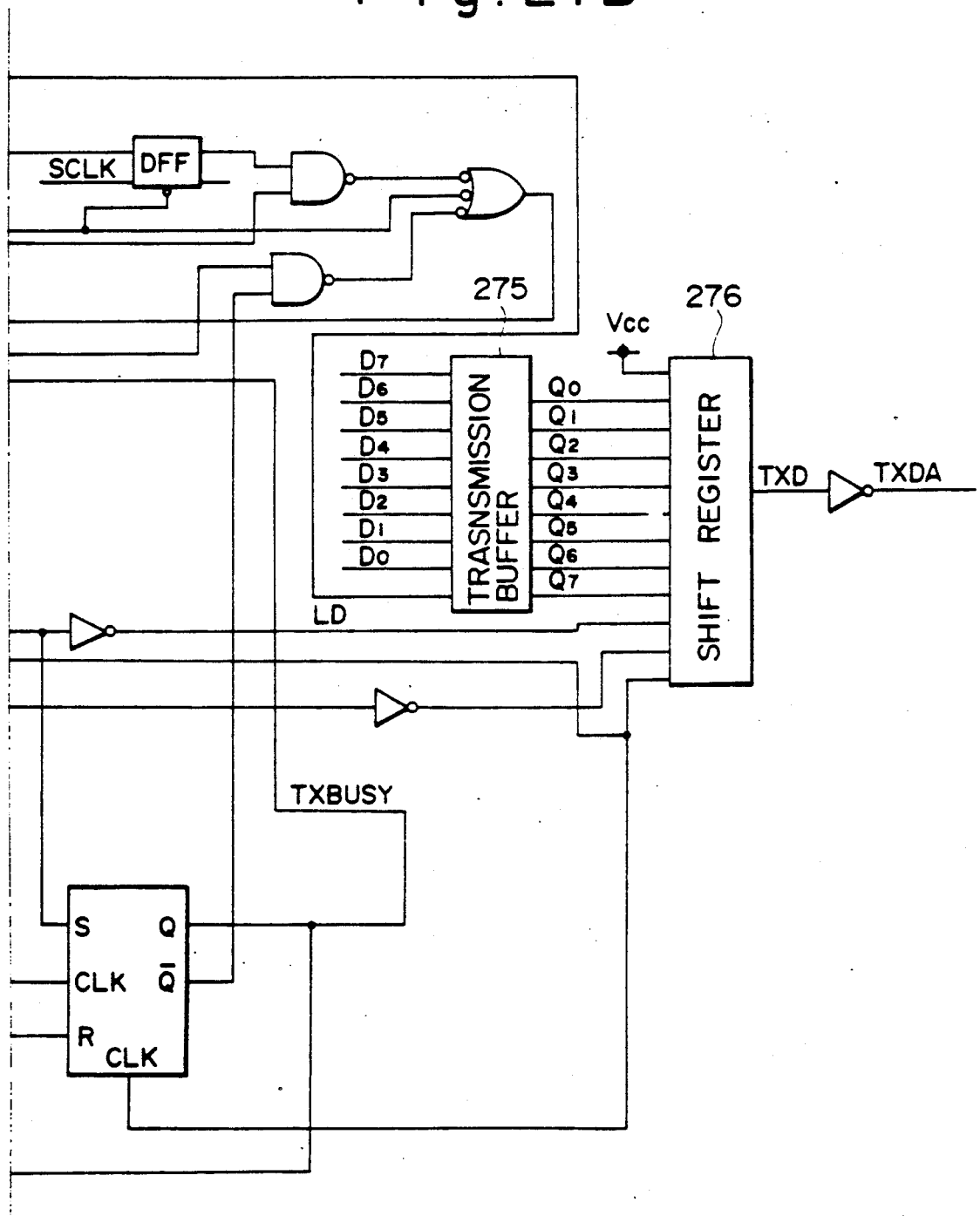
Figure 22:
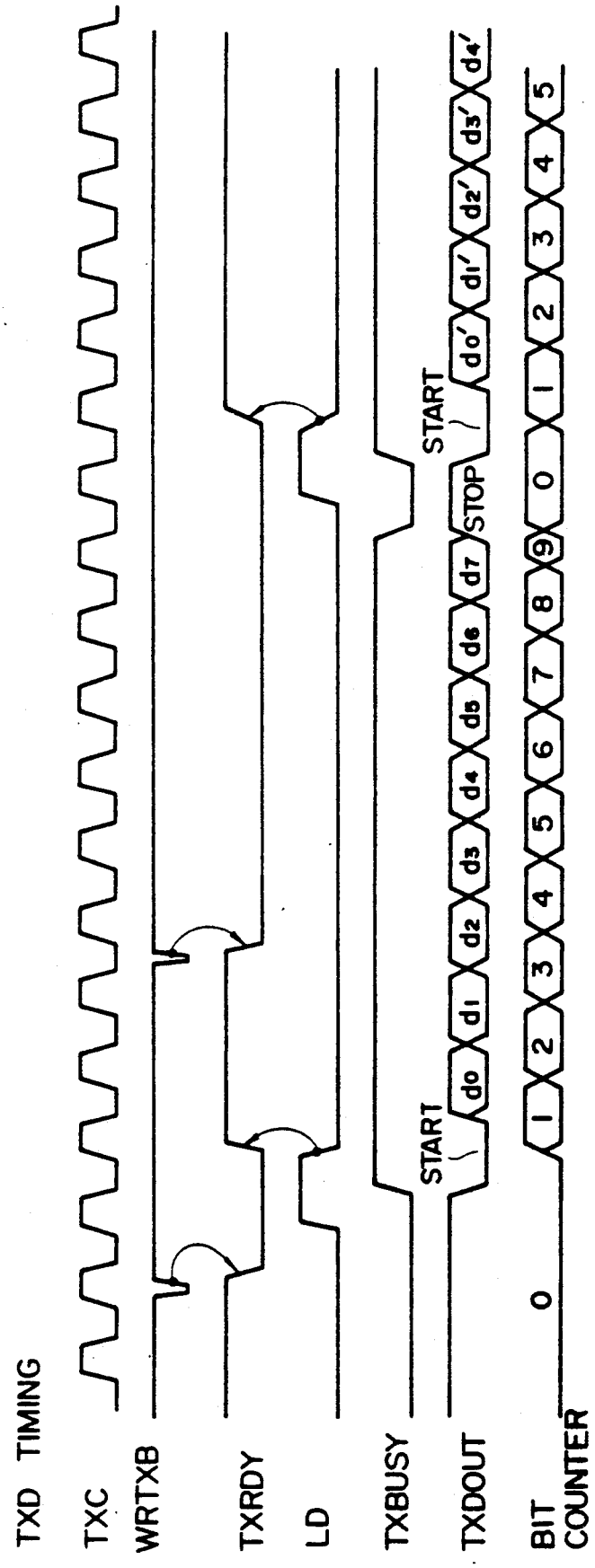
FIG. 22 is a timing chart at the time of transmission, which is useful for understanding the operation of the structure shown in FIG. 21.

Now, the serial port transmission timing of the transmission/reception blocks 255-258 will be described below. FIG. 21 is a circuit diagram showing a specific example of a transmission sub-block in each of the transmission/reception blocks 255-258, and FIG. 22 is a timing chart which will be useful for understanding the operation of the structure shown in FIG. 21. It will be described with port A as a representative example. In FIG. 21, a signal SEL corresponds to a port select signal SELA from the port selector in FIG. 19. Although not shown in FIG. 19, a signal WRTXB is equivalent to a signal $\overline{WR}$ from the exterior. In addition, a signal ENTXDB corresponds to a port enable/disable (grant/inhibit) signal ENA supplied from the transmission/reception grant/inhibit signal output circuit 260. When transmission data INDATA are input into $D_0$-$D_7$ of the transmission buffer 275 from the CPU in synchronism with signal WRTXB, the transmission ready signal TXRDY is deactivated at the rising edge of signal WRTXB. Thereafter, when input signal LD of the shift register 276 is rendered active by clock TX, transmission data are transferred from the transmission buffer 275 to the shift register 276. At this point in time, since inputting of transmission data to the transmission buffer 275 from the CPU is again enabled, signal TXRDY is rendered active at the falling edge of signal LD. Then, the transmission block initiates transmission of serial data from the shift register 276 as signal TXD; however, even during this transmission, the next transmission data may be input from the CPU.

Simultaneously with the initiation of serial transmission of TXD, signal TXBUSY is rendered active to thereby inhibit data transfer from the transmission buffer 275 to the shift register 276 from taking place. On the other hand, the shift register 276 serially outputs transmission data in synchronism with clock TXC in the order of start bit, data bit $D_0, \ldots$, data bit $D_7$ and stop bit. It is to be noted that start bit "L" and stop bit "H" are automatically added to the transmission data by the shift register 276. A bit counter 277 which counts transmission data (i.e., one start bit+eight data bits+one stop bit=10) starts its counting operation with a shift in time of ½ TXC from the transmission of the start bit. When the bit counter 277 has counted to the count of nine, the bit counter 277 is reset by the rising edge of the next clock TXC and at the same time TXBUSY is released. At this point in time, it is made possible to transfer the contents of the transmission buffer 275 to the shift register 276 and signal LD is rendered active. The transmission of serial data is carried out one after another in such a sequence.

Figure 23A:
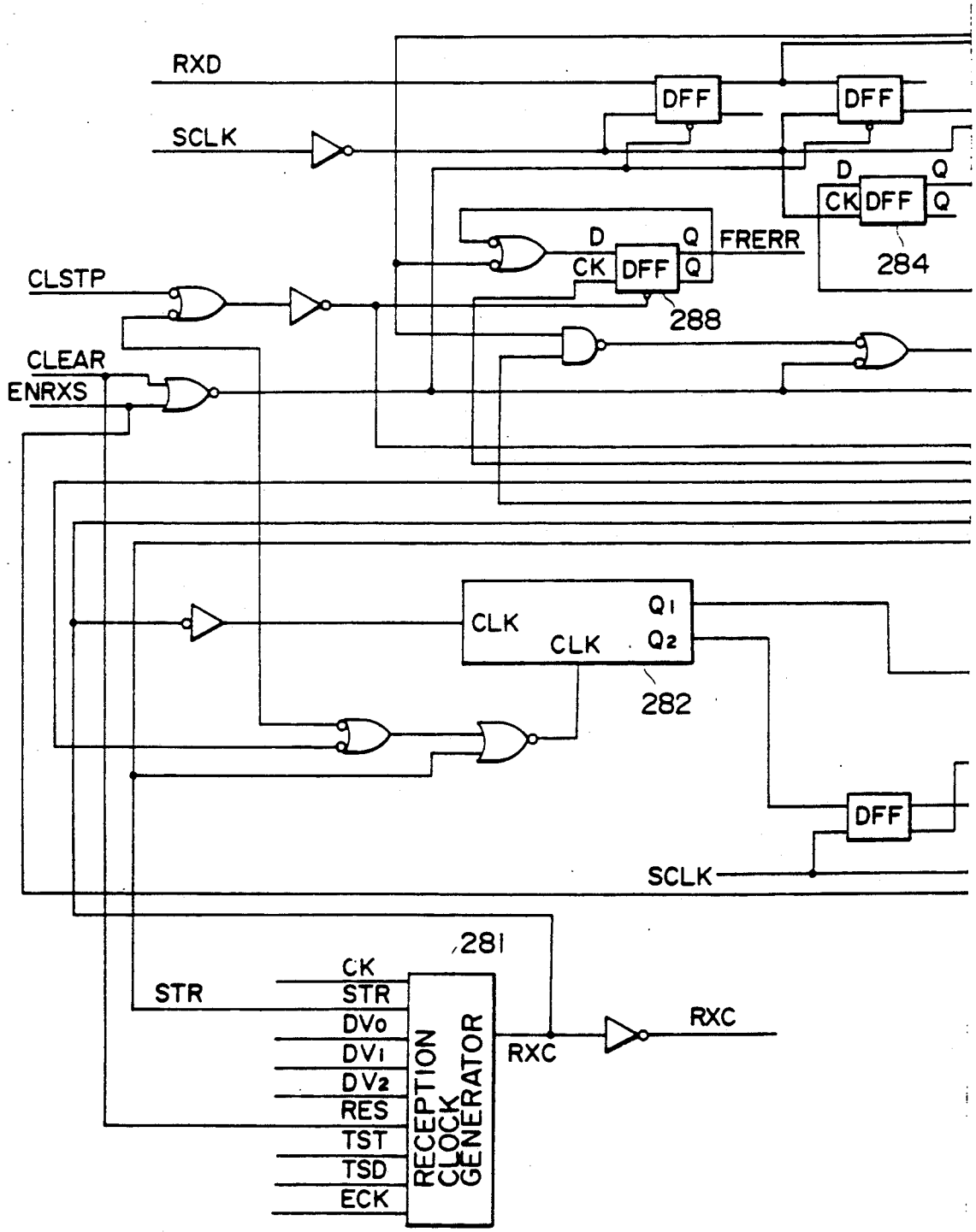
FIGS. 23A and 23B, when combined as shown in FIG. 23, define a block diagram showing partly in logic symbols a specific example of the reception block within the transmission/reception block.
Figure 23B:
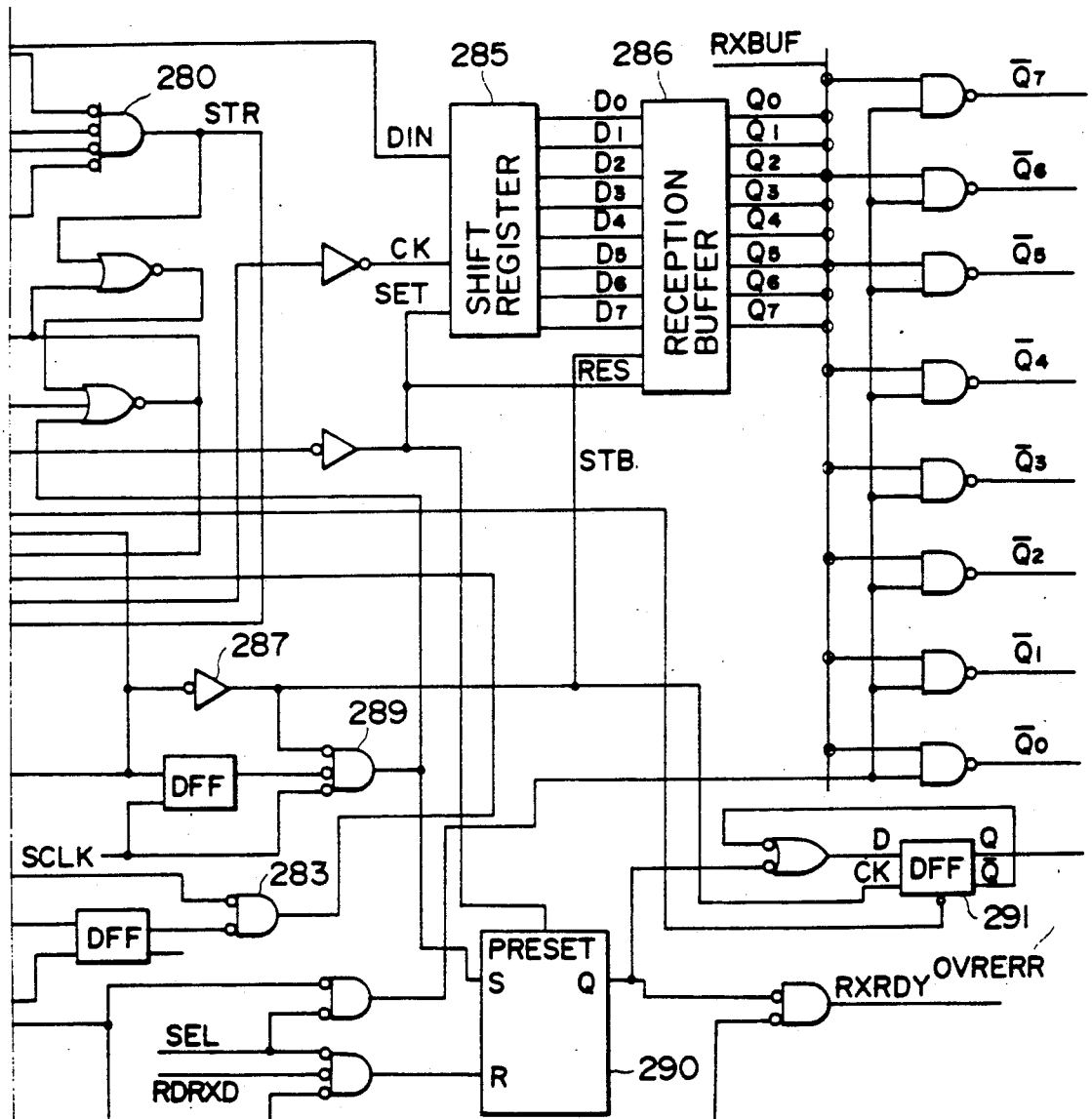
Figure 23:
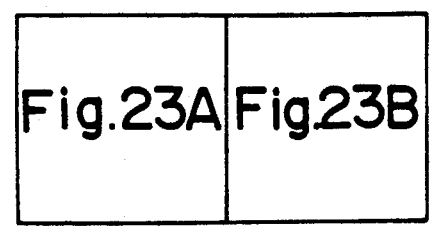
FIG. 23 is an illustration showing how to combine FIGS. 23A and 23B.
Figure 24:
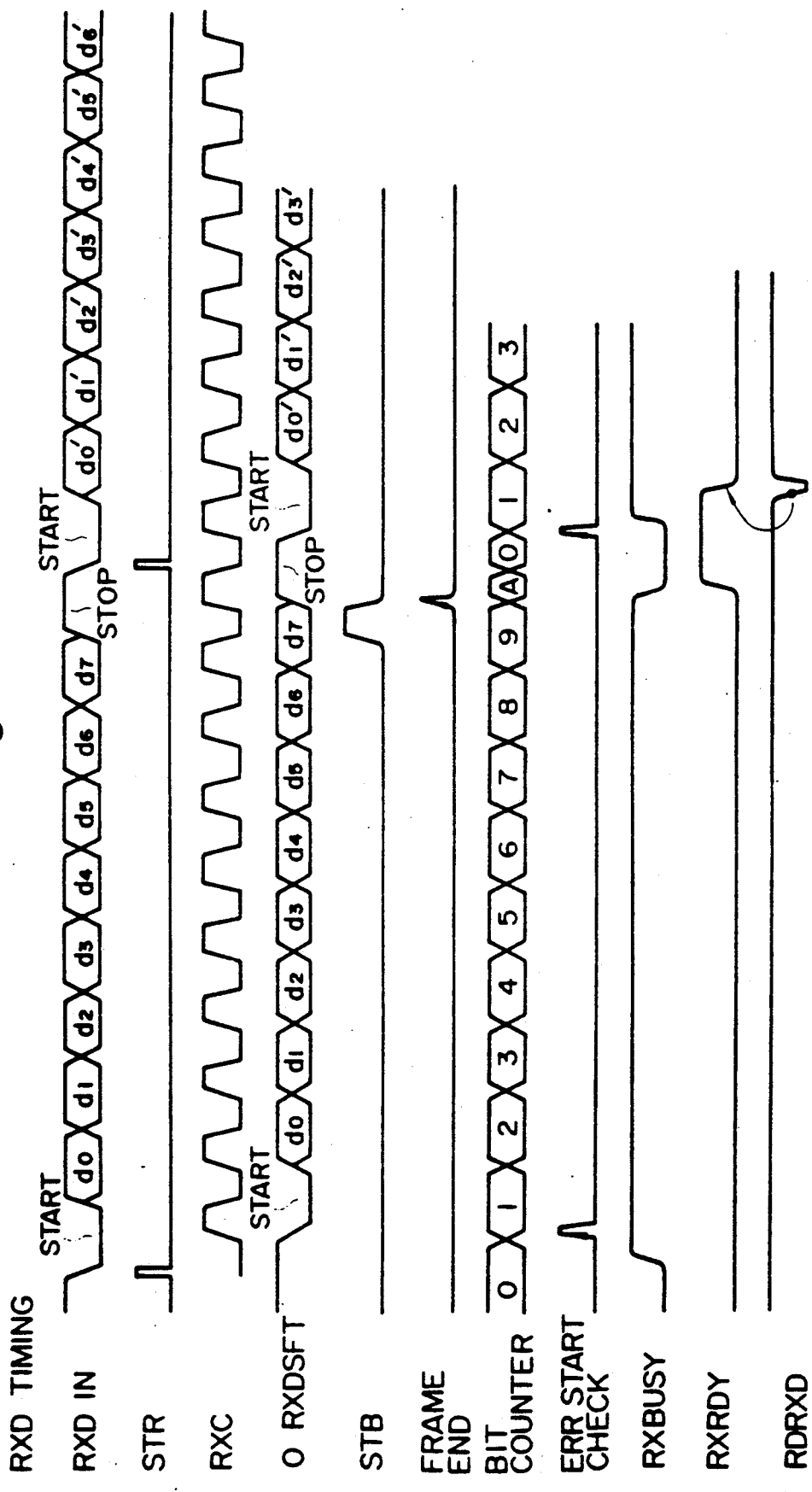
FIG. 24 is a timing chart at the time of reception, which is useful for understanding the operation of the structure shown in FIG. 23.

Next, the serial port reception timing of the transmission/reception blocks 255-258 will be described below. FIG. 23 is a circuit diagram showing a specific example of a reception sub-block in each of the transmission/reception blocks 255-258 of FIG. 19, and FIG. 24 is a timing chart which is useful for understanding the operation of the structure shown in FIG. 23. It is to be noted that, although means for generating reception clock RXC is provided in the reception sub-block in this example, in an alternative structure, this may be provided in the baud generator 254 of FIG. 19. The following description will be made using port A as a representative example.

In the first place, when reception data RXD from the exterior change from "H" to "L", a start trigger pulse STR is generated from a NOR gate 280. The reception clock generator 281 produces reception clock RXC with its phase matched with that of the start trigger pulse STR. At the first rising edge of reception clock RXC after production of start trigger pulse STR, an error status check pulse is produced from the NOR gate 283. Upon production of the error start check pulse, if input signal RXD is "L", i.e., retaining the start bit, a D flip-flop 284 outputs "H" to thereby negate the production of the start trigger pulse STR. On the other hand, if input signal RXD is "H", it is determined as an error start bit to thereby cause the output from the D flip-flop 284 to be "L", thereby setting ready for the production of the next start trigger pulse STR and at the same time clearing the bit counter 282. Under the condition that the start trigger pulse STR has been negated, the shift register 285 receives serial input data from RXD, and this is latched at the center of the input data bit, i.e., rising edge of clock RXC.

On the other hand, the bit counter 282 also starts counting And, subsequent to ½ clock of RXC after the count of the bit counter 282 has reached the value of nine (9), a strobe signal STB is generated from an inverter 287. At the rising edge of this strobe signal STB, the serial input data $Q_0$–$Q_7$ inside of the shift register 285 are latched into a reception buffer 286 and then output to the multiplexer 235 of FIG. 19. At the rising edge of the strobe signal STB, a D flip-flop 288 examines input data RXD and if the data corresponding to the stop bit are "L", it causes output FRERR to be active, thereby reporting the occurrence of framing error to the status register STAT2 of FIG. 19. And, this signal FRERR retains the error status until it is reset by the instruction register INST2.

After falling of the strobe signal STB, the NOR gate 289 produces a frame end pulse to set a S-R flip-flop 290 to thereby cause signal RXRDY to be active. This signal RXRDY is cleared by the falling edge of signal RD when port A has been selected and the multiplexer 253 has read the data of the reception buffer 286. If strobe signal STB has been produced while valid data are present in the shift register 285, i.e., signal RXRDY being "H", it indicates the fact that there were next reception data prior to reading of the reception data by the CPU, so that an overrun error signal OVRERR is output from a D flip-flop 291. This signal OVRERR retains the error status until it is reset by the instruction register INST2 of FIG. 19 in a manner similar to that of framing error.

Under this condition, if the contents of the reception buffer 286 have already been read into the CPU prior to the production of strobe signal STB, no error is produced since signal RXRDY is deactivated.

Now, the function of a pair of status registers STAT2 and STAT2 in FIG. 19 will be described below. When the transmission buffer 275 of FIG. 21 is empty, i.e., at the time of completion of transfer of the last data to the shift register 276, the corresponding transmission/reception block is set in a transfer ready status. At this time, flag TXRDY of the status register STAT1 becomes "1." And, if its transmission port in a non-mask status, line $\overline{\text{TXRDY}}$ is set "L." When the CPU reads out flag TXRDY and transfers the data to the transmission buffer 275 through the data bus line, flag TXRDY is set "0." However, if the other non-mask transmission port is in a ready status, line $\overline{\text{TXRDY}}$ remains active. And, upon completion of transfer of the data within the transmission buffer 275 to the shift register 276, flag TXRDY is again set "1." In addition, if data are input into the reception buffer 286 of FIG. 23, it is determined that a reception operation has been carried out, so that the corresponding flag RXRDY within the status register STAT1 is set "1." Besides, if its reception port is in a non-mask condition, line e/ovs/RXRDY/ to the CPU is set "L."

When the CPU has read out the data inside of the reception buffer 286, flag RXRDY becomes "0"; however, as long as data is present in the other reception buffers of non-mask reception ports, line $\overline{\text{RXRDY}}$ remains active. This status register STAT1 is not affected by the mask/non-mask condition of the instruction register INST1. On the other hand, for a transmission/reception port having an ENBL*flag of instruction register INST45="0", either of flags RXRDY and TXRDY of status register STAT1 becomes "0." On the other hand, if a valid stop bit is not detected at the end of each item of data (i.e., stop bit being equal to "L") at the reception sub-block of FIG. 23 in each of the transmission/reception blocks 255-258, the status register STAT2 determines that a framing error has occurred and thus bit FRE of the port corresponding to this status register is set to "1." In addition, if the next data have been received while there are still data in the reception buffer 286, it is determined that an overrun error has occurred, so that bit OVR of the port corresponding to this status register STAT2 is set to "1."

The above is the only operation when both framing and overrun errors occur, and no positive error recovery operation is carried out specifically. Bits FRE and OVR are both reset by causing bit ERST of the instruction register to become "1."

Figure 26:
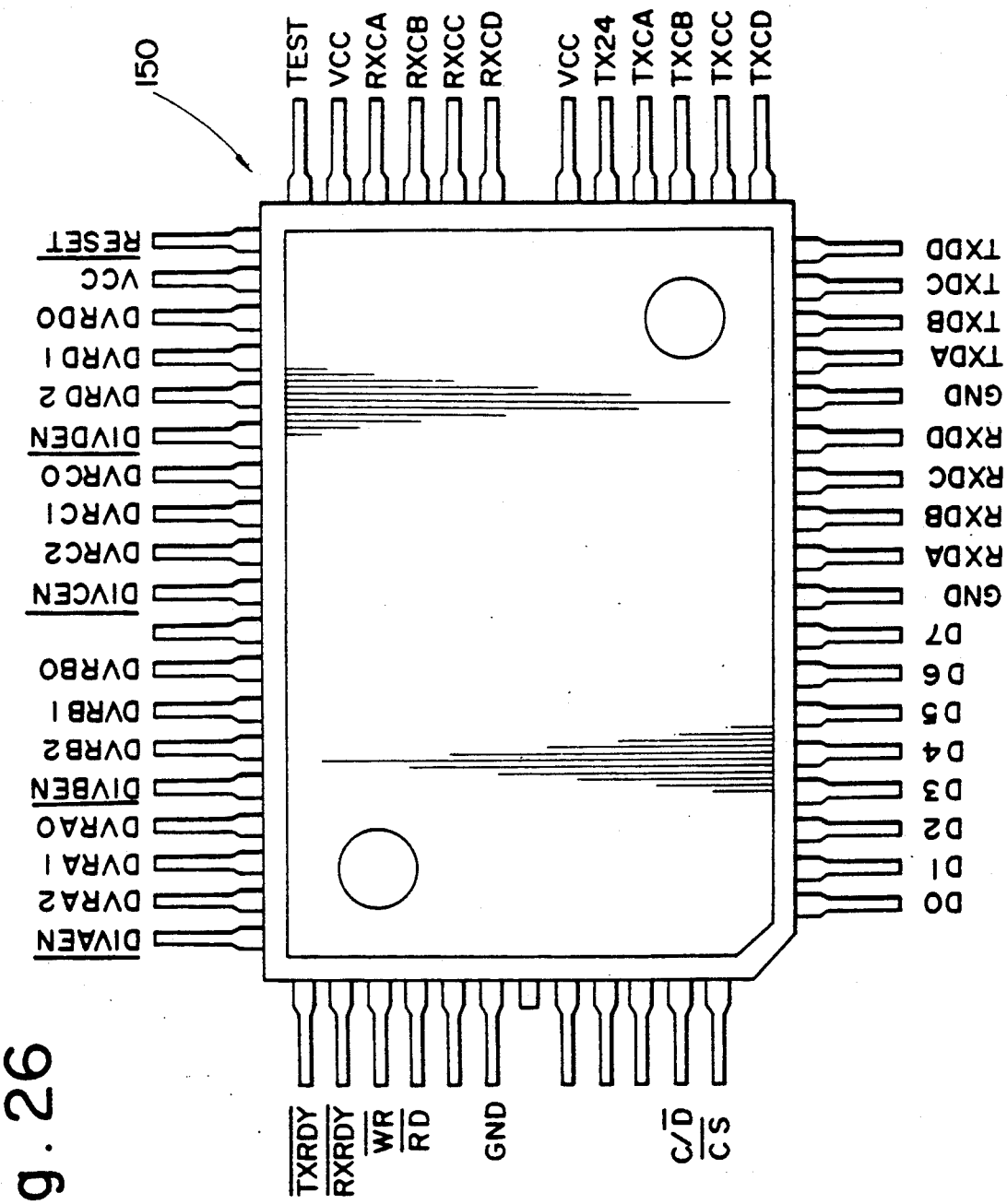
FIG. 26 is a schematic illustration showing on a somewhat enlarged scale an IC chip constituting the CCI circuit of the present embodiment.

FIG. 25 illustrates a register map of each of registers INST1, INST2, INST3, INST45 (INST4, INST5), STAT1 and STAT2 shown in FIG. 19. It is to be noted that the baud rate set by INST4-5 is always determined by the frequency of reference clock CLOCK×1/24×1/n, and only 1/n is illustrated in this map. The communication control interface (CCI) circuit described above may be constructed in the form of a one-chip integrated circuit device as shown in FIG. 26 by forming the circuit enclosed by the dotted line in FIG. 19 integrally in the form of an IC chip. Such an IC embodiment of the present invention will now be described in detail below. The present IC is provided with four serial ports which may be used for asynchronous communication as described above, and full-duplex communication can be carried out with a four channel serial control. The transmission rate may be set either by hardware or by software. In addition, four channel logical and physical addresses can be set freely. The designation of a signal of each pin and its function will be described briefly below. It is to be noted that (I) following the name of each signal indicates an input; whereas, (O) and (I/O) indicate an output and input/output, respectively.

$D_0-D_7$ (I/O): data bus
  Bidirectional tri-state data bus for use in transferring of command, data and status between the IC and the CPU.

RESET (I): reset signal
  Effects reset when at low level.
    (1) Clears or defaults all of the internal registers or internal buffers.
    (2) Renders transmission line outputs TXDA-TXDD in a mark status ("H").
    (3) Enables all of the transmission/reception ports.
    (4) Renders lines TXRDY and RXRDY active.

CS (I): chip select signal
  Data transfer between the IC and the CPU is enabled when "L."

WR (I): write strobe signal
  The contents of data bus $D_0-D_7$ are written into the IC when this signal is "L" and CS is "L."

C/D (I): control/data signal
  It apprises the IC of the fact that the contents on the data bus are data, control code, or status information, together with WR and RD.
    H: control or status; and
    L: data $A_0-A_2$ (I): address input
  Selects the internal register of the IC, including the transmission/reception port.

RXRDY (O): receive ready signal
  Signal for apprising the CPU of the fact that the IC has received and retains data.

CLOCK (I): external clock input
  Reference clock signal for transmission and reception of characters.

TXDA—TXDD (O): transmission data output
  Transmission serial data output of channels A-D.

RXDA-RXDD (I): reception data input
  Reception serial data output of channels A-D.

TXRDY (O): transmission ready signal
  Signal for apprising the CPU of the fact that the IC is in a data transmission enable state.

$V_{cc}$: power supply input
GND: 0V power supply (ground)

As described before, DIV*EN, DVR*2, DVR*1 and DVR*0 (*=A-D) relate to selection of a method for setting the frequency division rate or transmission rate and an externally set input.

TRANSMISSION/RECEPTION BETWEEN LASER PRINTER MAIN UNIT AND OPTIONAL UNITS

Figure 27A:
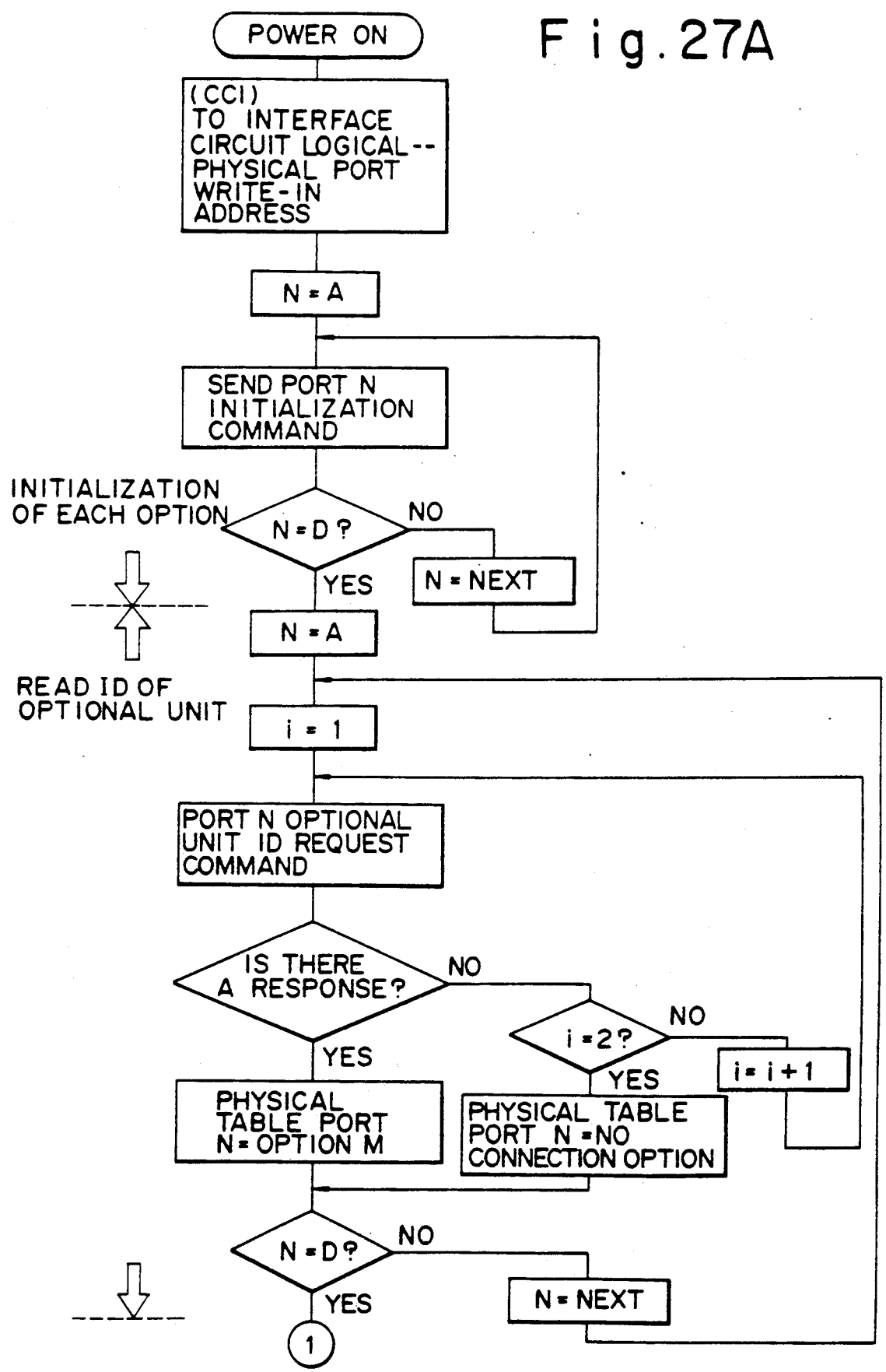
FIGS. 27A and 27B, when combined as shown in FIG. 27, define a flow chart showing a sequence of steps for implementing the recognition of a connected optional unit by the CPU in the main unit and the process for specifying the destination to be connected.
Figure 27B:
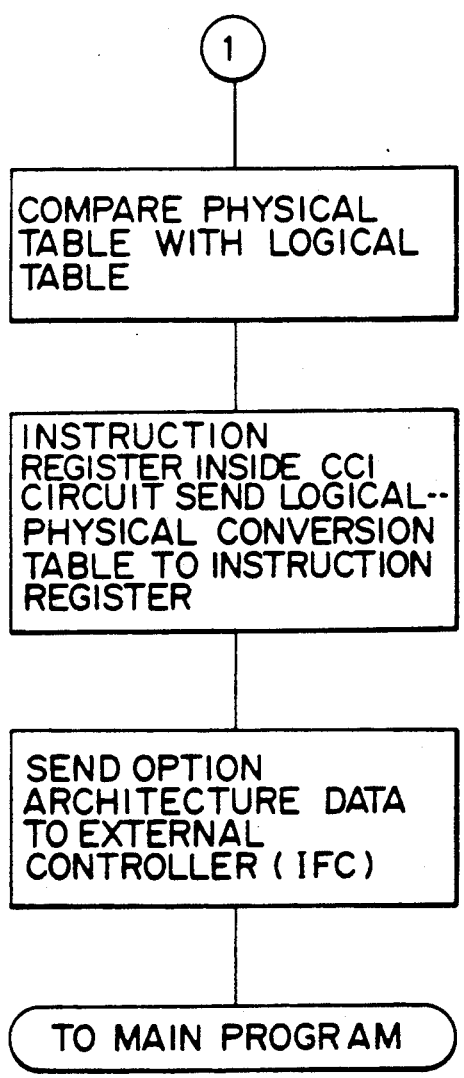

With reference to a flow chart shown in FIG. 27, the recognition of an optional unit and the specification of a unit to be connected will be described.

When the power switch is turned on, the CPU 142 (also referred to as "main unit CPU" hereinafter) within the print engine PCB 51 of FIG. 10 writes provisional logical port assignment data (address) in the instruction register INST3 (FIG. 19) of the communication control interface (CCI) circuit 150. For example, when the data of "11100100" are written, the following correspondence between the logical port and the physical port is established.

| LOGICAL PORT | | PHYSICAL PORT |
| --- | --- | --- |
| A | to | A |
| B | to | B |
| C | to | C |
| D | to | D |

Alternatively, the above-described correspondence is established as a default value after power on of the CCI circuit 150.

Then, a command is supplied to each of the optional units through the logical port A-D for initialization thereof. After a while subsequent to transmission of an initialization command to each of the ports, a request command asking for the ID number of the optional unit connected to each of the physical ports is transmitted. Under this condition, since it has been initialized to set up the condition of logical port A=physical port A, port A seen from the CPU is also a physical port A. If there is no response from the optional unit, such an inquiry is made a predetermined number of times (twice in the example shown in FIG. 27), and if there is still no response, the data of "physical port N=no optional unit connected" are written into the physical table. The physical table within the memory (RAM area) of the main unit CPU has a structure as shown in FIG. 28.

Suppose that a response of ID information from each of the optional units corresponding to physical ports A-D is as indicated below.
A Option Unit #3 (code 011)
B Option Unit #1 (code 001)
C Option Unit #4 (code 100)
D No Response
Under this condition, the data of

"011001100000"

are written into the physical table within the memory of the main unit CPU. On the other hand, let us assume that the logical table within the memory (ROM area) of the main unit CPU has the following data, as shown in FIG. 29.

"001010011100"

This indicates the fact that, on the main program of the main unit CPU, the following optional unit is intended to be connected to each of ports A-D.

| PORT | OPTIONAL UNIT |
|------|---------------|
| A | #1 |
| B | #2 |
| C | #3 |
| D | #4 |

After writing the ID number of an optional unit connected to each of the physical ports in the physical table, the main unit CPU compares the physical table with the logical table to establish the following correspondence between the logical and physical ports.

| LOGICAL PORT | | PHYSICAL PORT |
|--------------|----|---------------|
| A | to | B |
| B | to | D |
| C | to | A |
| D | to | C |

With this correspondence, the main unit CPU knows that communication between the main unit and each of the optional units can be carried out on the main program. As a result, the main unit CPU 142 writes the following data of

"10001101"

into the instruction register INST3 within the ICC circuit 52. After such a correspondence establishing operation, when seen from the main unit CPU side, it looks as if the following connections have been established.

| PORT | | OPTIONAL UNIT |
|------|----|---------------|
| A | to | #1 |
| B | to | #3 |
| D | to | #4 |

Although port B should be connected to the optional unit #2, it is recognized that there is currently no such connection. Thereafter, the main unit CPU 142 supplies the information of optional unit connection status, i.e., connection to optional units #1, #3 and #4, to the external controller (IFC) 52, followed by the step of returning to the main program. In this manner, each of the optional units, such as LCIT, LCOT, MB and DPX, has its unique ID information (device ID) and using such device ID information, the main unit CPU can recognize the identity of an optional unit and determine a proper connection condition between the main unit and each of the optional units.

COMMON USAGE OF A RECORDING MEDIUM ID NUMBER

In this embodiment, an ID number is used for a recording medium, typically a sheet of paper, and this is, for example, an ID number of a recording medium (also referred to as "paper ID" hereinafter) which is assigned by an image forming main unit, or laser printer main unit in the present embodiment. This paper ID is not a data to be recorded on a sheet of paper, but it is a virtual data which is commonly used among the print engine, interface controller (IFC) and each of the optional units. For example, it is assumed that there is such a condition in which six sheets of paper at maximum can be present in the laser printer system. In this case, if a paper ID can be assigned to each of up to six sheets of paper, the IFC, print engine and each of the optional units can determine which sheet of paper is located where in the laser printer system at any instant of time. Thus, in the present embodiment, a 4-bit data item is allotted to this paper ID information and the main unit CPU cyclically assigns an ID number between 1 and F. For example, even in the case where a sheet of paper is printed on its both sides, a paper ID is assigned to each sheet of paper.

With this structure of assignment of a paper ID to each sheet of paper, a paper jam back-up operation from the IFC 52 can be carried out extremely easily, speedily and accurately. For example, if a sheet of paper has jammed within the laser printer, the data recorded thereon is lost, and, thus, it is necessary to record the same data once again on another sheet of paper. However, in known prior art structures, since there is no means for keeping track of the data which has been lost, it was necessary for the operator to make a guess and to supply new data to the print engine to obtain another print. However, such a prior art method based on guessing is unreliable and more prints than necessary could be taken just to obtain a single desired print.

In accordance with the present embodiment, in order to obviate such a disadvantage, a virtual paper ID is assigned to a sheet of paper to be recorded and this paper ID information is commonly used among the IFC, print engine and each of the optional units connected to the main unit. With this structure, even if paper jamming has occurred, the IFC 52 can make an inquiry as to the paper ID of the paper which has jammed in the print engine 51 to thereby determine which of the data have been lost and thus need to be recorded again. In this manner, the paper jam back-up operation can be carried out expeditiously with high accuracy.

The IFC 52 compares the paper ID information received from the print engine 51 at the time of initiation of recording with the paper ID information received from the main unit at the time of completion of paper discharging operation, so that the IFC 52 can keep track of the up-to-date paper ID information of sheets of paper remaining in the entire system at all times. As a result, when paper jamming has occurred, the IFC 52 can determine which of the sheets of paper now being processed in the laser printer system as a whole has jammed. Therefore, such a structure allows to carry out a paper jam back-up print operation based on the information supplied from the IFC 52 with ease. In addition, since this paper ID information is commonly used by each of the optional units connected to the main unit, the work load of the main unit CPU 142 may be mitigated. For example, among such optional units as paper feed, paper discharge and both side processing optional units, after transferring paper ID information to those optional units which are located on a paper transportation path selectively defined by the IFC 52, the main unit CPU 142 may erase the paper ID information from its memory for the corresponding sheet of paper located in the main unit 1. In this case, if the selectively defined paper transportation path is such that it is routed back again to the main unit 1 so that a sheet of paper once discharged out of the main unit 1 again returns to the main unit 1, it may be so structured that the right of management of paper ID information is once transferred to the optional unit to which the sheet of paper is transferred from the main unit 1 and then the right of management of paper ID information is once again transferred to the main unit 1 from the optional unit at the time when the sheet of paper is again transported into the main unit 1.

Furthermore, if paper jamming has occurred in an optional unit, since the optional unit keeps the paper ID information of the sheet of paper which has jammed, the optional unit may transmit the paper ID information to the main unit 1 and thus to the IFC 52. In this manner, in the above-described embodiment of the present invention, it is not necessary for the CPU of the laser printer main unit to manage all of paper ID information for the sheets of paper in the laser printer system at all times, and it is advantageous to transfer paper ID information among the main and optional units every time when such information is required.

Figure 30:
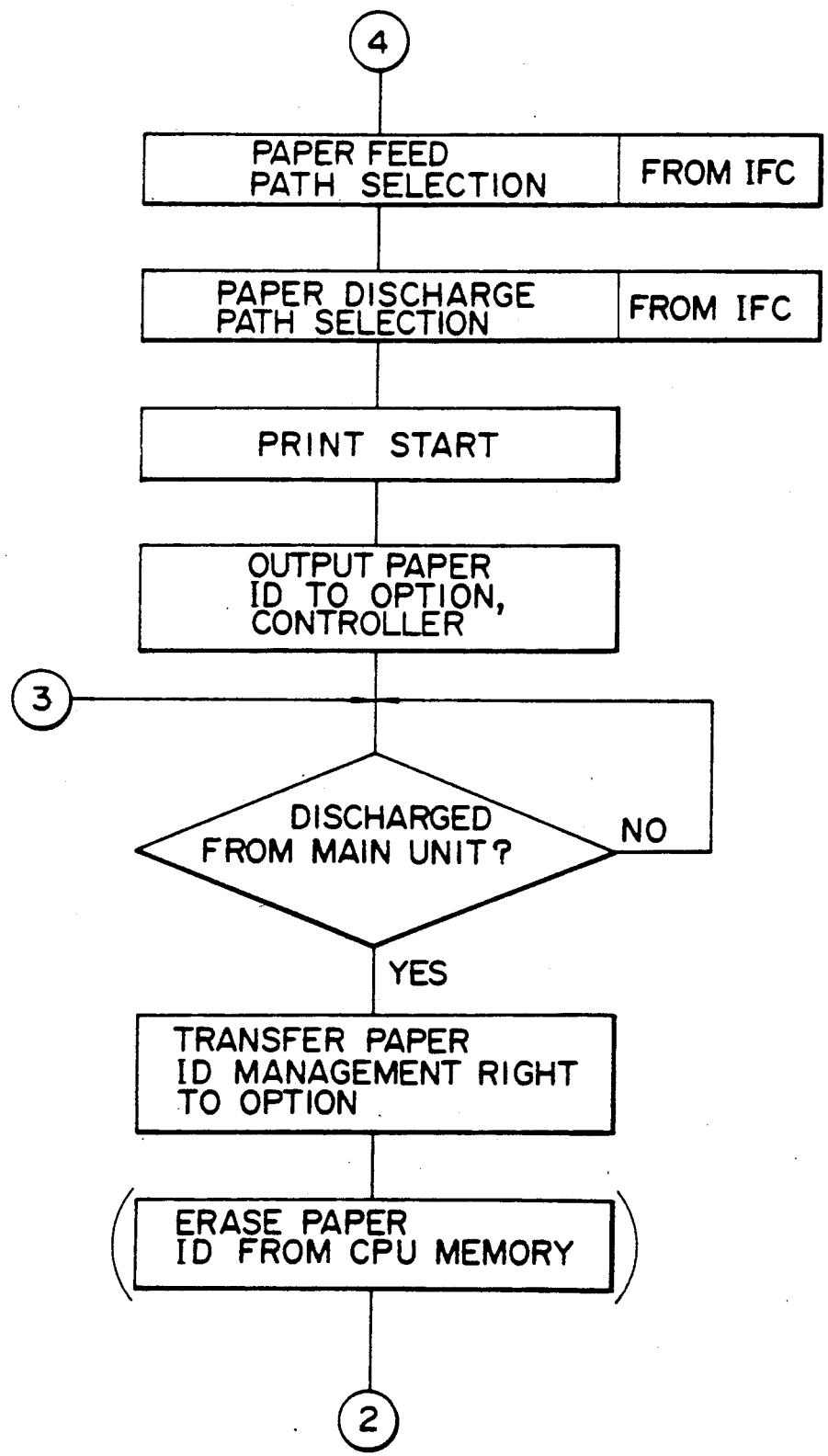
Figure 31:
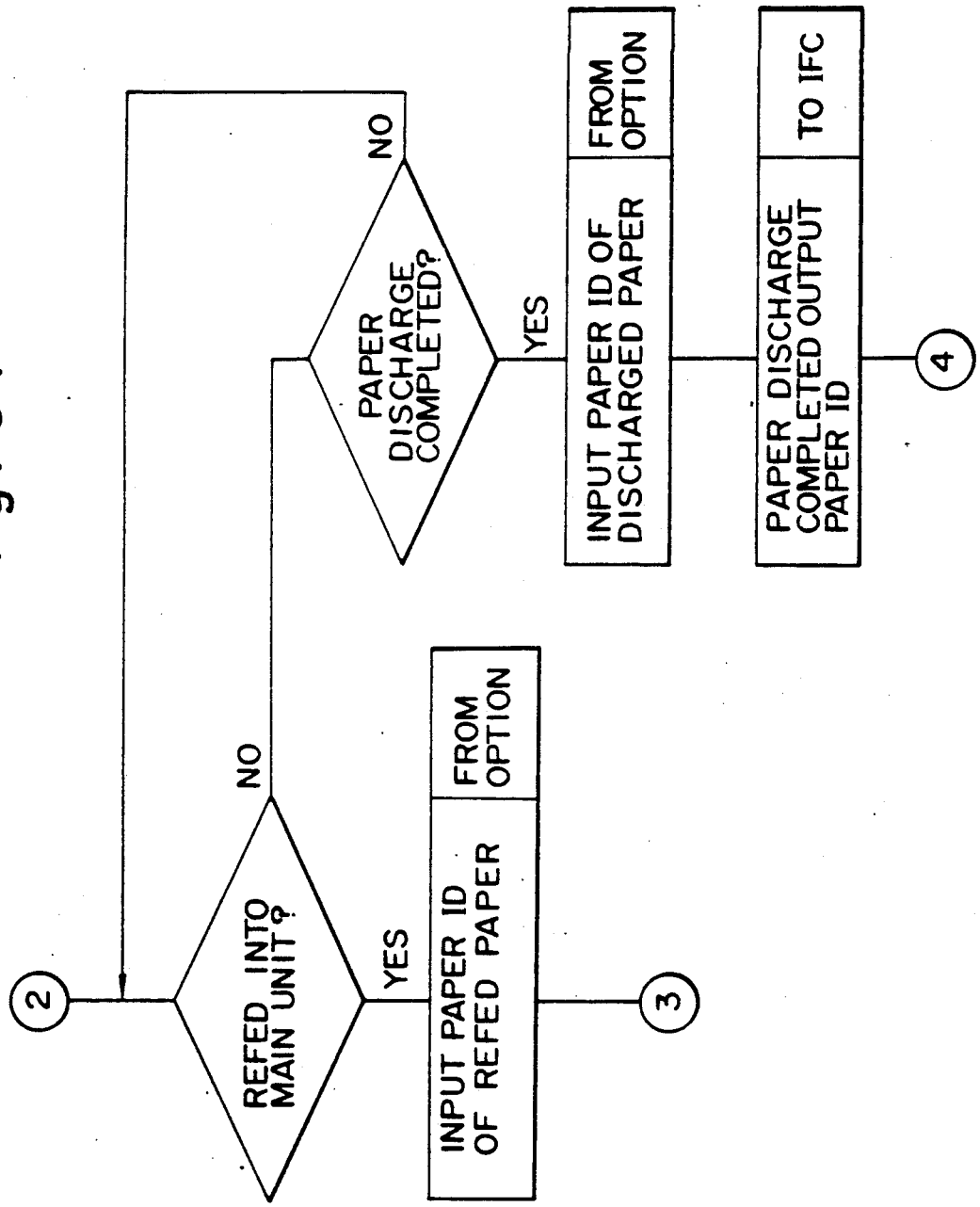
Figure 33:
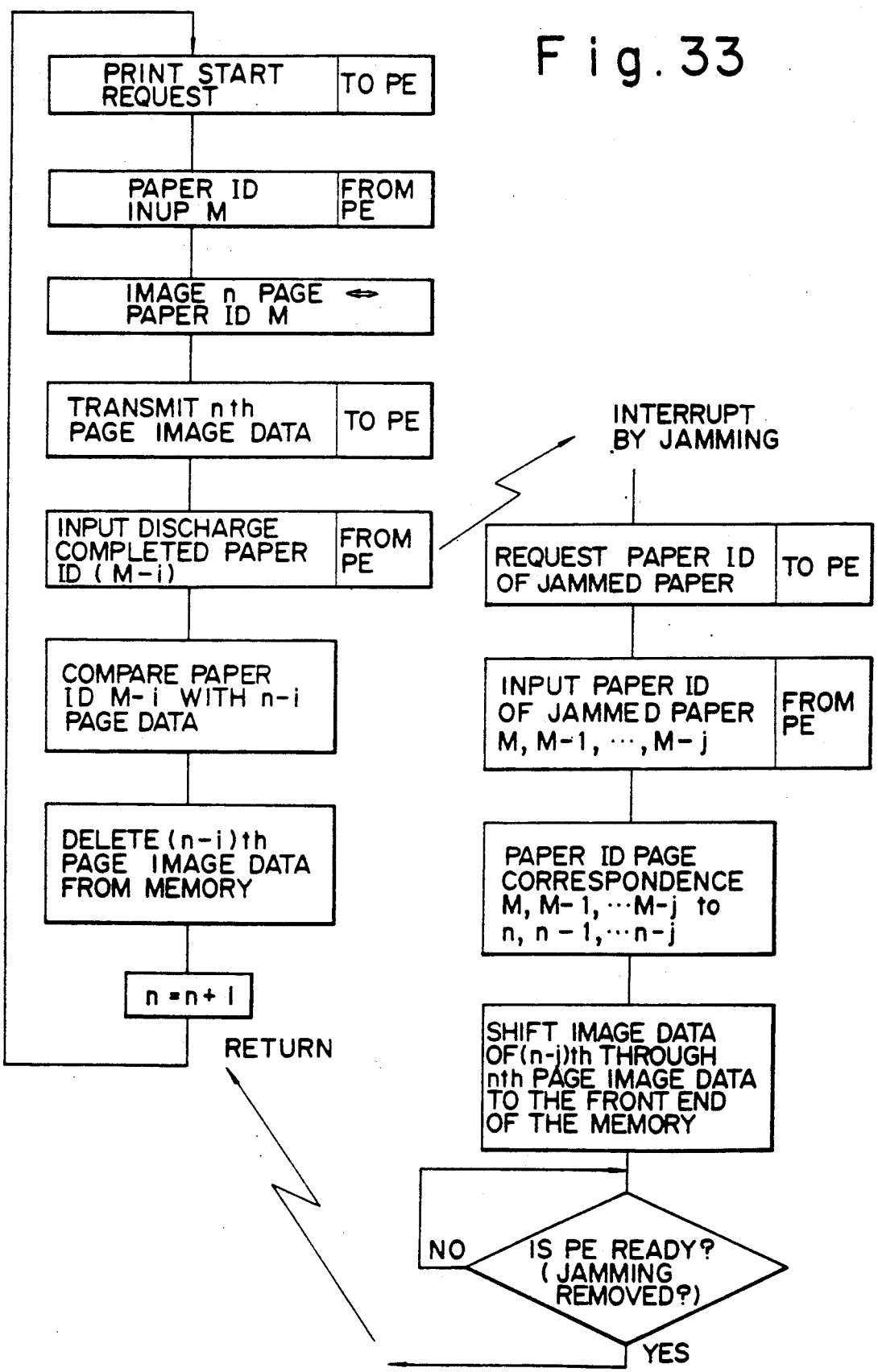
FIG. 33 is a flow chart showing a sequence of steps relating to the so-called paper ID at the IFC side.

The operation regarding the processing of paper ID information at the side of the main unit CPU 142 as described above is illustrated in the form of a flow chart in FIGS. 30 through 32. FIG. 32 is a flow chart showing a sequence of steps of an interrupt process at the time of occurrence of paper jamming. In this case, the paper ID information of the paper jammed in the main unit 1 is transmitted to the IFC 152, and if there is any other paper jammed in any of the optional units connected to the main unit 1, then the paper ID information of such jammed paper is also transmitted to the main unit 1. And, these paper ID information of all of the jammed paper is supplied to the IFC 152. Thereafter, if paper jamming has been cleared in the main unit 1 and also in all of the optional units connected to the main unit 1, a system ready signal is supplied to the IFC 152 to thereby terminate the interrupt process and thus return to the main routine. FIG. 33 is a flow chart showing a sequence of steps of an operation relating to paper ID information at the side of the IFC 152.

CONTROL FUNCTION IN PRINT ENGINE

The control of the print engine in the present embodiment is carried out by the print engine PCB 51 shown in FIGS. 9 through 11, 15 and 16, and its control function, in general, includes the following three blocks.
(A) Sequence Control Block
(B) Video Interface Control Block
(C) Communication Control Block Any of these three control blocks is associated with the CPU 142, and the sequence control block is a block having its main basis in the CPU 142 and is in charge of a sequence control of each component of the print engine unit itself at the time of printing and also in charge of a sequence control of a part of optional units. The video interface control block is a block having its main basis in the video control circuit 149 and it exchanges signals with the IFC PCB 52 and controls the semiconductor laser driver circuit to thereby control writing of image data on the photosensitive drum 29 by a laser beam. On the other hand, the communication control block may be further divided into two sub-blocks, one of which is a sub-block having its main basis in the before-mentioned communication control interface (CCI) circuit and controlling communications with each of the optional units, such as LCIT, DPX and MB, which are connected to each of its serial interface ports through optical fiber cables and also with the control/display panel 11. The other sub-block of the communication control block is a sub-block having its main basis in the CPU, which controls transmission and reception of data with the IFC PCB.

Figure 34A:
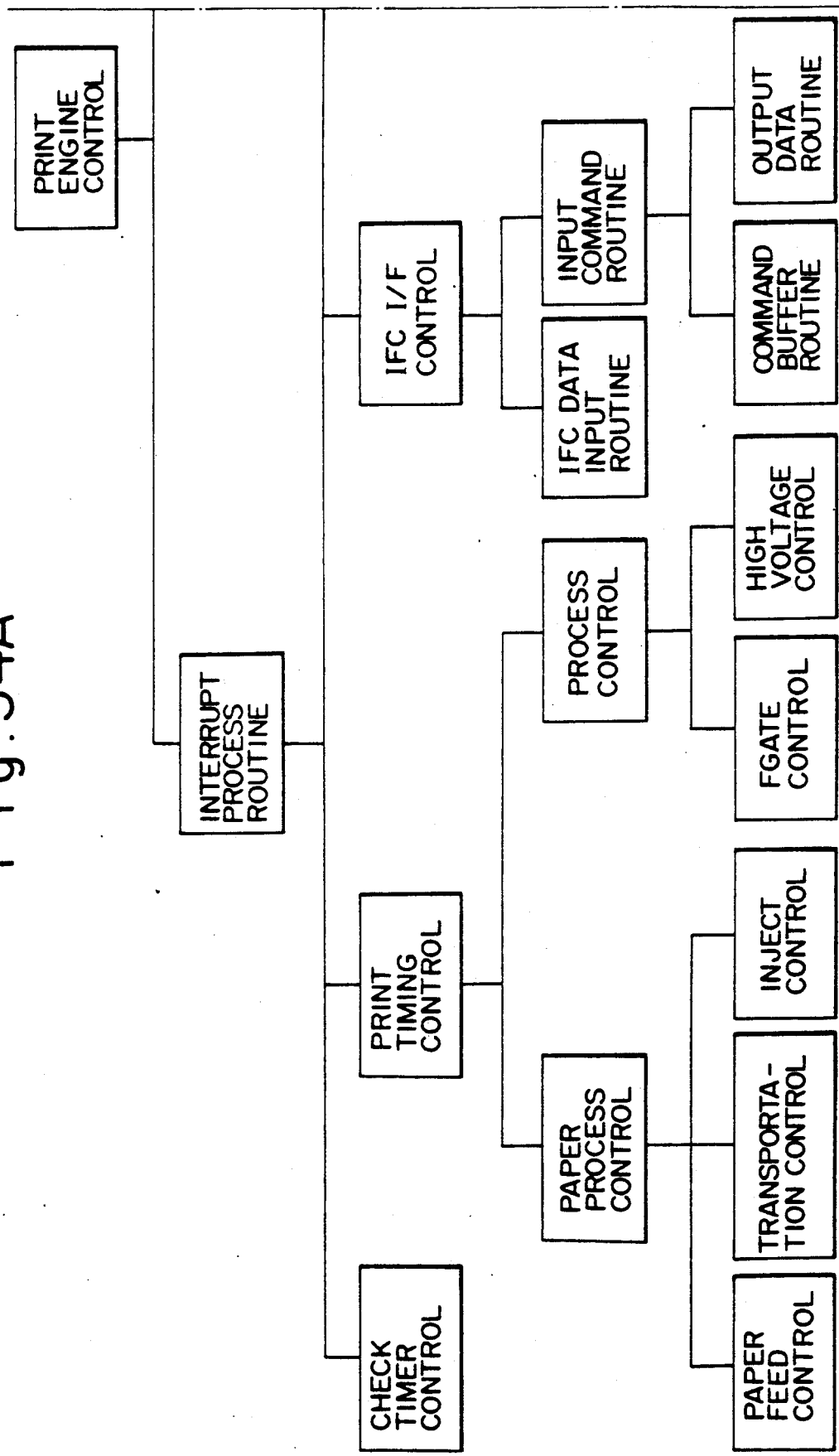
FIGS. 34A and 34B, when combined as shown in FIG. 34, define a functional block diagram of sequence control in the print engine of the present laser printer system.
Figures 34, 34B:
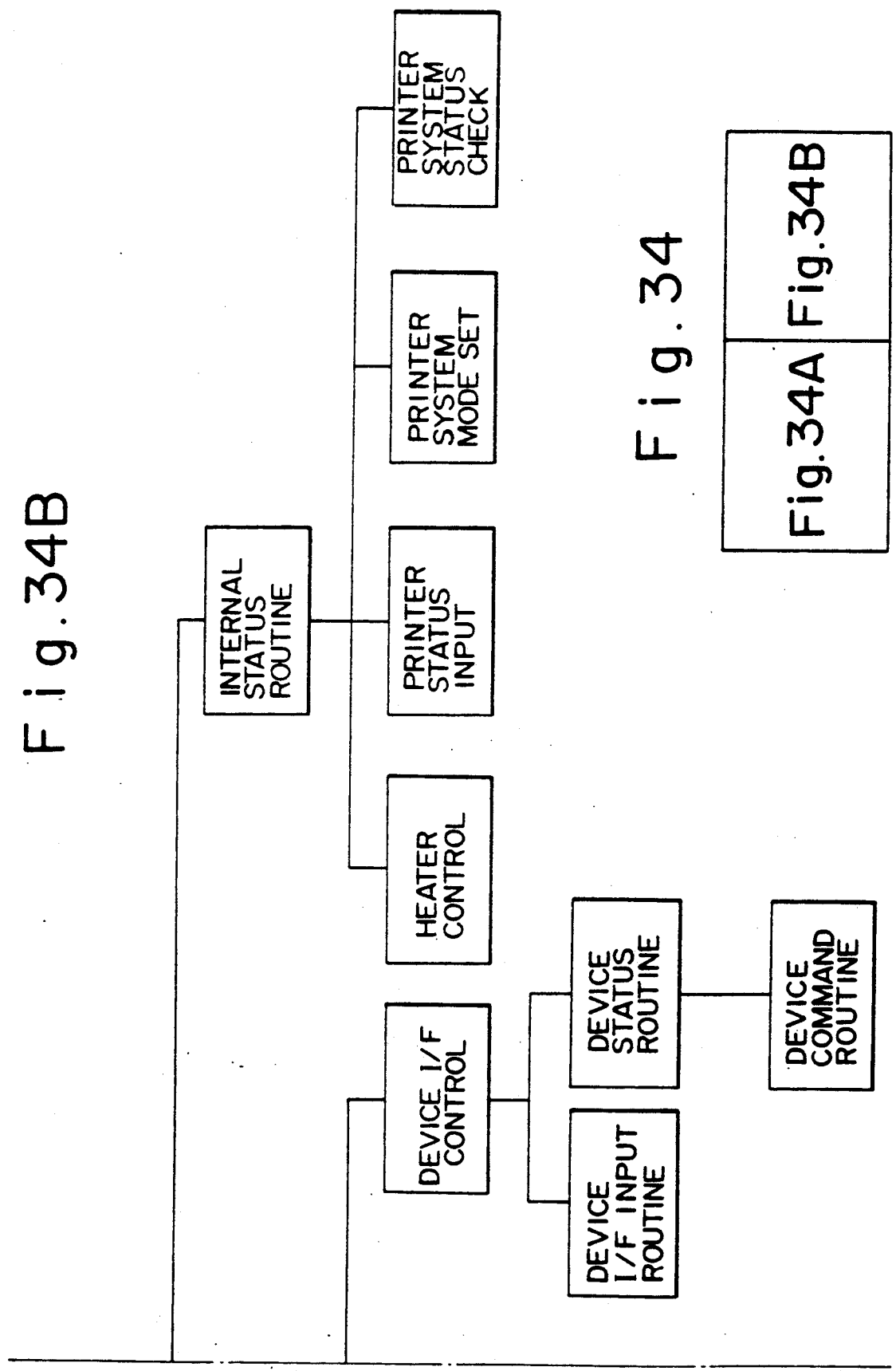
FIG. 34 is an illustration showing how to combine FIGS. 34A and 34B.

The control function of the CPU in the print engine is shown in block form in FIG. 34. This control function includes an interrupt process routine and an internal status routine, and the interrupt process routine includes such control functions as check timer control, print timing control, IFC I/F control and optional unit I/F control functions. On the other hand, the internal status routine includes such control functions as image fixing device heater control, printer status input (monitoring of various sensors), printer system mode set (setting of mode, such as normal print mode, test print mode and error occurrence) and printer system status check (analysis and diagnosis of input data from sensors). The print timing control function in the interrupt process routine includes a paper process control function for controlling paper feeding, transportation and paper discharging operations and a process control function for controlling FGATE (image writing control signal) and also the application of a high voltage to each of the corona discharge units.

On the other hand, the IFC I/F control function includes an IFC data input routine for temporarily storing the input data from the IFC 52 and also an input command routine which in turn includes a routine for determining whether to supply the data into a command buffer or not and a routine for forming an output data. The device I/F control function, on the other hand, includes a device I/F input routine for inputting a data from an optional unit and also a routine which in turn includes a device status routine and a device command routine for outputting a command for controlling the device (optional unit) after examining the status of the device (optional unit).

Figure 35A:
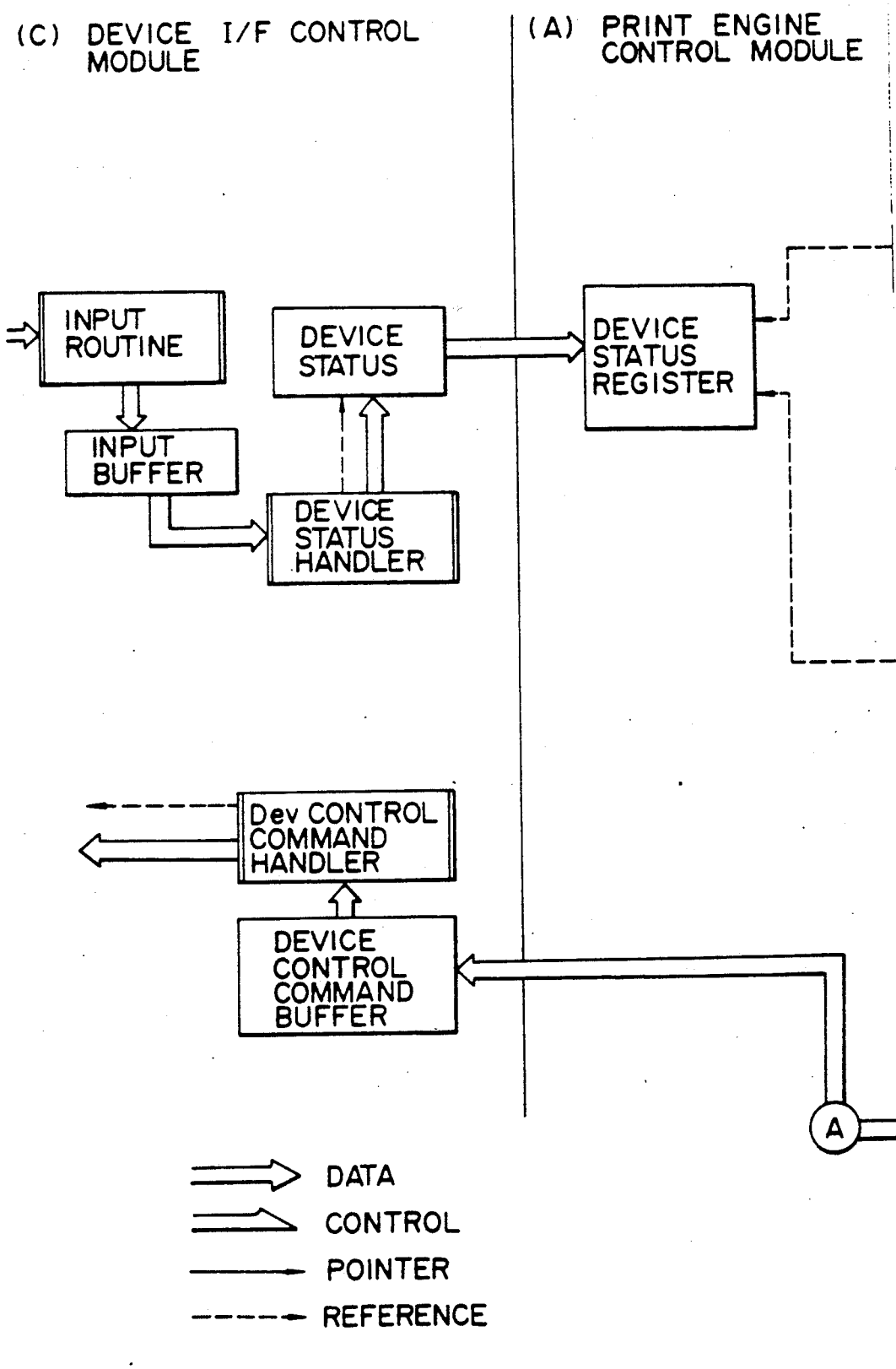
FIGS. 35A through 35C, when combined as shown in FIG. 35, define a data flow chart showing the flow of data for controlling the operation of the print engine.
Figure 35B:
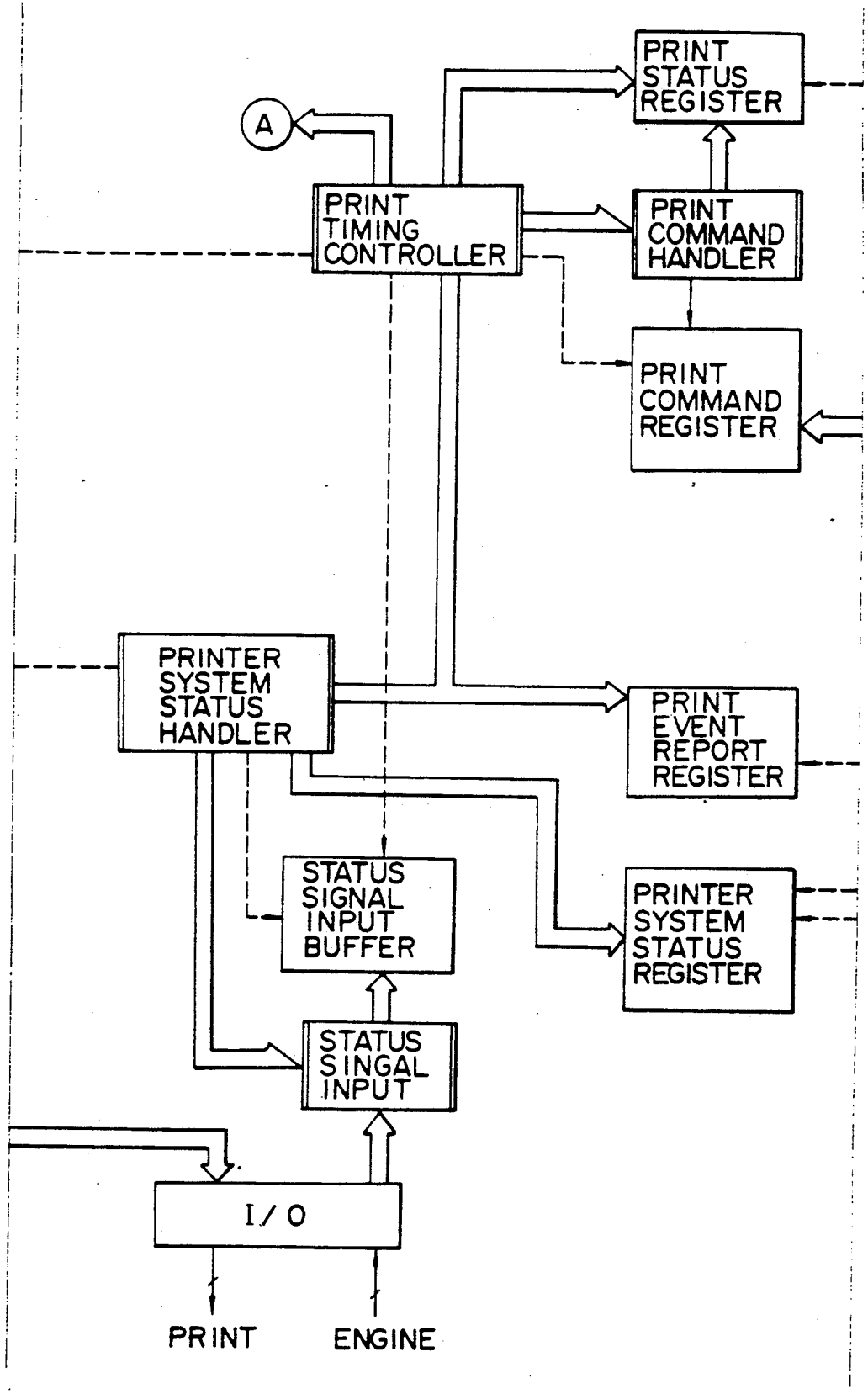
Figure 35C:
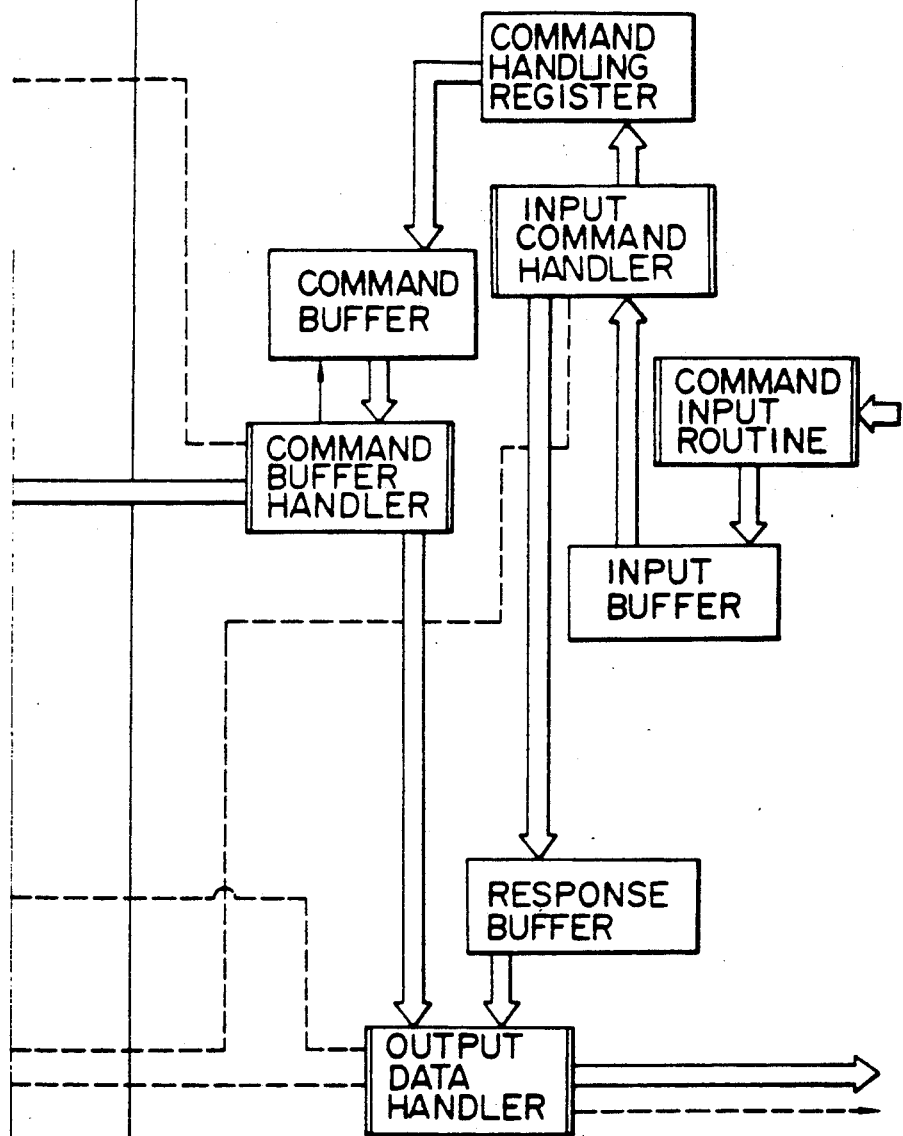
Figure 35:
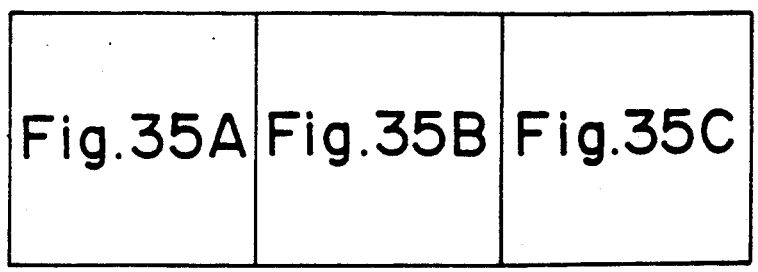
FIG. 35 is an illustration showing how to combine FIGS. 35A through 35C.

FIG. 35 shows the flow of data inside of the CPU 142 employed in the present print engine. As shown, the CPU 142 has (A) print engine control module which is associated with the above-described sequence control block and (B) IFC I/F control module and (C) device I/F control module, which are associated with the above-described communication control module block.

COMMUNICATION METHOD (A) Communication Between Interface Controller (IFC) and Print Engine (PE)

Communications between IFC and PE are carried out by the above-described CCI circuit or by another independent serial communication means. For transmission from IFC to PE, PE immediately executes a process in accordance with the contents of information received from IFC in accordance with its interrupt process during reception. On the other hand, for transmission from PE to IFC, in the first place, PE causes a service request signal SQR to be "true", and in response thereto IFC transmits an inquiry command. As a result, PE causes SQR to be "false" and at the same time initiates its transmission. Alternatively, it may also be so structured that PE transmits data to IFC in an asynchronous manner and then transmits the next data upon receipt of confirmation of receipt of the previous data from the IFC.

(B) Communication Between Print Engine (PE) and Each of Optional Units

Figure 36:
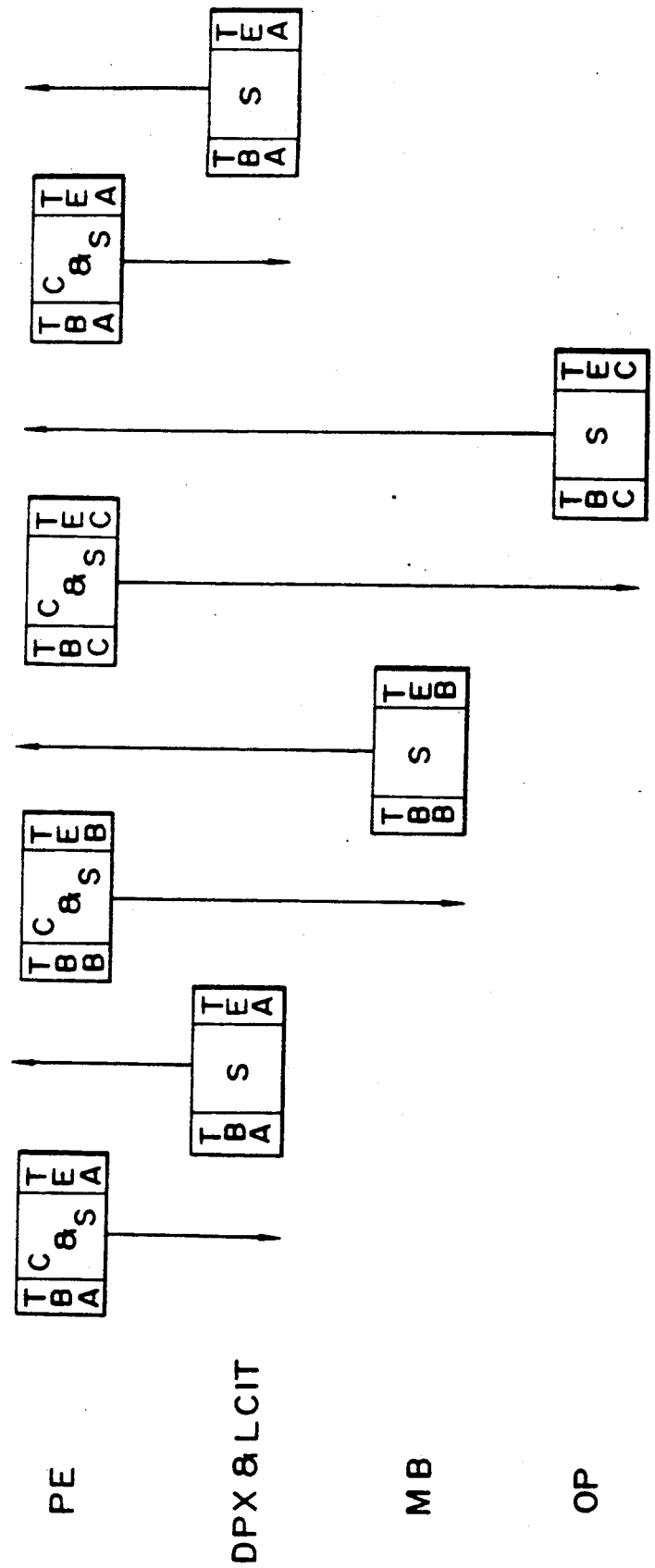
FIG. 36 is an illustration showing communications between the print engine and each of the associated devices.

Communications between the PE and each of the optional units, including the both side and large quantity paper feed unit (DPX and LCIT), mail box (MB) and control/display panel (operation panel: OP), are carried out in a polling scheme. That is, it is so structured that each of the optional units always respond to such signals as command, status, status request and inquiry signals supplied from the PE. For transmission from the PE to the optional units, a transmission start (TB) code is first transmitted and a transmission end (TE) code is also transmitted at the end of transmission, whereby both of these codes include device ID information which identifies an optional unit to which data is to be transmitted. For transmission from each optional unit to the PE, the TB code is transmitted first and the TE code is transmitted at the end. This communication scheme is illustrated in FIG. 36.

(C) Processing When Communication Error Occurred

In communication between the PE and each of the optional units, if the receiving condition satisfies one of the following three conditions, then a re-transmit request signal is supplied.
(1) When a communication error, such as overrun error or framing error, has been detected.
(2) When an illegal code has been received.
(3) When no data has been received beyond a predetermined time period.

Upon receipt of this re-transmit request signal, the transmitting unit carries out a re-transmit operation at an appropriate timing. After re-transmission, if the receiving condition again falls onto one of the above-described three conditions, the receiving unit determines it to be an occurrence of communication error and then carries out a predetermined operation.

In communications between the IFC and the PE, if the receiving condition at the PE satisfies either of the conditions (1) and (2), the PE transmits a code which indicates the fact that the received data cannot be understood to the IFC. If the condition (1) or (2) has occurred twice or more in a row, the PE determines it to be the occurrence of a communication error to thereby transmit a "communication error event report" to the IFC and establish a condition which does not receive any other command than a "INITIALIZE" command.

(D) Explanation Using A Timing FLow Chart

FIGS. 37 through 41 show in timing chart the contents of communication between the PE, IFC and each of the optional units and the operation of each of the units. FIGS. 37 through 41 illustrate timing charts during the normal printing mode, during the limitless printing mode, at the time of occurrence of print engine jam and paper feed unit jam and at the time of occurrence of paper discharge unit jam, respectively. In FIGS. 38 through 41, signal $\overline{\text{FGATE}}$ is a control signal for regulating the timing of writing image data in the auxiliary scanning direction, i.e., direction of relative motion between the drum 29 and a sheet of paper.

Figure 39A:
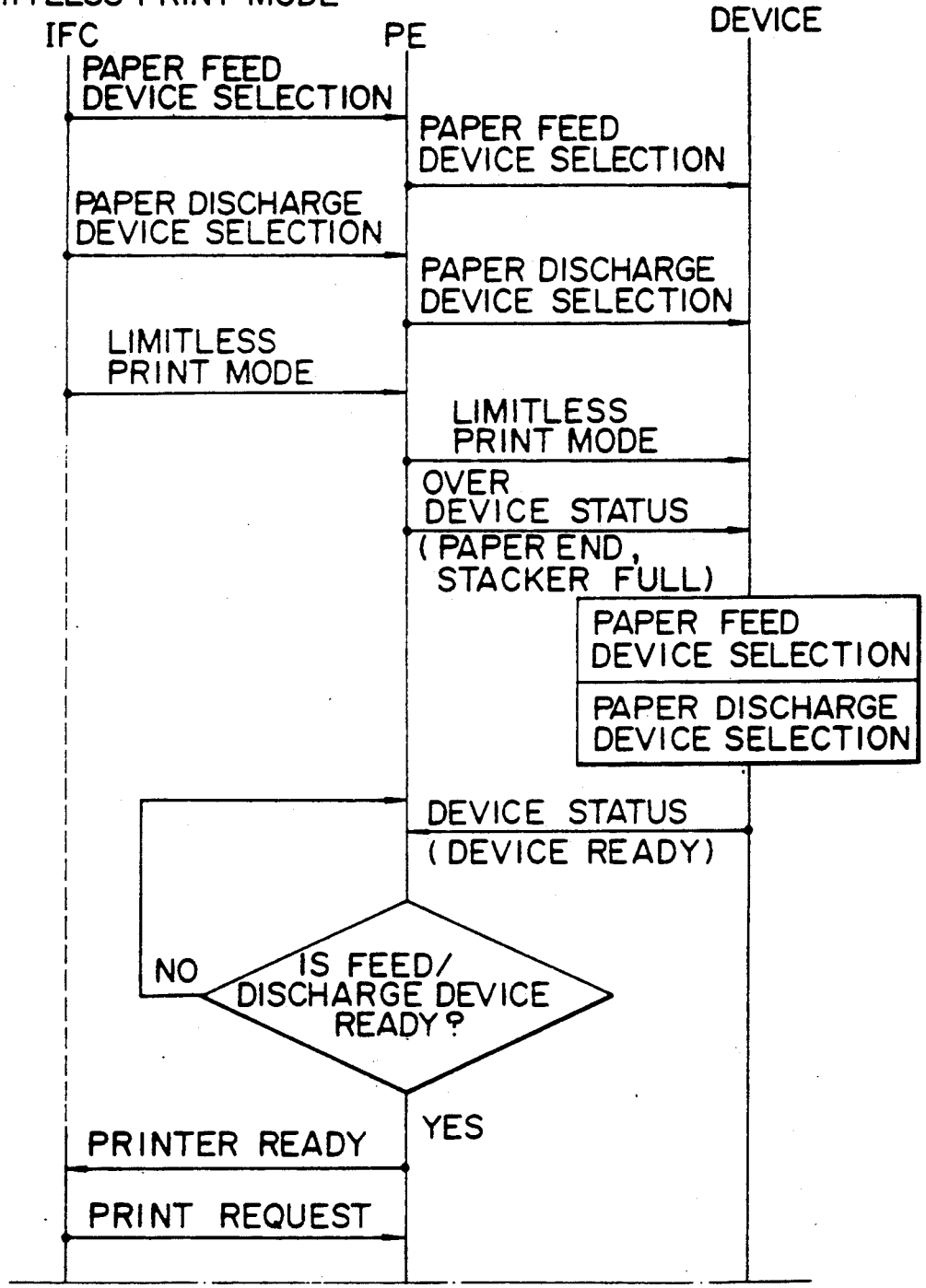
Figure 39B:
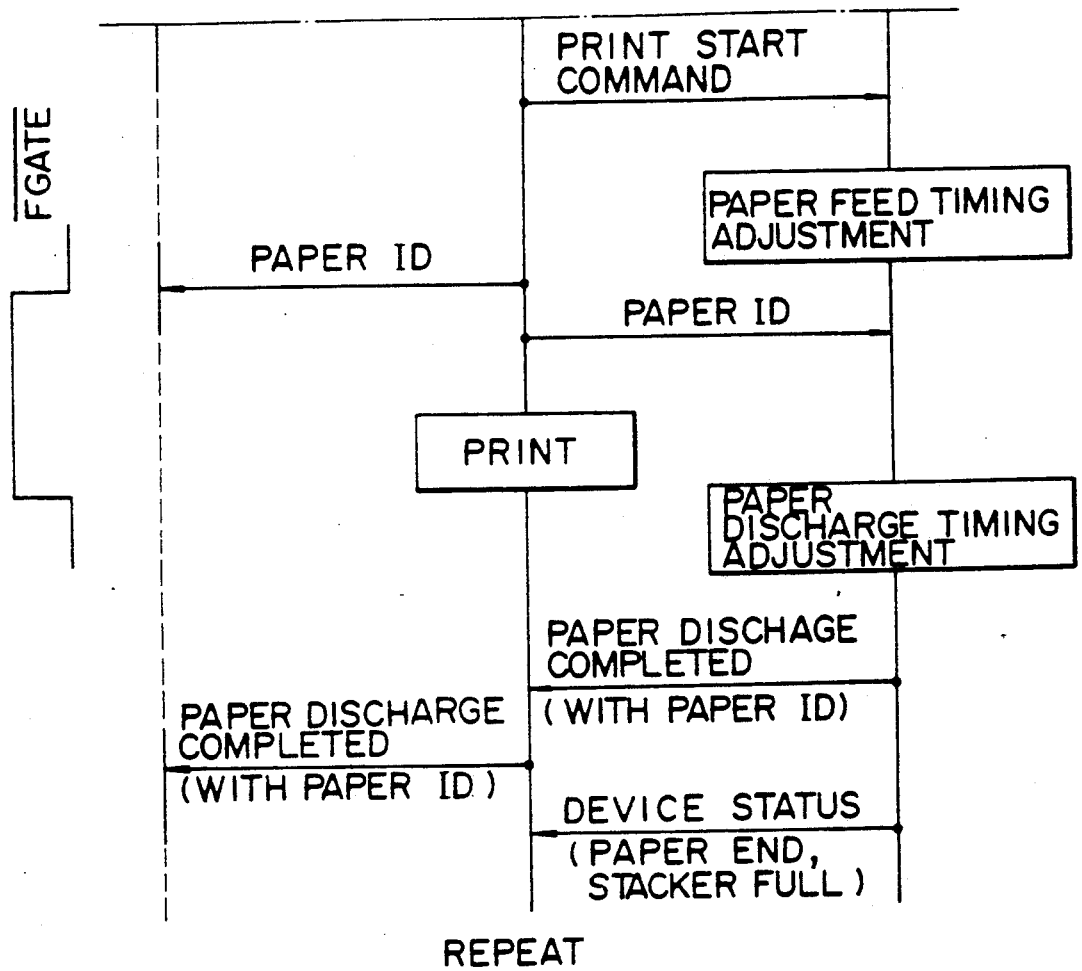
Figure 39:
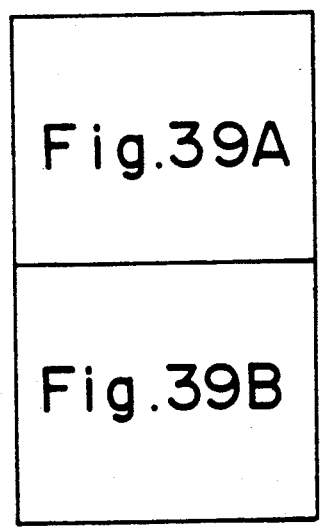

In the limitless mode shown in FIG. 39, when the sheets of paper in a selected paper feed unit (i.e., upper or lower paper feed cassette, or LCIT) have run out, another paper feed unit is automatically selected, and when a selected paper discharge unit (upper or lower stage paper discharge tray of LCOT) has become full, another paper discharge tray is automatically selected. In this manner, this is a mode in which printing is continuously carried out until such an automatic selection of the remaining units cannot be effected any more.

Now, in the power on operation shown in FIG. 37, the function of "INITIALIZE" will be described below. An initialize command is a command in which the IFC request the PE to be initialized. This is also a command which selects a print request output from the IFC to the PE to be output through an independent signal line ($\overline{\text{PRINT}}$ signal) or as a print request command (FF command) on the communication line. This command may have the following different significance depending on the contents of its argument, which is a data transmitted as accompanying a command transmitted from the IFC and which has a function of further subdividing the command.

| (1) | initialize: | PE causes all of the units to the initial state. |
|---|---|---|
| (2) | diagnostics: | After causing all of the units to the initial state, PE executes an electrical self-diagnosis and returns a resulting diagnostics vector to IFC. |
| (3) | test print: | PE returns the diagnostic vector to IFC and executes test print of a predetermined test pattern. |
| (4) | $\overline{\text{PRINT}}$/FFcommand: | When IFC selects $\overline{\text{PRINT}}$ signal as a print request, PE determines that print has been requested with $\overline{\text{PRINT}}$ active. And, no particular response to this request is returned. |

If the IFC selects FF command as a print request, the PE determines that there has been a print request upon receipt of the FF command. And, as a response from the PE in reply to the print request, paper ID information determined at the PE is returned. This paper ID information is an identification code (binary code) of a sheet of paper as a recording medium and it is not a page ID code. Thus, during the both side print mode, the same paper ID information is output twice, once for printing on the front surface and second time for printing on the rear surface. On the other hand if the print request by FF command is selected, upon completion of paper discharging operation, the PE transmits an event report with the paper ID information of that paper accompanying a paper discharge completion status (see FIGS. 38 and 39).

The format of an argument in the initialize command is illustrated in FIG. 44. Bit $b_7$ is always "1" which indicates "initialize" condition, and $b_0$ and $b_1$ are diagnostics and test print bits, respectively, which are set at "1" when executed and at "0" when not executed. Bit $b_2$ is a selection bit of $\overline{\text{PRINT}}$/FF command, which is set at "0" in the case of print request by $\overline{\text{PRINT}}$ signal and at "1" in the case of print request by FF command. Thus, if bit $b_0$ of the argument of the initialize command from the IFC is "1", the PE transmits a diagnostics vector to the IFC as a response. If bit $b_0$ is "0", the response includes the argument whose bit $b_7$ is set at "0."

In the present embodiment, it is so structured that the selection between outputting a print request by a signal line and outputting a print request by a command is implemented by the initialize command. Alternatively, this may also be implemented by switches or the like provided on a PCB.

The contents of the self-diagnostics include the following items.
(1) PE CPU test (including tests for ROM, RAM and timers)
(2) DPX and LCIT CPU test (including tests for ROM, RAM and timers)

(3) MB CPU test (including tests for ROM, RAM and timers)
(4) OP (operational panel) CPU test (including tests for ROM, RAM and timers)
(5) PE-DPX and LCIT connection test (communication line)
(6) PE-MB connection test (communication line)
(7) PE-OP connection test (communication line)
(8) PE and LCOT I/O port scanning test
(9) DPX and LCIT I/O port scanning test
(10) MB I/O port scanning test
(11) OP I/O port scanning test In determination of the structure of the optional unit by the PE, as described before, the PE receives the device ID information from each of the optional units connected to the main unit 1 to thereby determine the identity of each of the optional units connected to a corresponding one of physical ports A through D. In addition, if necessary, the PE alters the connection pattern between the logical and physical ports.

The size of a sheet of paper (i.e., length and width) is not directly detected; on the other hand, it is determined by detecting the cassette code (e.g., 5-bit code) assigned to a cassette which stores therein a quantity of sheets of paper. And, the thus detected cassette code is subjected to code conversion within the print engine PE, thereby being converted into a paper length code and a paper width code. With such a scheme, the IFC may obtain information regarding the length and width of paper stored in each of the paper feed cassettes.

In FIGS. 38 and 39, the selection of a paper feed unit is effected by a command (SET-CURRENT-INPUT) in which the IFC selects an input tray for the PE, and if the selected input tray is reasonable, the newly selected tray becomes valid and effective for a subsequent print request. On the other hand, if it is not reasonable, then the previously used input tray is set valid and effective. The argument of this command designates an input tray by the lower two bits of an 8-bit data. For example, PE upper tray for "01", PE lower tray for "10" and LCIT tray for "11." On the other hand, the selection of a paper discharge unit is carried out by a command (SET-CURRENT-OUTPUT) in which the IFC selects an output tray (paper discharge tray) for the PE, and if the thus selected output tray is appropriate, the newly selected output tray becomes valid and effective for a subsequent print request. However, if it is not appropriate, then the previously used output tray is set valid and effective. And, the argument of this command designates the output tray, for example, by the lower five bits of an 8-bit data. The kinds of output trays include the standard paper discharge tray, upper and lower stage paper discharge trays of LCOT, each movable between normal and off-set positions, rear paper discharge tray, and lower-most stage tray, movable between normal and off-set positions, and each of bins #1-#6 of the mail box.

A print start request is a command in which the IFC requests the PE to carry out a print operation. This command is set valid only when "FF command print request" has been selected by the initialize command in advance. As a response to this command, the PE sends the paper ID information set by the PE to the IFC. Then, upon completion of discharging of the corresponding paper out of the present laser printer system after having been printed, this paper ID information is output as an event report in the form of "Paper Discharge Completion Status+Paper ID" from the PE.

Incidentally, as the paper ID information, for example, the value of a hexadecimal number "1" through "F" is cyclically output.

Figure 40A:
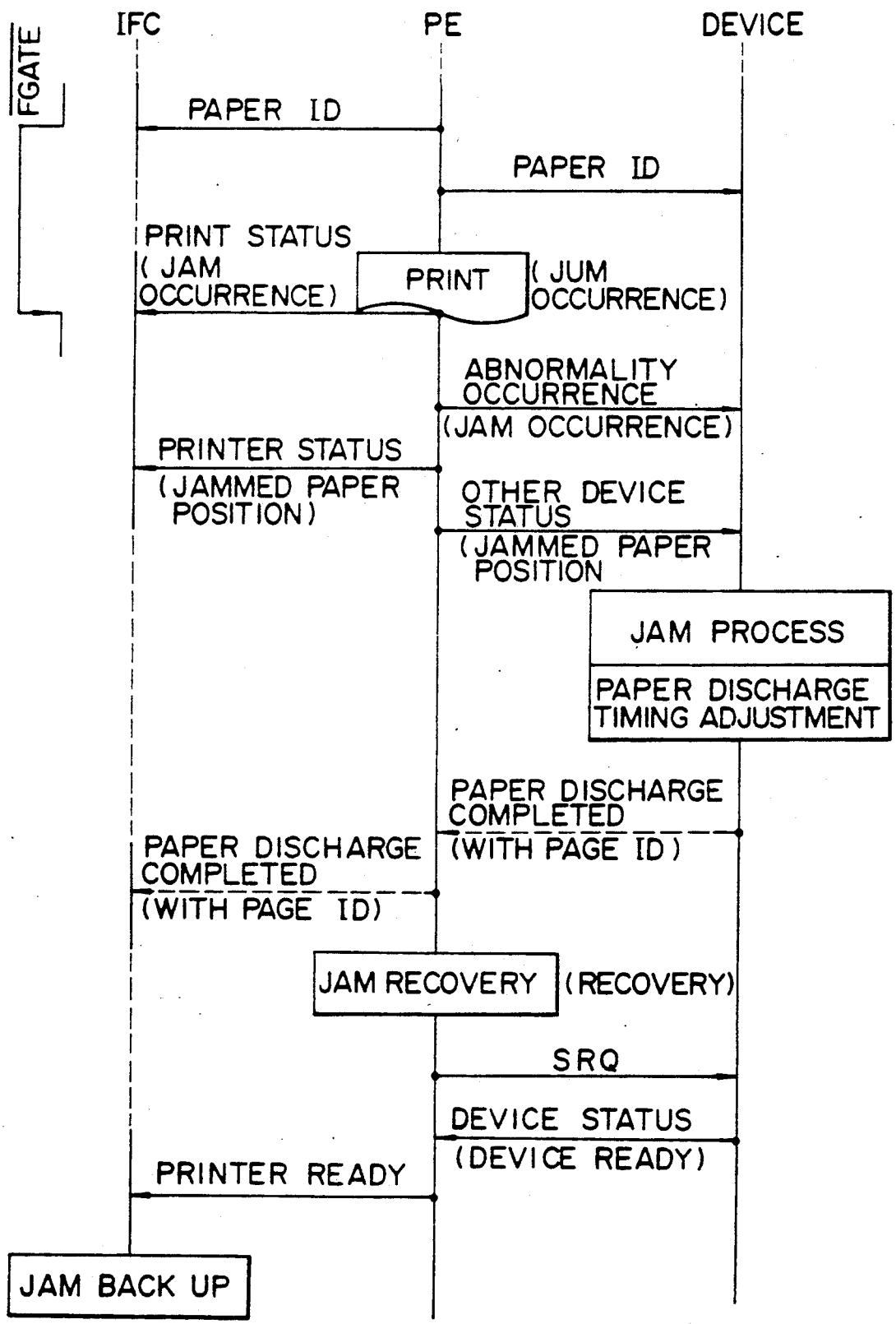
Figure 40B:
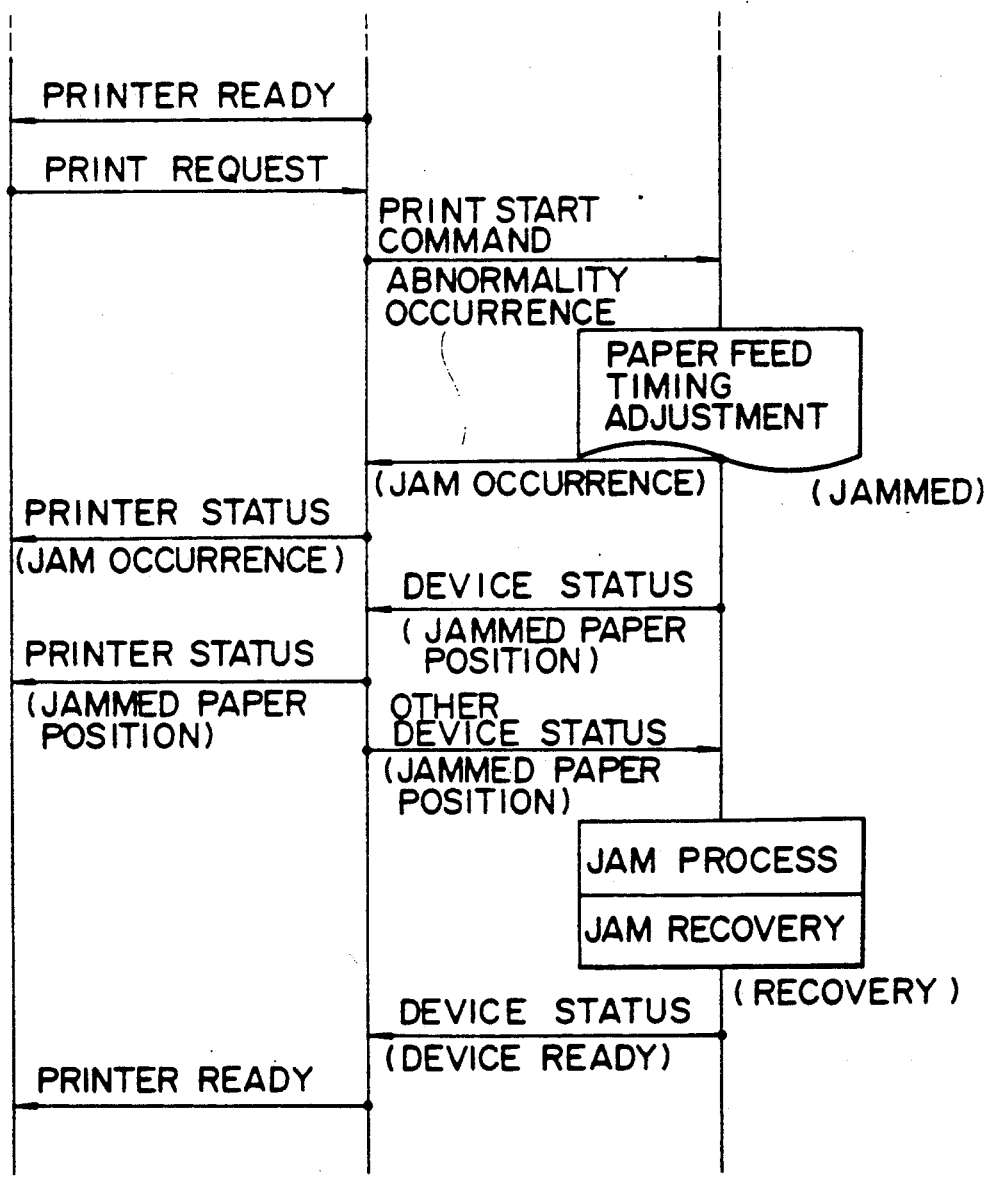
Figure 41:
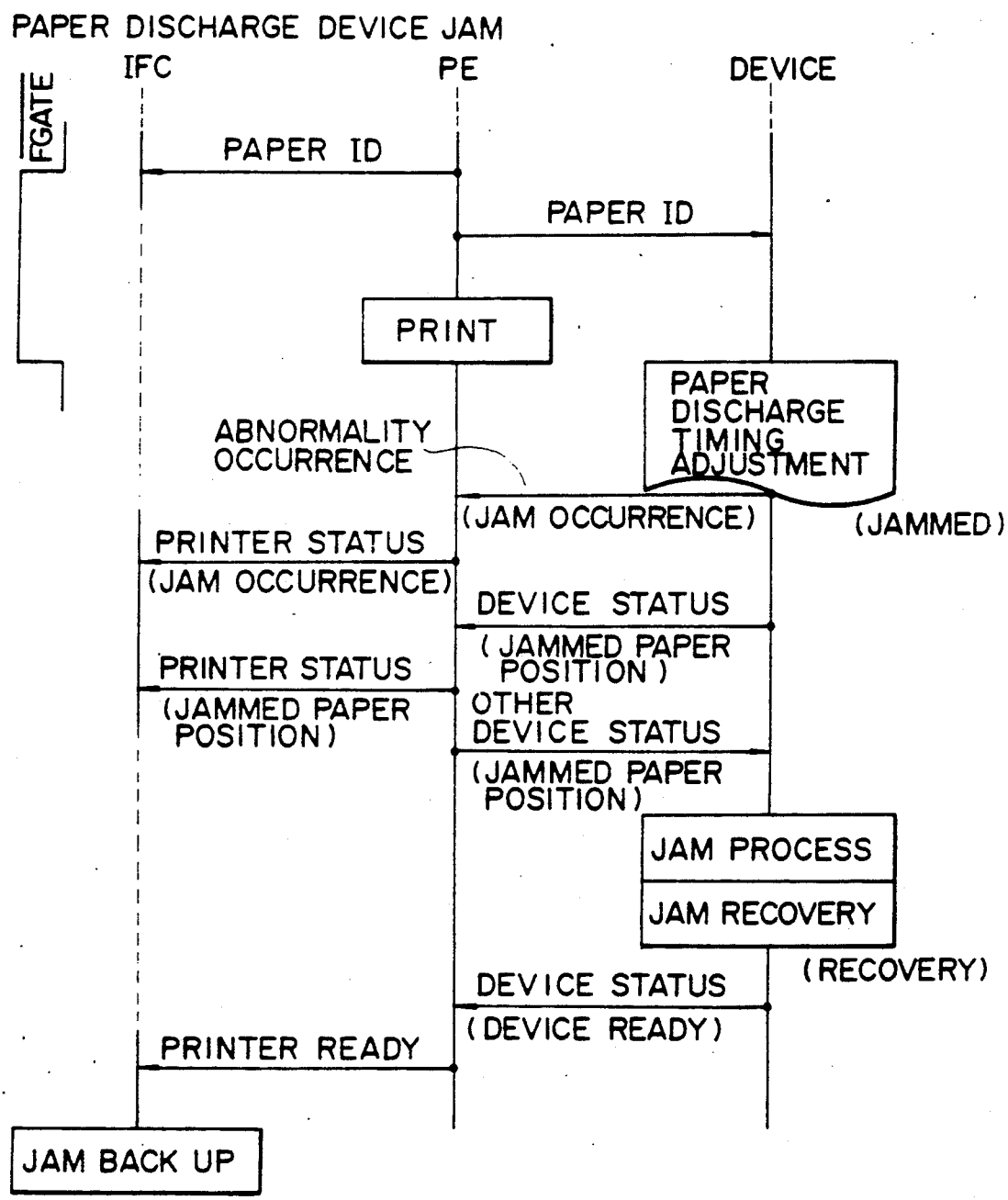

In the operation during occurrence of paper jamming shown in FIGS. 40 and 41, when paper jamming has occurred, the IFC sends a command to the PE so as to make an inquiry as to the paper ID of the jammed paper. And, then, the PE sends the number n of sheets of jammed paper in the first byte of its response and sends the paper ID of each of the jammed paper by each of the following n number of bytes. On the other hand, if there is no jammed paper, the PE sends a code, such as "00H", which indicates the absence of jammed paper. Furthermore, if the jammed paper condition exists but the paper ID of the jammed paper is indefinite (e.g., paper discharging operation in progress), a code to that effect, e.g., "10H", is output and then the communication is terminated. FIG. 45 illustrates an example of the format of this response from the PE.

Then, the IFC sends a command for making an inquiry as to the location of jammed paper to the PE. And, if it is within the printer engine, the location of the jammed paper is reported to the IFC; on the other hand, if it is within an optional unit, the information as to the location of the jammed paper received from the optional unit is supplied to the IFC. And, the location of the jammed paper is indicated in the paper feed/discharge jam display section 140 of the control/display panel 11 shown in FIG. 4 by lighting LEDs G-P selectively. The format of a response in the case of paper jamming within the printer engine PE is shown in FIG. 46, in which bit $b_7$ of one byte indicates the presence or absence of jammed paper and bits $b_0$-$b_6$ indicate the location of the jammed paper. In the format shown in FIG. 6, #0-#6 indicate several possible locations, and when one of these bits has the value "1", it indicates the presence of the jammed paper at that location. In the case where the jammed paper is not definite, i.e., paper jamming has occurred but the paper discharging operation is in progress, a response is sent only for the already determined jammed paper. The response format for the case of occurrence of paper jamming in the other optional units is similar to that described above.

Figure 42:
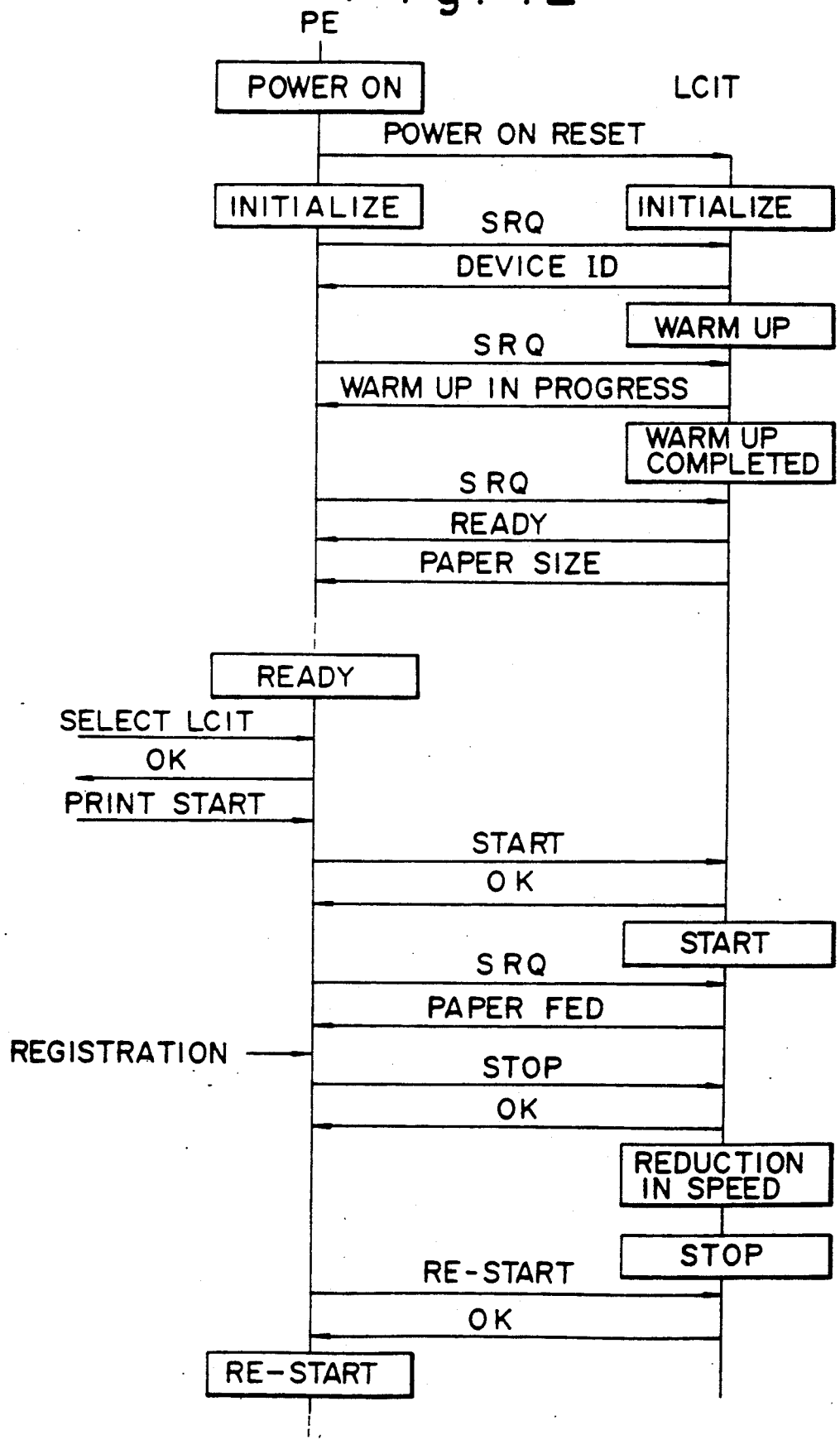
Figure 43A:
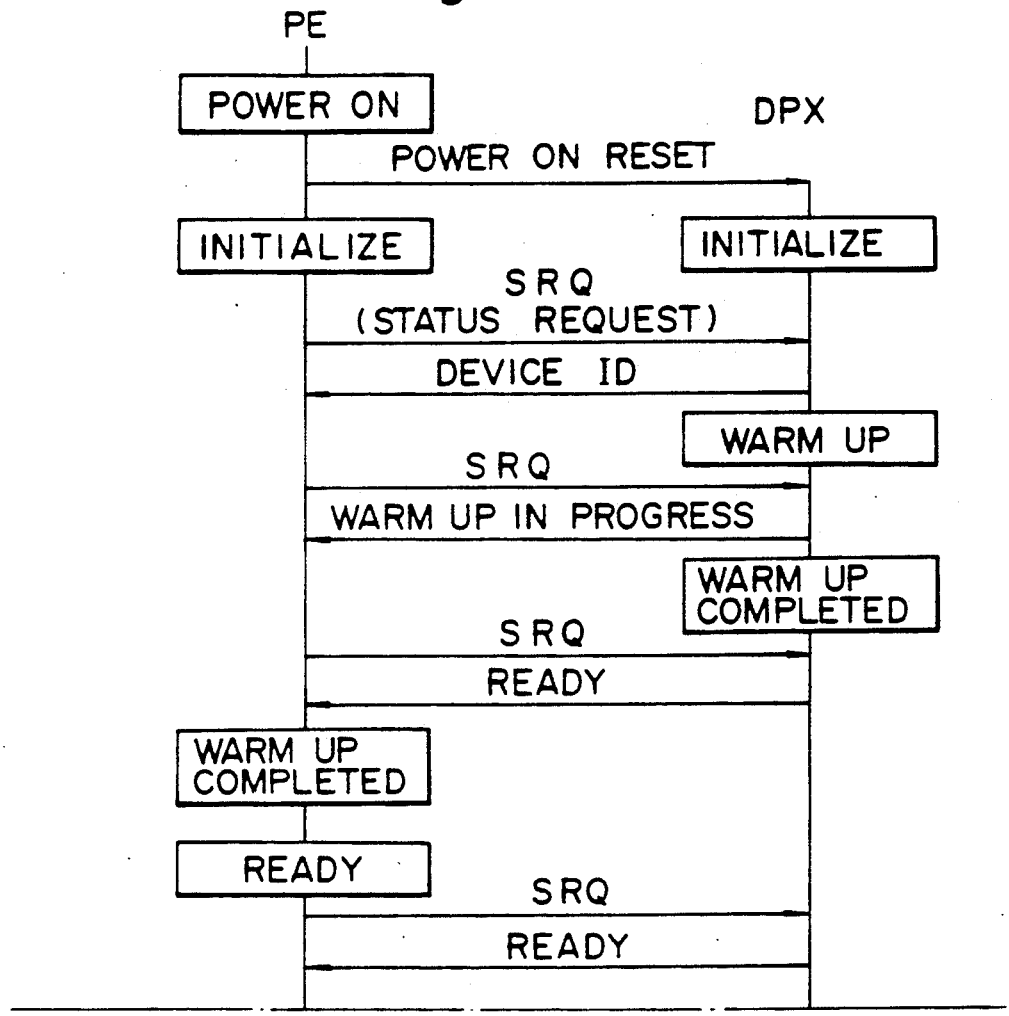
FIGS. 43A and 43B, are timing charts which are useful for understanding the contents of communications between the print engine and LCIT and between the print engine and DPX and also the operation of each of these units.
Figure 43:
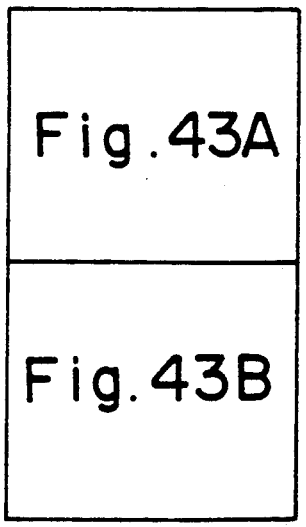
Figure 43B:
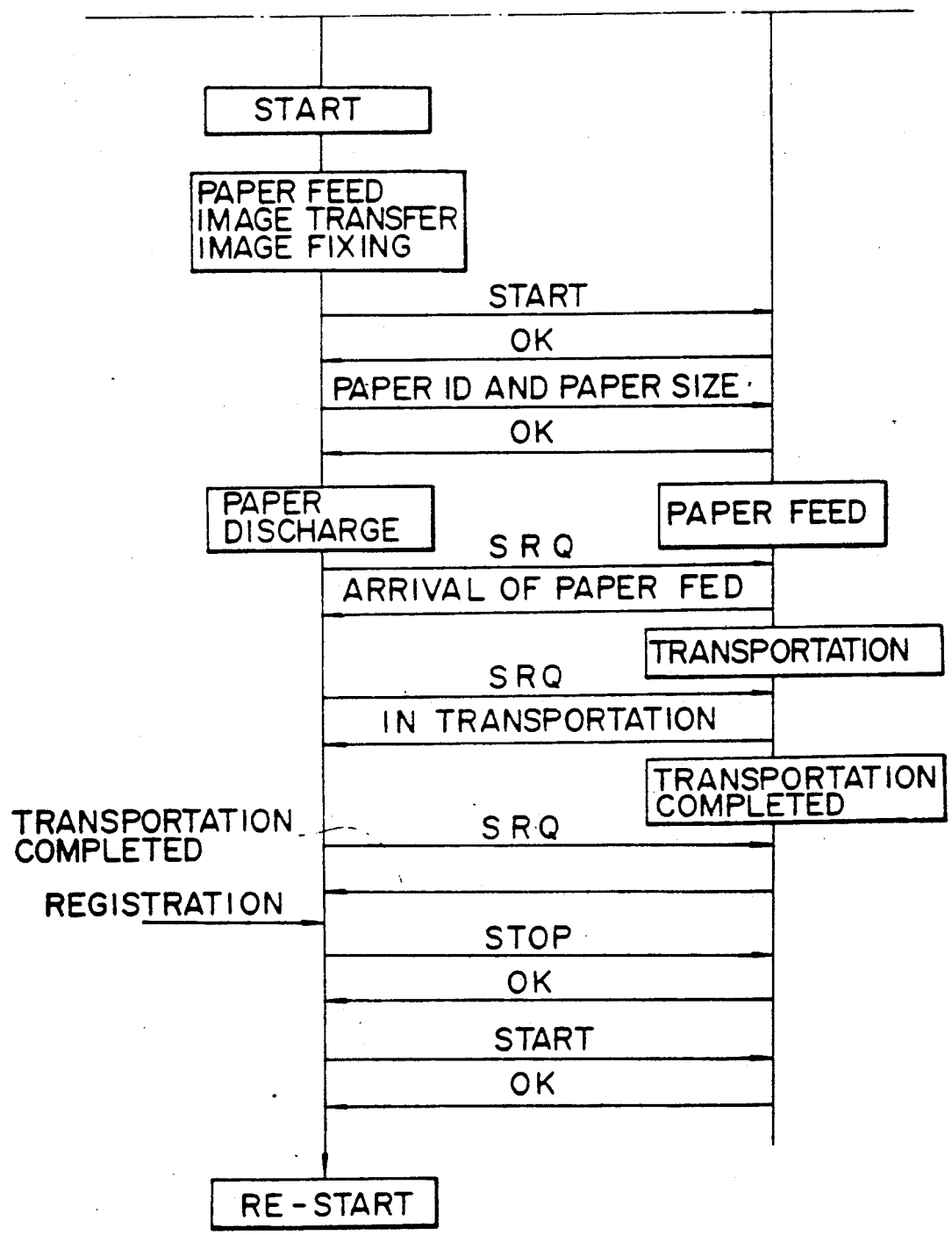
Figure 47:
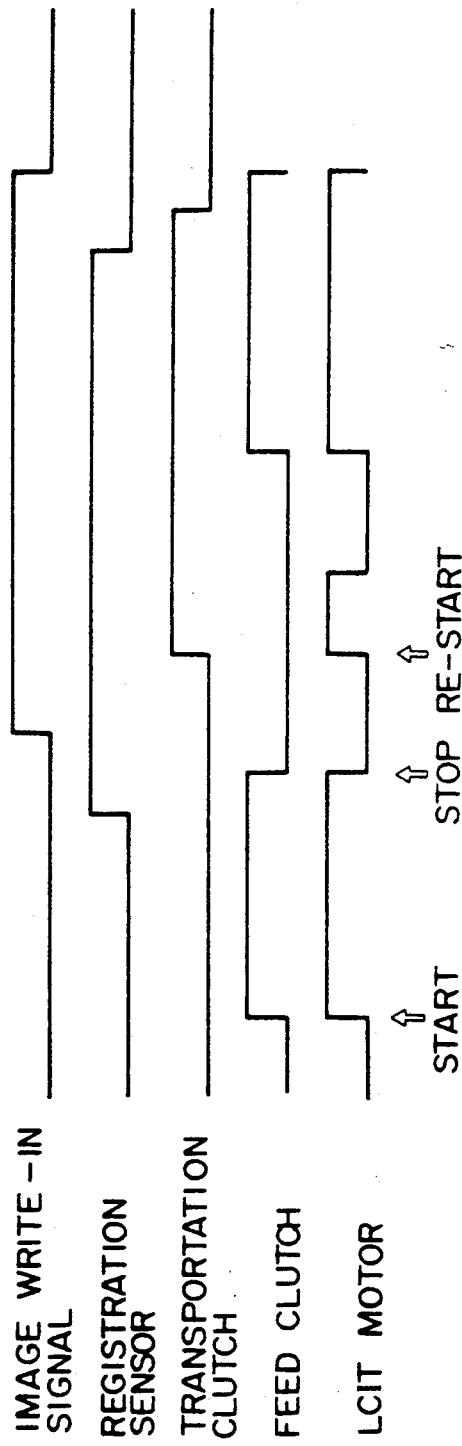
FIG. 47 is a timing chart which is useful for understanding the operational timing of each of the units related to LCIT in a large quantity paper feed mode.
Figure 48:
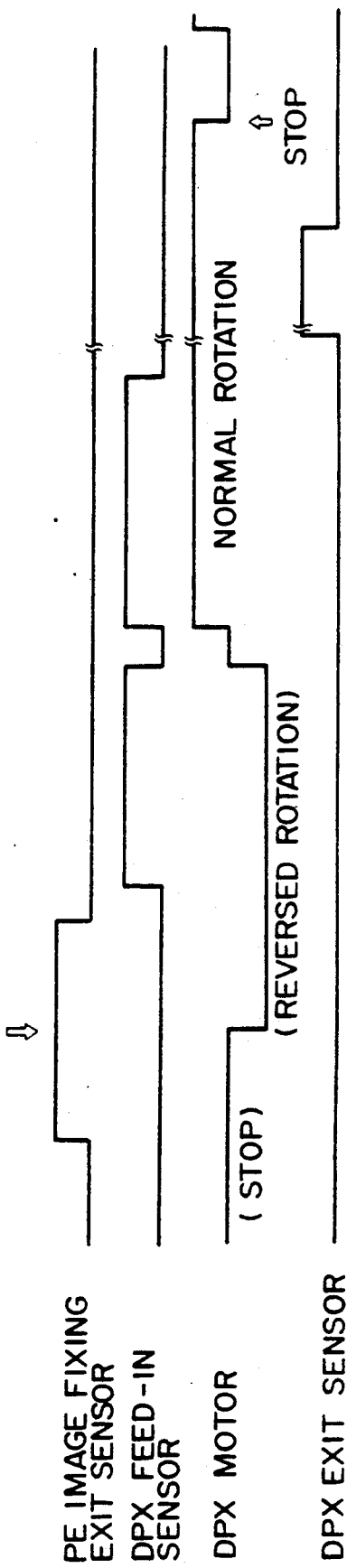
FIG. 48 is a timing chart showing the operational timing of each of the units related to DPX in a duplex or both side print mode.

FIG. 42 is a timing chart for the communication between the PE and the LCIT in the large quantity paper feed mode and FIG. 43 is a timing chart for the communication between the PE and the DPX in the both side print mode. FIG. 47 is a timing chart showing the timing of operation of various components relating to the LCIT in the large quantity paper feed mode and FIG. 48 is a timing chart showing the timing of operation of various components relating to the DPX in the both side print mode. It is to be noted that the both side print mode may select one of n plurality of print modes MODE 1−n; however, in what follows, it will be described as to MODE 1 in which print is carried out on the front and rear surfaces alternately in sequence.

BOTH SIDE PRINT MODE

The both side print mode for printing on both sides of a sheet of paper using the both side processing unit 6, in fact, includes three different modes, i,e., MODE 1, MDOE 2 and MODE 3, and each of these modes may be selected as desired. The number of different both side print modes is determined by the maximum number of sheets of paper which can be stored in the main unit and the both side processing optional unit. In the present embodiment, the both side print mode may be set up to MODE 3; however, if the entire length of the paper transportation path is set longer, an increased number of both side processing modes may be set. The differences in the order of print according to these three different both side processing modes MODE 1, MODE 2 and MODE 3 may be illustrated by assigning the number, i.e., #1, #2, #3, . . . , 190 n, (which corresponds to the above-described paper ID) to each sheet of paper as indicated below.

| | |
|---|---|
| MODE 1: | #1F -- #1R -- #2F -- #2R -- #3F -- #3R . . . |
| MODE 2: | #1F -- #2F -- #1R -- #3F -- #2R -- #4F -- #3R -- . . . |
| MODE 3: | #1F -- #2F -- #3F -- #1R -- #4F -- #2R -- #5F -- #3R -- #6F -- #4R -- . . . |

Here,
F: front surface, and
R: rear surface.

The print process of each of these three modes MODE 1, MODE 2 and MODE 3 is illustrated in FIGS. 49, 50 and 51, respectively. It should be noted that these illustrations shown in FIGS. 49-51 illustrate the paper transportation path in the both side print mode schematically and the locations of odd-numbered sheets of paper are indicated by the fat solid lines with the locations of even-numbered sheets of paper being indicated by the fat dotted lines. It should also be noted that those elements shown in FIG. 49a which correspond to the elements shown in FIG. 3 are designated by the corresponding numerals, and the same holds true for the rest of FIGS. 49-51.

Figure 49A:
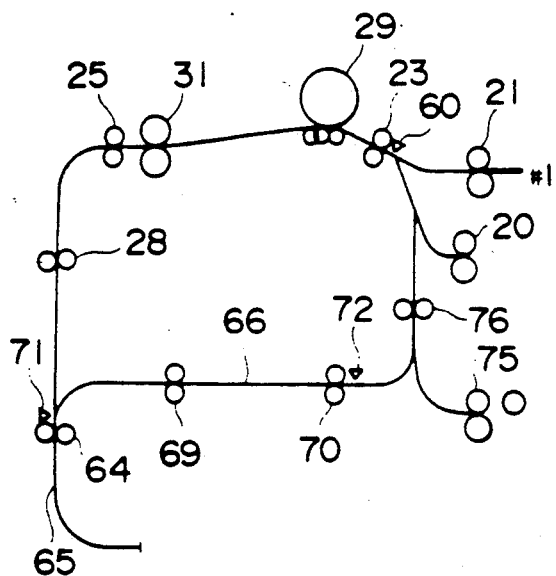
FIGS. 49a through 49f are illustrations which are useful for understanding the sequence of steps in a printing process in accordance with first both side print mode MODE 1 of the present invention.
Figure 49B:
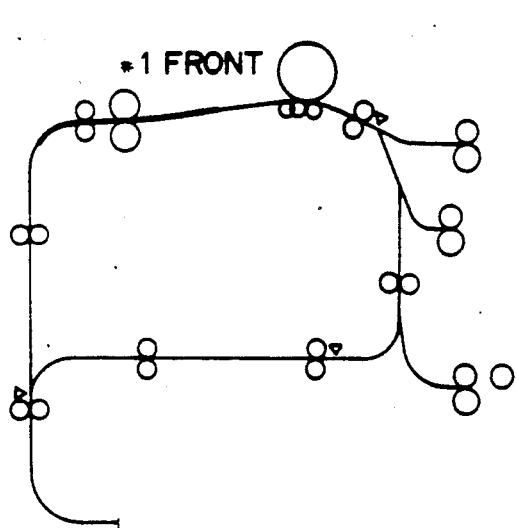
Figure 49C:
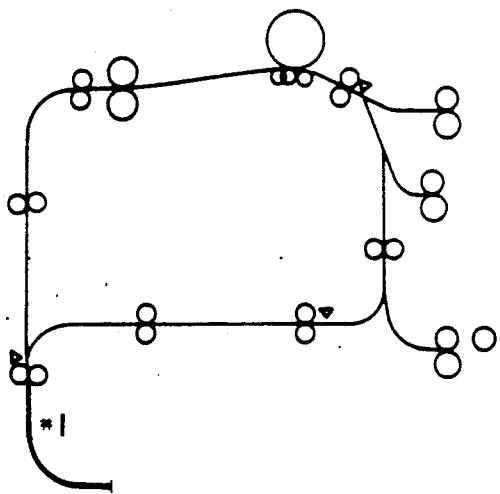
Figure 49D:
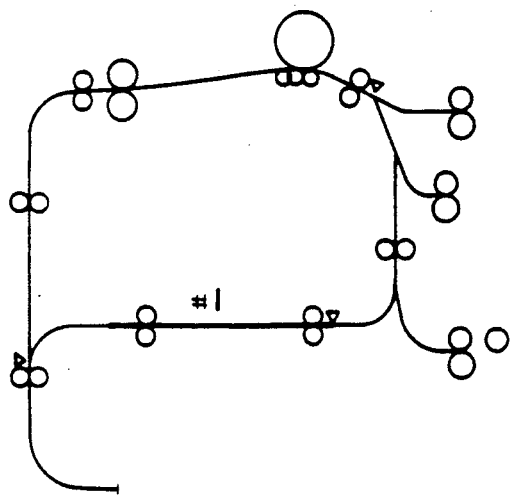
Figure 49E:
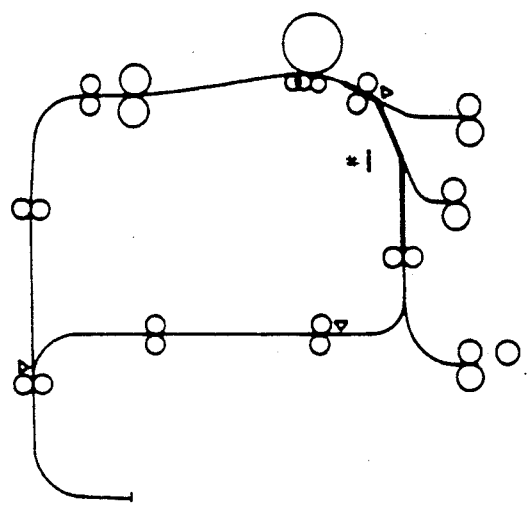
Figure 49F:
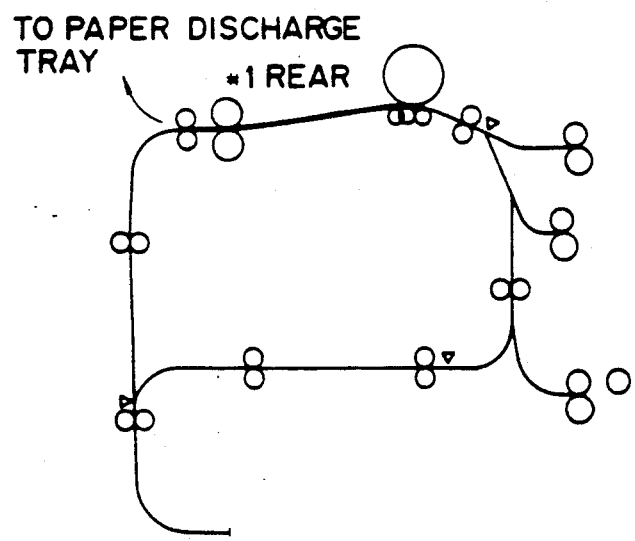

In the first place, the print process of MODE 1 will be described with reference to FIGS. 49a through 49f. Although any one of the paper feed units may be selected, the selection will be made here for the upper paper feed cassette mounted on the laser printer main unit. FIG. 49a illustrates the condition when the supply of the first sheet of paper #1 from the paper feed unit has been initiated. The first sheet #1 is fed into the loop-shaped paper transportation path and its front surface is first printed as it moves past a printing station (or image transfer station) as shown in FIG. 49b. Then, the paper #1 is transported into the inversion path 65 of the both side processing unit over a predetermined length as shown in FIG. 49c. Then, the paper #1 is transported in the opposite direction, i.e., with its leading edge changed to its trailing edge, and transported into the standby path 66 as shown in FIG. 49d. Then, the paper #1 is again transported along the loop path toward the printing station as shown in FIG. 49e and thus the rear surface of paper #1 is printed as it moves past the printing station as shown in FIG. 49f. Then, the paper #1 which has its both sides printed is then discharged into the selected paper discharge tray. The similar both side processing operation is carried out for the subsequent sheets of paper one after another until all of the required number of sheets of paper have been completed.

Figure 50A:
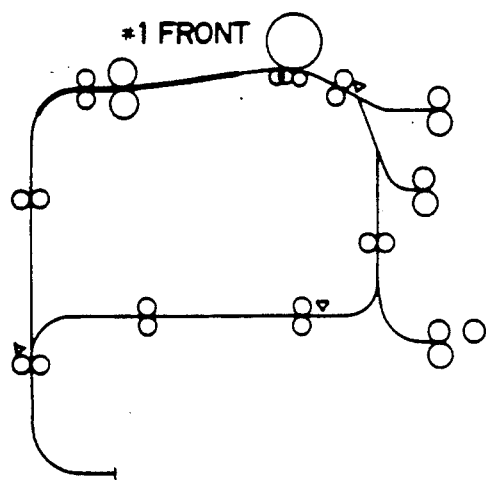
FIGS. 50a through 50h are illustrations which are useful for understanding the sequence of steps in a printing process in accordance with second both side print mode MODE 2 of the present invention.
Figure 50B:
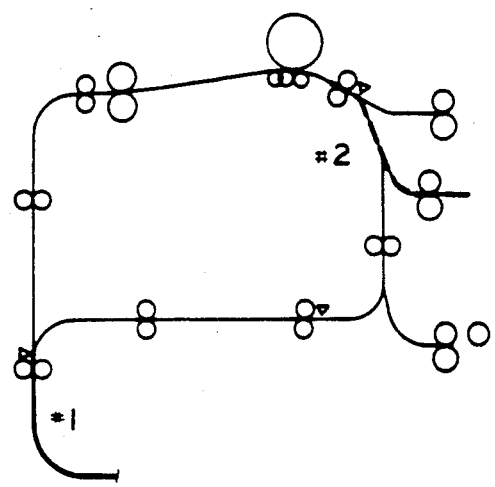
Figure 50C:
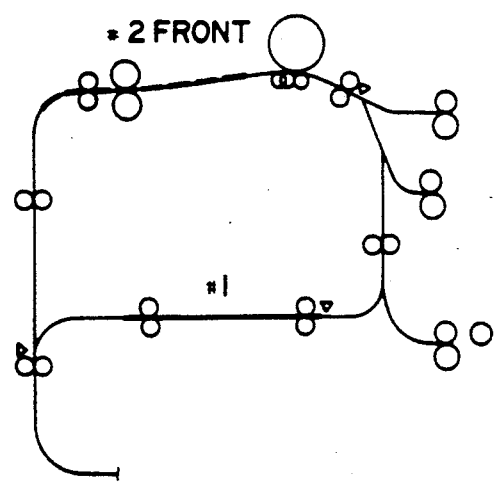
Figure 50D:
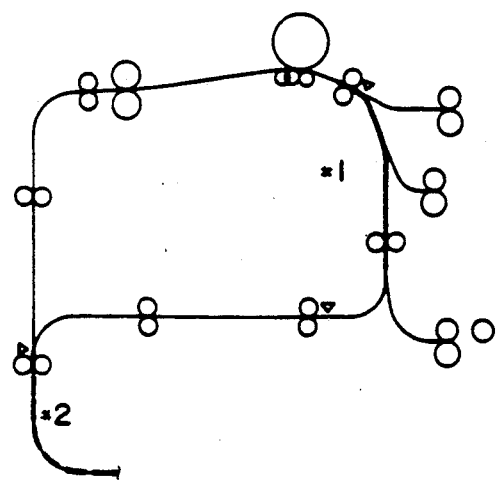
Figure 50E:
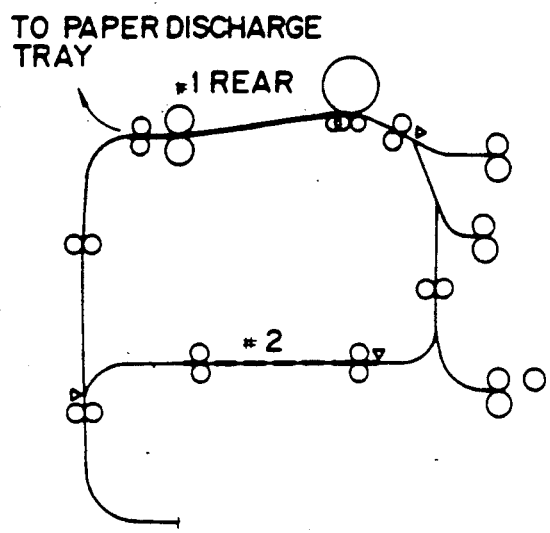
Figure 50F:
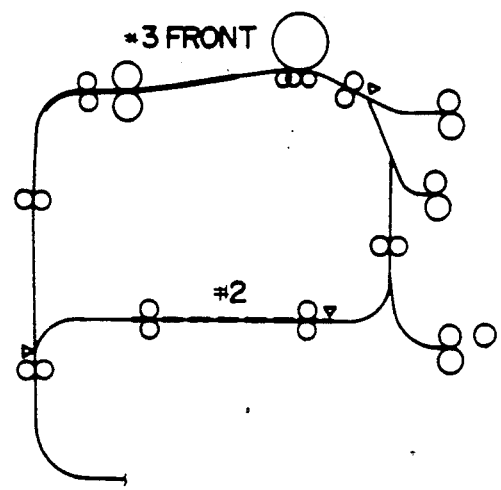

Next, with reference to FIGS. 50a through 50h, the both side printing process of MODE 2 will be described. It is now assumed that the lower paper feed cassette has been selected as a paper feed unit so that the paper feed operation is initiated from the lower paper feed cassette and the front surface of a first sheet #1 of paper is first printed as it moves past a printing station as shown in FIG. 50a. The paper #1 is then transported into the paper inversion path of the both side processing unit over a predetermined length and at the same time the next sheet of paper #2 is started to be fed into the transportation path as shown in FIG. 50b. As the paper #1 is transported in the reversed direction out of the paper inversion path into the standby path, the front surface of paper #2 is printed as shown in FIG. 50d. Thereafter, the paper #1 is again transported toward the printing station, while the paper #2 is transported into the paper inversion path as shown in FIG. 50e. Then, at the same time as the paper #2 is transported out of the paper inversion path in the reversed direction toward the standby path, the rear surface of paper #1 is printed as it moves past the printing station as shown in FIG. 50f.

Figure 50G:
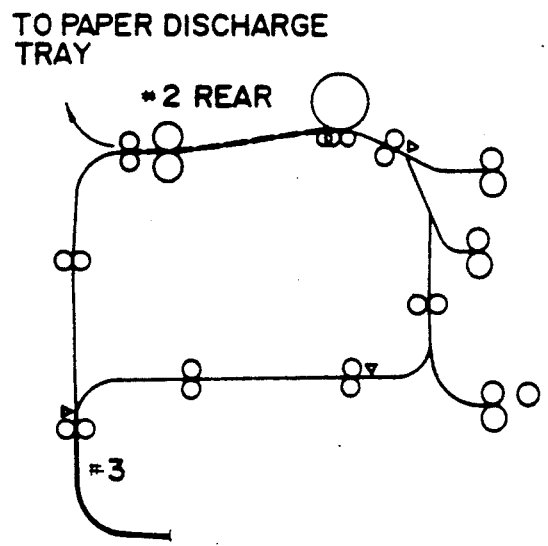
Figure 50H:
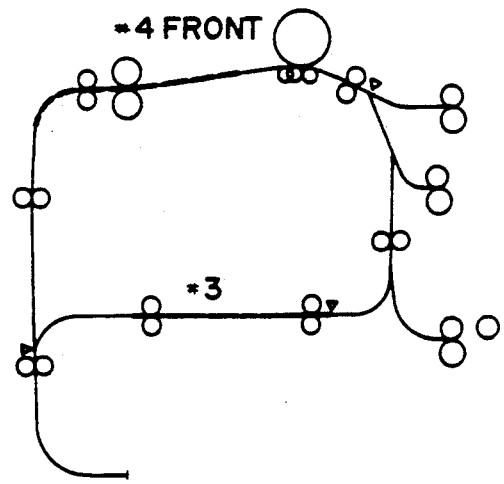

The paper #1 which has its both sides printed is then discharged to the selected paper discharge tray, and at the same time the following paper #3 is fed into the transportation path to have its front surface printed as it moves past the printing station. Thereafter, at the time when the paper #3 is transported into the paper inversion path, the paper #2 is again transported toward the printing station so that the rear surface of the paper #2 is printed as it moves past the printing station as shown in FIG. 50g. Then, the paper #2 which has its both sides printed is discharged to the selected paper discharge tray. Then, the fourth paper #4 is fed into the transportation path. And, when the paper #4 is transported past the printing section to have the front surface of paper #4 printed, the paper #3 in the paper inversion path is transported in the reversed direction into the paper standby path, as shown in FIG. 50h. Thereafter, printing is effected to the front and rear surfaces alternately at the printing station.

Figure 51A:
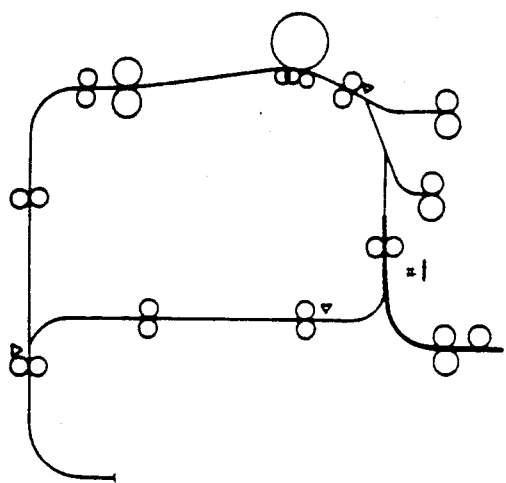
Figure 51B:
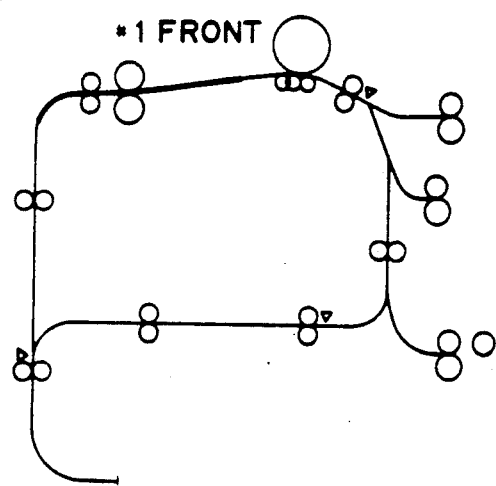
Figure 51C:
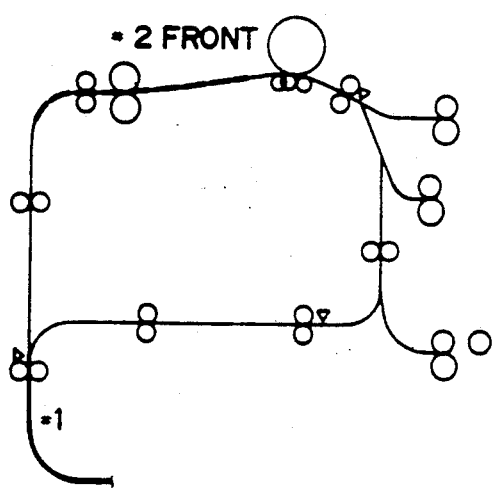
Figure 51D:
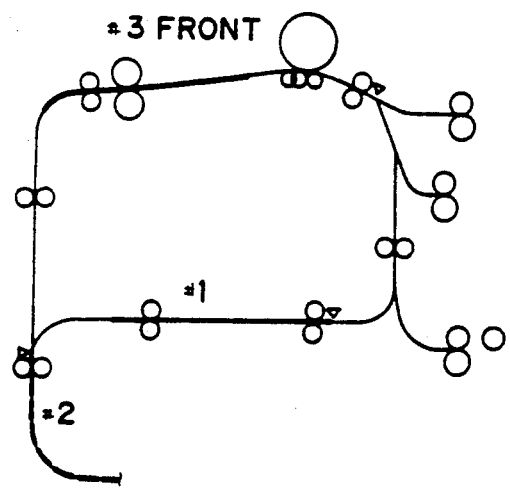
Figure 51E:
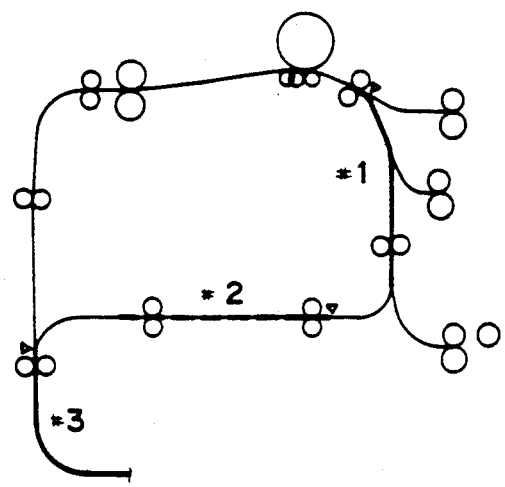

Referring now to FIGS. 51a through 51l, the printing process of the third both side print mode MODE 3 will be described. It is assumed that the LCIT is selected as a paper feed unit. The first sheet of paper fed as shown in FIG. 51a into the transportation path from the LCIT is assigned with paper ID #1, and as the paper #1 is transported past a printing station, its front surface is printed, as shown in FIG. 51b. At the same time as the paper #1 is transported into the paper inversion path, the paper #2 is transported past the printing station as shown in FIG. 51c so that the front surface of paper #2 is printed. Then, at the time when the paper #1 is transported into the paper standby path, the second paper #2 is transported into the paper inversion path and also the paper #3 is transported past the printing station to have its front surface printed as shown in FIG. 51d. Thereafter, when the paper #1 is again transported toward the printing station, the paper #2 is transported into the standby path and the paper #3 is transported into the paper inversion path as shown in FIG. 51e.

Figure 51F:
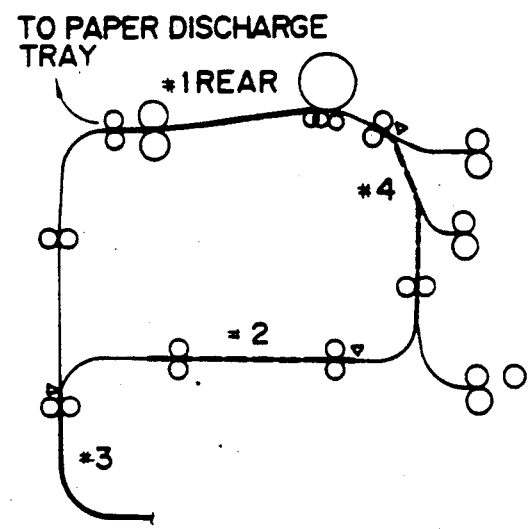
Figure 51G:
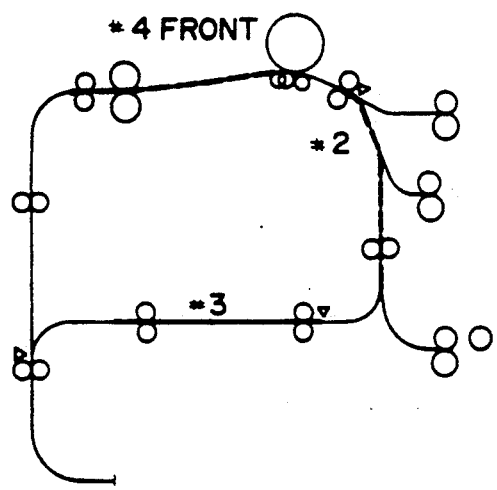
Figure 51H:
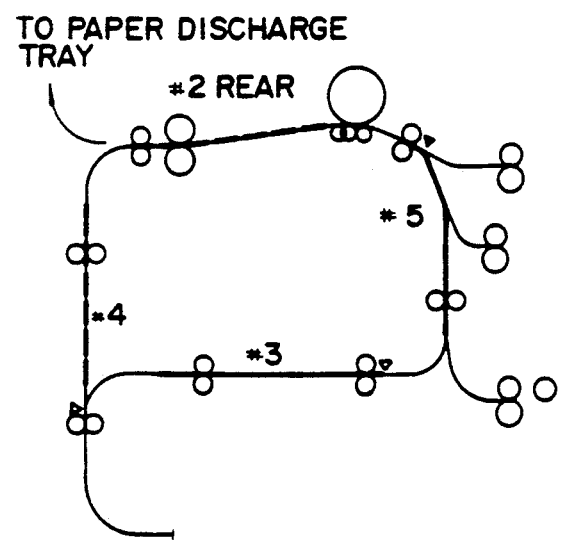

Then, as the paper #1 is transported past the printing station, the rear surface thereof is printed and at the same time paper #4 is fed into the transportation path from the LCIT as shown in FIG. 51f. Then, the paper #1 is discharged to the selected paper discharge tray, and simultaneously therewith the front surface of paper #4 is printed with the paper #2 transported toward the printing station and the paper #3 transported into the standby path as shown in FIG. 51g. Then, when paper #4 is transported into the both side processing unit, the paper #2 is transported past the printing station to have its rear surface printed and at the same time the fifth sheet of paper #5 is fed into the transportation path as shown in FIG. 51h. As the paper #5 is moved past the printing station, the front surface of paper #5 is printed, and at the same time the paper #4 is transported into the paper inversion path as shown in FIG. 51i. Then, the paper #3 is transported again toward the printing station and the paper #4 is transported into the standby path as shown in FIG. 51j.

Thereafter, when the paper #5 is transported into the paper inversion path, the paper #3 is moved past the printing station to have its rear surface printed and the sixth sheet of paper #6 is fed into the transportation path. When the paper #6 is transported past the printing station to have the front surface thereof printed, the paper #4 is transported again toward the printing station and the paper #5 is transported into the standby location. In this manner, printing is effected to the front and rear surfaces alternately at the printing station in the subsequent printing operations. In this case, the sheet of paper whose front surface is to be printed has the rear surface which is not printed; on the other hand, the sheet of paper whose rear surface is to be printed has the front surface which has already been printed.

As may have already been understood, among these three duplex printing modes, MODE 1–MODE 3, the overall printing speed is in the order of MODE 3, MODE2 and MODE 1 from the fastest to the slowest. More specifically, the overall printing speed of MODE 2 is approximately 1.5 times of that of MODE 1, and the over all printing speed of MODE 3 is more than twice of that of MODE 1. Thus, in the case of carrying out a large quantity of both side printing operations, MODE 3 is preferably selected, if possible.

It is to be noted that the above-described embodiment is the case of application to a laser printer system; however, the present invention should not be limited to only such application, and the present invention, in fact, may be applied to any other image forming systems, including high performance copier systems, such as digital copiers, and facsimile systems.

Figure 52A:
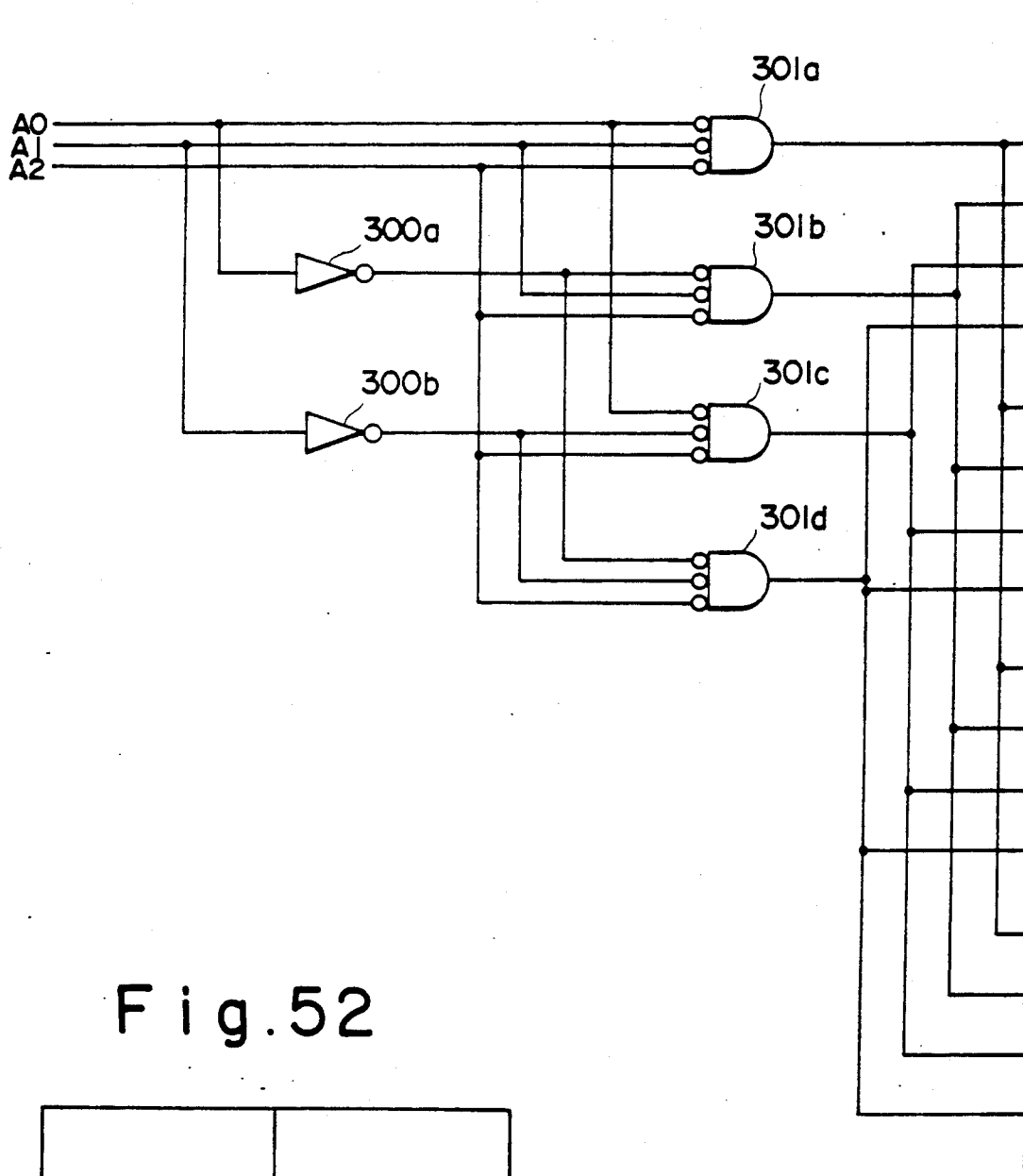
FIGS. 52A and 52B, when combined as shown in FIG. 52, define a logic diagram showing the overall structure of a port connection control unit for controlling the connection condition between the main and optional units in accordance with one embodiment of the present invention.
Figure 52:
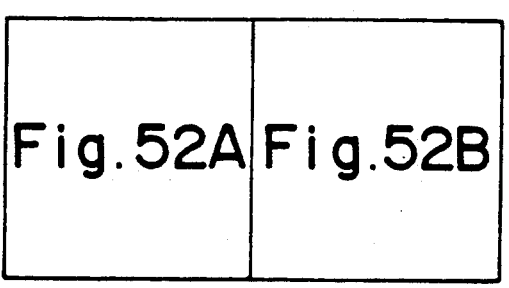
FIG. 52 is an illustration showing how to combine FIGS. 52A and 52B.
Figure 52B:
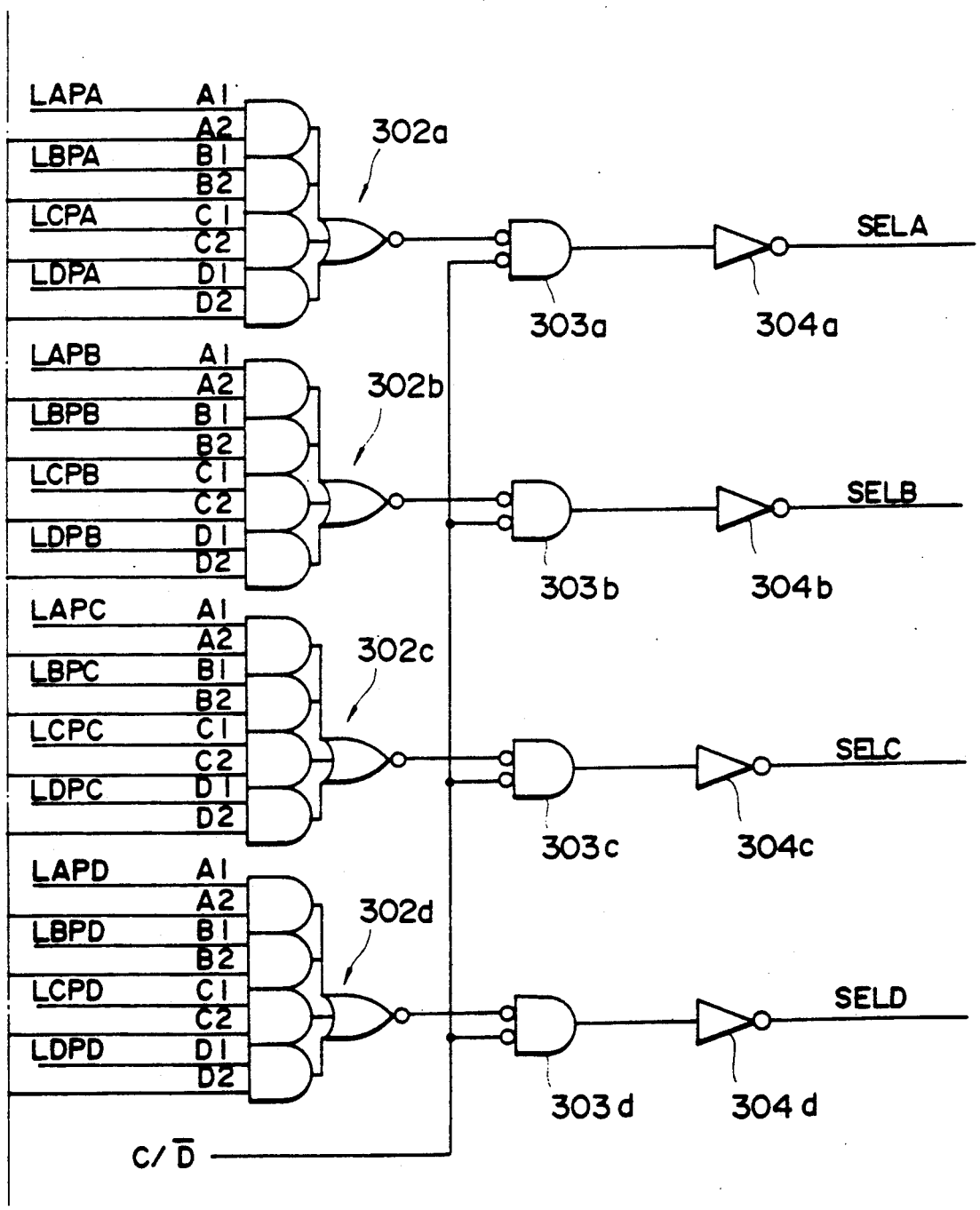

Referring now to FIG. 52, the detailed structure of the port selector PRTSEL provided in the communication control interface circuit 150 shown in FIG. 19 will be described. Before getting into the details of the structure shown in FIG. 52, the address allocation of the registers INST1–INST 5 and STAT 1 and STAT 2 provided in the communication control interface circuit 150 will be described. The following table shows the allocation of the address to these registers.

TABLE I

| C/$\overline{D}$ | A2 | A1 | A0 | WRITE REGISTER | READ REGISTER |
|---|---|---|---|---|---|
| L | L | L | L | TXDA(LOGICAL PORT) | RXDA(LOGICAL PORT) |
| L | L | L | H | TXDB(LOGICAL PORT) | RXDB(LOGICAL PORT) |
| L | L | H | L | TXDC(LOGICAL PORT) | RXDC(LOGICAL PORT) |
| L | L | H | H | TXDD(LOGICAL PORT) | RXED(LOGICAL PORT) |
| H | L | L | L | INST. REG. 1 | INST. REG. 1 |
| H | L | L | H | INST. REG. 2 | INST. REG. 2 |
| H | L | H | L | INST. REG. 3 | INST. REG. 3 |
| H | L | H | H | INST. REG. 4 | INST. REG. 4 |
| H | H | L | L | INST. REG. 5 | INST. REG. 5 |
| H | H | L | H |  | STATUS REG. 1 |
| H | H | H | L |  | STATUS REG. 2 |

Thus, if the control signal C/$\overline{D}$ is "H", the CPU 142 can exchange data with the instruction registers INST 1 through 3, INST 45 and STAT 1 and 2 of the communication control interface circuit 150 through the data bus lines D$_0$–D$_7$; On the other hand, if the control signal C/$\overline{D}$ is "L", then the CPU 142 can exchange data with any one of the serial communication ports A–D through the data bus lines D$_0$–D$_7$.

Now, FIG. 52 shows the detailed structure of the port selector PRTSEL provided in the communication control interface circuit 150 shown in FIG. 19. As shown, the port selector PRTSEL includes a plurality of inverters 300a, 300b, 304a–304d, a plurality of NAND gates 301a–301d and 303a–303d, a plurality of AND-NOR gates 302a–302d connected as shown. And, the port selector PRTSEL receives signals LAPA, LBPA, LCPA, LDPA, LAPB, LBPB, LCPB, LDPB, LAPC, LBPC, LCPC, LDPC, LAPD, LBPD, LCPD and LDPD from the internal register INST3 and also receives signals A0, A1, A2 and C/$\overline{D}$ from the address decoder 251. The port selector PRTSEL supplies outputs SELA, SELB, SELC and SELD (low active) which select physical transmission/reception blocks A through D for operation, respectively.

In operation, while the control signal C/$\overline{D}$ is "H", all of the outputs SELA–SELD are "H" (false) and thus none of the blocks A through D is selected to thereby inhibit to carry out a serial data communication operation. On the other hand, if the control signal C/$\overline{D}$ is "L", the logical port which is designated by the address A0–A2 is selected. For example, if the address is such that A2="L", A1="H" and A0="L", then the output of the gate 301c which corresponds to logical port C becomes "true." And, this output is input into each of the data selectors 302a through 302d. Assuming that the data "11" has been previously written in bits b$_3$ and b$_2$ of the internal register INST3, only output LCPA among outputs LCPA, LCPB, LCPC and LCPD from the internal register INST3 is rendered "true" so as to establish a correspondence of logical port C=logical port A. As a result, only the output of the data selector unit 302a is "L (true)", so that only output SELA becomes "L (true)." In this manner, simply by designating a particular logical port address, the corresponding actual physical port is selected and activated for operation.

Referring now to FIG. 53, the overall operation of the above-described laser printer system will be described. In the first place, the nomenclature used in FIG. 53 will be explained.

(1) #a, #b, #c, ..., indicate image data to be printed on first, second, third sheets of paper.

(2) Each of the memory blocks in the IFC 52 may take either one of the following four conditions.

a) OPEN

The corresponding memory is not in use and there is no valid data in this memory.

c) PRODUCTION

Production of image data is in progress. This is the condition in which image data is being produced while receiving image data (character code or bit image data)

from the host system. The image data is a data to be supplied to the print engine.

c) STNDBY

The memory is in a standby status and it stores the image data produced.

d) OUTPUT

Output operation of image data is in progress. This is the condition in which the internal image data is being output to the print engine as a WDATA signal. This image data may be output as many times as desired, if necessary.

(3) #1, #2, #3, ... indicate the paper ID data which is output to the IFC 52 from the printer engine 51 in correspondence with #a, #b, #c, ...

(4) ↓ F#a ↑$ID\#1$ indicates that a paper feed command (e.g., "FF" code) corresponding to image #a is supplied from the IFC 52 to the print engine PE 51 and as a response the PE 51 supplies paper ID data #1 to the IFC 52.

(5) ↓ P#a indicates that the IFC 52 supplies a print command to the PE 51 corresponding to image #a.

(6) ↑ E#1 indicates that the PE 51 supplies a paper discharge event report, indicating the completion of paper discharge of paper ID #1, to the IFC 52.

(7) FSYNC is a page length signal supplied from the PE 51 to the IFC 52, and while this signal is in the "true" state, write data WDATA may be input. This is also referred to as FGATE signal.

(8) WDATA is a write data supplied from the IFC 52 to the PE 51. More specifically, the image data stored in the internal memory of the IFC 52 is output.

The sequence of steps illustrated in FIG. 53 will be described as a function of time. At time $t_0$, transfer of image data #a from the host system to the IFC 52 is initiated. At the same time, the IFC memory block 1 initiates the production of image data #a and also a paper feed start command (e.g., "FF") is supplied from the IFC 52 to the PE 51 corresponding to image data #a. Immediately after $t_0$, as a response to the "FF" command, the PE 51 supplies the data of paper ID #1 to the IFC 52. On the other hand, the PE 51 starts to feed a sheet of paper to which the paper ID #1 has been assigned. At time $t_1$, the transfer of image data #a from the host system to the IFC 52 is completed and at the same time the transfer of the next image data #b is initiated. The IFC memory block 2 ceases its open condition and starts to produce image data #b. The IFC 52 supplies a paper feed start command "FF" (corresponding to image #b) to the PE 51.

Immediately after $t_1$, as a response to the "FF" command, the PE 51 supplies the data of paper ID #2 to the IFC 52. Then, at time $t_2$, the PE 51 completes its paper feeding operation for paper #1 and enters into a standby status waiting for printing (image forming) operation. At time $t_3$, a print start command "VT" (corresponding to image #a) is supplied from the IFC 52 to the PE 51. Then, immediately after $t_3$, printing (image formation) of paper #1 is initiated by the PE 51. And, simultaneously with the initiation of printing for paper #1, the PE 51 initiates the feeding of paper #2. At time $t_4$, FSYNC signal supplied from the PE 51 to the IFC 52 changes its status from "false" to "true." The IFC memory block 1 starts to output image data #a. The transfer of write data WDATA from the IFC 52 to the PE 51 is initiated, and, thus, actual image formation or printing on the paper is initiated.

At time $t_4'$, simultaneously with the completion of transfer of image data #b from the host system to the IFC 52, the transfer of image data #c is initiated. The IFC memory block 3 ceases its open condition and starts the production of image data #c. A paper feed start command "FF" (corresponding to image data #c) is supplied from the IFC 52 to the PE 51. Immediately after $t_4'$, as a response to the "FF" command, the PE 51 supplies the data of paper ID #3 to the IFC 52. At time $t_5$, the IFC memory block 2 completes the production of image data #b and enters into a standby status. A print start command "VT" (corresponding to image data #b) is supplied from the IFC 52 to the PE 51. Then, at time $t_6$, the transfer of image data #c from the host system to the IFC 52 is completed. However, since there is no idle or open block in the IFC 52 under the condition, the transfer of the next image data cannot be initiated at this point in time.

At time $t_6'$, feeding of paper #2 by the PE 51 is completed and the PE 51 enters into a standby status. At time $t_7$, the IFC memory block 3 completes the production of image data #c and enters into a standby status. A print start command "VT" (corresponding to image #c) is supplied from the IFC 52 to the PE 51. At time $t_8$, the page length signal from the PE 51 to the IFC 52 changes its status from "true" to "false" which indicates the arrival of the trailing edge of the page. The IFC memory block 3 completes the outputting of image data #a. The transfer of write data WDATA from the IFC 52 to the PE 51 is completed and the printing or image formation on the paper is completed. At time $t_9$, the image formation of paper #1 by the PE 51 is completed. And, the PE 51 initiates discharging of paper #1. And, the transportation of paper #2 in the standby status in the PE 51 is initiated and image formation of printing is initiated. Simultaneously with the initiation of printing or image formation on paper #2 by the PE 51, feeding of paper #3 is initiated.

At time $t_{10}$, FSYNC signal from the PE 51 to the IFC 52 changes its status from "false" to "true" which indicates the appearance of the leading edge of the page. The IFC memory block 2 starts to output image data #b. The transfer of write data WDATA from the IFC 52 to the PE 51 is initiated and actual printing or image formation on the paper is initiated. At time $t_{11}$, the feeding of paper #3 by the PE 51 is completed and the PE 51 enters into a standby status waiting for image formation. At time $t_{11}'$, discharging of paper #1 by the PE 51 is completed. A paper discharge event report #1 which indicates the completion of discharge of paper #1 is supplied from the PE 51 to the IFC 52. Because of the completion of discharge of paper #1, it is not necessary for the IFC memory block 1 to keep image data #a any more so that the IFC memory block 1 becomes idle or open.

At time $t_{12}$, since the IFC memory block 1 is open, the transfer of image data #d from the host system to the IFC 52 is initiated. And thus the IFC memory block 1 starts the production of image data #d. A paper feed start command "FF" (corresponding to image data #d) is supplied from the IFC 52 to the PE 51. Immediately after $t_{12}$, as a response to the "FF" command, the PE 51 supplies the data of paper ID #4 to the IFC 52. The similar steps as described above follow untill all of the image data is printed. In the above-described example, a paper ID data is generated by the print engine 51. However, it should be noted that such a paper ID data may also be generated by any other unit, such as host system or IFC 52.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Apparatus for forming images on both sides of a succession of paper sheets, comprising:
   (1) transporting means for transporting paper sheets along a predetermined transportation path such that the sheets are spaced from each other along said transportation path;
   (2) printing means disposed at a printing station which is along the transportation path for printing an image on one side only of a sheet passing through the printing station;
   (3) inverting means located further along the transportation path for inverting the paper sheets emerging from the printing station, said transportation path thereafter carrying the inverted sheets for a second pass through the printing station; and
   (4) control means for determining a maximum number of sheets that can be located in said transportation path at any one time while remaining spaced from each other along an path for controlling the operation of said apparatus such that:
      (4-1) the printing means prints an image on a first side of each of the selected number of sheets passing in succession through the printing station a first time, said selected number being equal to or less than said maximum number, so that the sheets whose first sides have already been printed in the course of a first pass through the printing station can remain spaced from each other along said path and a first one of said sheets can reach the printing station for a second pass therethrough;
      (4-2) thereafter, the printing means prints an image on a second side of a sheet passing through the printing station a second time; and
      (4-3) subsequent thereto, the printing means alternately prints on the first side of a sheet passing through the printing station for the first time and on the second side of a sheet passing through the printing station a second time.

2. Apparatus according to claim 1, further comprising setting means for setting said selected number before an image is printed on the second side of a sheet.

3. Apparatus according to claim 2, wherein said control means includes means for determining a maximum number of sheets which can be located in said transportation path at any one time on the basis of factors which include the length of the sheets.

4. A system for forming images on sheets comprising:
   a guide defining a sheet transportation path;
   a sheet moving mechanism moving said sheet along the transportation path such that adjacent sheets are spaced from each other along the transportation path;
   a printing device which is at a printing station along the transportation path and forms an image on each sheet passing through the printing station;
   an invertor receiving and inverting sheets emerging from the printing station and guiding the inverted sheets back to the printing station for a second pass therethrough; and
   a control circuit controlling the operation of said system to cause the printing device to: (i) first print an image on a first side of each of a selected number of sheets passing one after the other through the printing station for a first time and remaining in said transportation path spaced from each other along the path; (ii) thereafter print an image on a second side of a sheet passing through the printing station a second time; and (iii) subsequently alternately print an image on the first side of a sheet passing through the printing station for a first time and on the second side of a sheet passing through the printing station a second time.

5. A system as in claim 4 including a selector for setting said selected number of sheets which will pass through the printing station for the first time before a sheet passes through the printing station a second time.

6. A system as in claim 4 in which the control circuit includes a circuit which causes a first sheet which passes through the printing station for the first time to be also the first sheet which passes through the printing station a second time.

7. A method comprising:
   guiding sheets in succession through a printing station which forms an image on each sheet passing through the printing station while moving the sheets along a transportation path in which they remain spaced from each other along the path;
   inverting sheets emerging from the printing station with images formed on only one side thereof and guiding the inverted sheets back to the printing station for a second pass therethrough; and
   controlling a operation such that the printing station:
      (i) first prints an image on a first side only of each of several sheets passing one after the other through the printing station for a first time and moving along said transportation path while remaining spaced from each other along the path; (ii) thereafter prints an image on a second side of an inverted sheet passing through the printing station a second time; and (iii) subsequently alternately prints an image on the first side of a sheet passing through the printing station for the first time and on the second side of a sheet passing through the printing station a second time.

8. A method as in claim 7 including the step of selectively setting the number of sheets which will pass through the printing station for the first time before a sheet passes through the printing station a second time.

9. A method as in claim 7 in which the controlling step includes the step of causing a first sheet which passes through the printing station for the first time to be also the first sheet which passes through the printing station a second time.

* * * * *